(12) United States Patent
Pahl et al.

(10) Patent No.: US 9,184,911 B2
(45) Date of Patent: *Nov. 10, 2015

(54) SECURE SESSION CAPABILITY USING PUBLIC-KEY CRYPTOGRAPHY WITHOUT ACCESS TO THE PRIVATE KEY

(71) Applicant: CLOUDFLARE, INC., San Francisco, CA (US)

(72) Inventors: Sébastien Andreas Henry Pahl, San Francisco, CA (US); Matthieu Philippe François Tourne, San Francisco, CA (US); Piotr Sikora, San Francisco, CA (US); Ray Raymond Bejjani, San Francisco, CA (US); Dane Orion Knecht, San Francisco, CA (US); Matthew Browning Prince, San Francisco, CA (US); John Graham-Cumming, London (GB); Lee Hahn Holloway, Santa Cruz, CA (US); Nicholas Thomas Sullivan, San Francisco, CA (US); Albertus Strasheim, San Francisco, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/248,254

(22) Filed: Apr. 8, 2014

(65) Prior Publication Data

US 2015/0288514 A1 Oct. 8, 2015

(51) Int. Cl.
*H04L 29/06* (2006.01)
*H04L 9/08* (2006.01)
*G06F 21/33* (2013.01)

(52) U.S. Cl.
CPC .............. *H04L 9/085* (2013.01); *H04L 63/166* (2013.01); *G06F 21/33* (2013.01); *H04L 63/061* (2013.01); *H04L 63/0869* (2013.01); *H04L 63/16* (2013.01); *H04L 63/164* (2013.01)

(58) Field of Classification Search
CPC .............. H04L 63/166; H04L 63/0823; H04L 63/0428; H04L 9/3263; H04L 9/3271; H04L 63/061; H04L 63/08; H04L 63/205; H04L 63/0884; H04L 9/32; H04L 9/3273; H04L 29/06945
USPC ........ 713/168–170, 151, 156, 172; 726/14, 2, 726/1
See application file for complete search history.

(56) References Cited

U.S. PATENT DOCUMENTS 5,657,390 A    8/1997  Elgamal et al.
7,096,352 B2   8/2006  Kang et al.

(Continued)

OTHER PUBLICATIONS

T. Dierks et al., The TLS Protocol Version 1.0, Network Working Group, Request for Comments: 2246, Jan. 1999, 81 pages.

(Continued)

*Primary Examiner* — Nirav B Patel
(74) *Attorney, Agent, or Firm* — Nicholson de Vos Webster & Elliott LLP

(57) ABSTRACT

A server establishes a secure session with a client device where a private key used in the handshake when establishing the secure session is stored in a different server. During the handshake procedure, the server receives a premaster secret that has been encrypted using a public key bound with a domain for which the client device is attempting to establish a secure session. The server transmits the encrypted premaster secret to the different server for decryption along with other information necessary to compute a master secret and session keys for the secure session. The different server decrypts the encrypted premaster secret, generates the master secret, and generates session keys that are used in the secure session for encrypting and decrypting communication between the client device and the server and transmits those session keys to that server.

30 Claims, 24 Drawing Sheets

(56) References Cited

U.S. PATENT DOCUMENTS

| | | | |
|---|---|---|---|
| 7,917,758 B2* | 3/2011 | Palekar et al. | 713/171 |
| 8,327,128 B1* | 12/2012 | Prince et al. | 713/150 |
| 8,332,625 B2* | 12/2012 | Fritzges et al. | 713/151 |
| 8,700,892 B2* | 4/2014 | Bollay et al. | 713/153 |
| 8,732,461 B2* | 5/2014 | Fujii et al. | 713/168 |
| 8,738,902 B2* | 5/2014 | Yoo et al. | 713/156 |
| 2006/0005017 A1 | 1/2006 | Black et al. | |
| 2006/0294366 A1 | 12/2006 | Nadalin et al. | |
| 2008/0134311 A1* | 6/2008 | Medvinsky et al. | 726/7 |
| 2009/0132806 A1 | 5/2009 | Blommaert et al. | |
| 2009/0158040 A1 | 6/2009 | Chaudhary et al. | |
| 2013/0156189 A1 | 6/2013 | Gero et al. | |
| 2013/0305036 A1* | 11/2013 | Vos | 713/151 |

OTHER PUBLICATIONS

T. Dierks et al., The Transport Layer Security (TLS) Protocol Version 1.1, Network Working Group, Request for Comments: 4346, Apr. 2006, 88 pages.

T. Dierks et al., The Transport Layer Security (TLS) Protocol Version 1.2, Network Working Group, Request for Comments: 5246, Aug. 2008, 105 pages.

A. Freier et al., The Secure Sockets Layer (SSL) Protocol Version 3.0, Internet Engineering Task Force (IETF), Request for Comments: 6101, Aug. 2011, 67 pages.

Björn Edström, blog.bjrn.se: Fun with the TLS handshake, Programming and stuff, Jul. 28, 2012, 11 pages.

Non-Final Office Action for U.S. Appl. No. 13/788,784, mailed Nov. 25, 2013, 12 pages.

Non-Final Office Action for U.S. Appl. No. 13/788,784, mailed Jul. 11, 2013, 13 pages.

Notice of Allowance for U.S. Appl. No. 13/788,784, mailed Feb. 18, 2014, 12 pages.

Notice of Allowance for U.S. Appl. No. 14/248,256, mailed Jun. 23, 2014, 15 pages.

Notice of Allowance for U.S. Appl. No. 14/248,253, mailed Jul. 14, 2014, 21 pages.

Notice of Allowance for U.S. Appl. No. 14/248,253, mailed Oct. 30, 2014, 8 pages.

PCT International Search Report for PCT/US14/21434, mailed Apr. 14, 2014, 10 pages.

* cited by examiner

SECURE SESSION CAPABILITY USING PUBLIC-KEY CRYPTOGRAPHY WITHOUT ACCESS TO THE PRIVATE KEY

FIELD

Embodiments of the invention relate to the field of secure network communications; and more specifically, to establishing a secure session (e.g., Secure Sockets Layer (SSL), Transport Layer Security (TLS)) using public-key cryptography where the server does not have access to the private key used during the secure session handshake.

BACKGROUND

Secure Sockets Layer (SSL) and Transport Layer Security (TLS), which is the successor to SSL, provide secure network connections. SSL and/or TLS are commonly used during web browsing (e.g., using HTTPS), email, and other Internet applications. SSL and TLS are described in several Request For Comments (RFCs), including RFC 2246 (describing TLS 1.0), RFC 4346 (describing TLS 1.1), RFC 5246 (describing TLS 1.2), and RFC 6101 (describing SSL 3.0).

An SSL or TLS client and server negotiate a set of parameters to establish a secure session in a process called a handshake. For example, the client transmits a hello message (referred to as a ClientHello message) that includes the following: an indication of the requested version of the SSL or TLS protocol, a requested session identifier used to identify the session connection, a list of the cipher suites (cryptographic options) supported by the client, a list of the compression methods supported by the client, random data used for cryptographic purposes (sometimes referred to as ClientHello.random), and may indicate whether and what type of extensions (defined by the protocol) the client supports.

In response, the server transmits a hello message to the client (referred to as a ServerHello message) that includes the version of the SSL or TLS protocol supported by the server, a session identifier that will be used to identify the session, the selected cipher suite (selected from the list of cipher suites included in the ClientHello message), the selected compression method (selected from the list of compression methods included in the ClientHello message), random data used for cryptographic purposes that is different than the random data included in the ClientHello message (sometimes referred to as ServerHello.random), and may include a list of the extensions that the server supports.

Following the hello messages, the server transmits a list of its certificate(s) in a message referred to as a Certificate message (sometimes referred to as a Server Certificate message). The server then transmits a message indicating that the hello-message phase of the handshake is complete (referred to as a ServerHelloDone message). For some implementations, depending on which key exchange methods are used (e.g., implementations using Diffie-Hellman cipher suites), the server also transmits a message to the client (referred to as a ServerKeyExchange message) that conveys cryptographic information to allow the client to calculate the premaster secret. This message is signed using the private key of the server. The client then transmits a message to the server (referred to as a ClientKeyExchange message) that includes a random value typically generated by the client called a premaster secret or Diffie-Hellman parameters that allows the client and server to agree upon the same premaster secret. The premaster secret is used by both the client and the server to generate a shared secret (referred to as the master secret) that is used to generate session keys that are used to encrypt and decrypt information during the secure session. If the premaster secret is included in the ClientKeyExchange message, it is encrypted using the public key in the certificate sent by the server. By way of a specific example, if the Rivest-Shamir-Adelman (RSA) algorithm is being used for key agreement and authentication, the client generates a 48-byte value for the premaster secret and encrypts it using the public key from the server's certificate and transmits the encrypted premaster secret to the server. By way of another specific example, if a Diffie-Hellman implementation is used, the ClientKeyExchange message includes the client's Diffie-Hellman public value. By way of another specific example, if a FORTEZZA hardware encryption system is being used, the client derives a token encryption key (TEK) using the FORTEZZA Key Exchange Algorithm (KEA), which itself uses the public key from the server's certificate along with private parameters of the client, generates a random 48-byte value for the premaster secret and encrypts it using the TEK and transmits the encrypted premaster secret to the server.

If the server receives the encrypted premaster secret in the ClientKeyExchange message, it decrypts it with their private key. In an implementation where the ClientKeyExchange message includes cryptographic parameters to generate the premaster secret, the server generates the premaster secret using those cryptographic parameters (which also requires the use of the private key).

The client and server each perform a series of steps to generate a master secret from the premaster secret, using the random data included in the ClientHello and ServerHello messages (e.g., the ClientHello.random and ServerHello.random). The master secret is a shared secret that is used to generate session keys, which are symmetric keys that are used to encrypt and decrypt information during the secure session.

The client then transmits a message to the server informing it that future messages will be encrypted (referred to as a ChangeCipherSpec message). The client then transmits an encrypted message to the server for validation (referred to as a Finished message). The server transmits to the client a message that future messages will be encrypted (a ChangeCipherSpec message) and an encrypted message to the client for validation (a Finished message). From then on, the handshake is complete and the secure session is established such that future messages between the client and server are encrypted.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
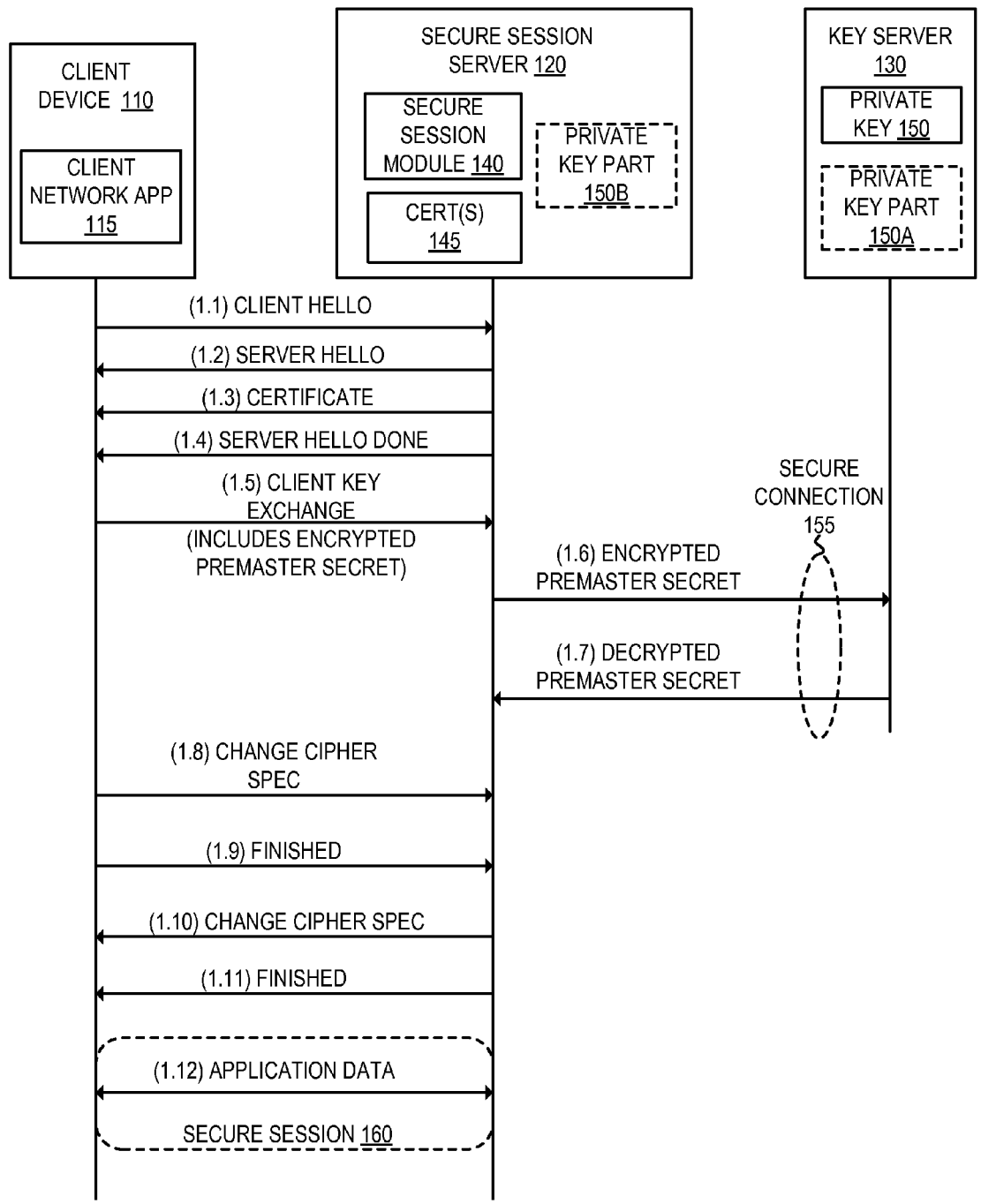
FIG. 1 illustrates exemplary messages for establishing a secure session using public-key cryptography between a client device and a secure session server where the secure session server does not have access to the private key used during the secure session handshake according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for establishing a secure session (e.g., SSL or TLS) using public-key cryptography where the secure session server does not have access to the private key used during the secure session handshake is described. The secure session server is a computing device that transmits and receives Internet traffic to and from client devices and is the server in the secure session. For example the secure session server terminates the secure session. By way of a specific example that is used throughout this specification, the secure session server may receive and transmit traffic for the domain https://example.com. The traffic may be received at the secure session server as a result of a client network application of the client device (e.g., a web browser) attempting to visit https://example.com. In one embodiment, the secure session server may act as a server for multiple domains that may belong to one or more domain owners.

The secure session server does not have local access to the private key that is used during the handshake procedure when establishing the secure session between the client device and the secure session server. For example, for some cipher suites, the private key is used to decrypt the premaster secret that has been encrypted with the corresponding public key by the client device. As another example, for other cipher suites (e.g., cipher suites that use Diffie-Hellman for the key exchange), the private key is used to sign a message that contains cryptographic parameters that are used to generate the premaster secret. In embodiments of the invention, the required private key is stored (or accessible) from a device remote to the secure session server, which is referred herein as the "key server." Upon a point during the handshake procedure where the private key is needed, the secure session server requests the key server to access and use the private key.

For example, if the premaster secret has been generated by the client and encrypted with a public key, the secure session server may request the key server to decrypt the premaster secret using the corresponding private key. The decrypted premaster secret is used by both the client device and secure session server to create a shared secret (referred to as a master secret) that is used when generating the session keys that are used to encrypt and decrypt data during the secure session. After receiving the encrypted premaster secret (which the secure session server cannot decrypt), the secure session server transmits the encrypted premaster secret to the key server, which has access to the private key that can decrypt the encrypted premaster secret. The key server decrypts and transmits the premaster secret to the secure session server. The secure session server, after receiving the decrypted premaster secret from the key server, generates the master secret and uses the master secret to generate the session keys that are used to encrypt and decrypt data during the secure session. The key server may transmit the decrypted premaster secret to the secure session server over a secure session or otherwise in an encrypted form. The secure session server and client finish the secure session handshake and establish the secure session.

As another example, if the selected cipher suite is a Diffie-Hellman cipher suite that requires the cryptographic parameters used when generating the premaster secret to be signed with the private key, the secure session server requests the key server to sign the cryptographic parameters with the private key.

FIG. 1 illustrates exemplary messages for establishing a secure session using public-key cryptography between a client device 110 and a secure session server 120 where the secure session server 120 does not have access to the private key used during the secure session handshake according to one embodiment. The client device 110 is a computing device (e.g., desktop, laptop, smartphone, mobile phone, tablet, gaming system, set-top box, server, etc.) that includes the client network application 115 (e.g., a web browser or other application) that is capable of accessing network resources and is capable of acting as a client in a secure session. It should be understood that the use of the term "client device" herein does not require that the device be an end-user client device. Rather, the term "client device" is used herein to refer to a computing device that operates as a client in the client-server relationship of a secure session (e.g., SSL and/or TLS).

The secure session server 120 is a computing device that includes the secure session module 140 that establishes and maintains secure sessions with client devices (and potentially the key server 130). The secure session server 120 also includes one or more certificates 145. By way of example, the certificate(s) 145 includes a certificate that is bound with example.com. The certificate that is bound with example.com includes a public key. The secure session server 120 does not store the private key that corresponds with the public key for example.com. The key server 130 is a computing device that includes the private key(s) 150. By way of example, the private key(s) 150 include a private key that corresponds with the public key included in the certificate for example.com that is stored in the secure session server 120. The secure session module 150 of the secure session server 120 is configured to, upon a point during the handshake procedure where the private key (e.g., the private key 150) is needed, to transmit a request to the key server 130 to access and use that private key.

At operation 1.1, the client device 110 transmits a Client Hello message to the secure session server 120. The Client Hello message begins the secure session handshake. The client device 110 may transmit the Client Hello message to the secure session server 120 as a result of the client network application 115 attempting to visit a website that begins with HTTPS (e.g., https://example.com). In one embodiment, the Client Hello message is transmitted to the secure session server 120 as a result of a Domain Name System (DNS) request for the domain the client device 110 is attempting to connect to resolving to an IP address of the secure session server 120. The Client Hello message may include the following: an indication of the requested version of the SSL or TLS protocol, a requested session identifier used to identify the session connection, a list of cipher suites supported by the client device 110, a list of the compression methods supported by the client device 110, random data used for cryptographic purposes (ClientHello.random), and also may indicate whether and what type of extensions defined by the protocol that the client supports. A number of cipher suites may be used in embodiments described herein (e.g., TLS_RSA_WITH_RC4_128_SHA, TLS_RSA_WITH_RC4_128_MD5, TLS_RSA_WITH_3DES_EDE_CBC_SHA, TLS_RSA_WITH_DES_CBC_SHA, TLS_ECDHE_RSA_WITH_RC4_128_SHA; TLS_ECDHE_RSA_WITH_3DES_EDE_CBC_SHA; TLS_ECDHE_RSA_WITH_AES_128_CBC_SHA; TLS_ECDHE_RSA_WITH_AES_256_CBC_SHA; etc.).

In response to the Client Hello message, at operation 1.2 the secure session server 120 transmits a Server Hello message to the client device 110. The Server Hello message may include the version of the SSL or TLS protocol supported by the secure session server 120, a session identifier that will be used to identify the session, the selected cipher suite (selected from the list of cipher suites included in the Client Hello message), random data used for cryptographic purposes that is different than the random data included in the ClientHello message (sometimes referred to as ServerHello.random), and may also include a list of the extensions that the server supports. The selected cipher suite defines the cipher specification to be used that specifies the pseudorandom function (PRF) used to generate keying material, the bulk data encryption algorithm (such as null, AES, etc.), the Message Authentication Code (MAC) algorithm, and other cryptographic attributes such as encrypted key length, MAC key length, fixed IV length, etc. As will be described in greater detail later herein, if the secure session server 120 supports session resumption without server-side state and intends to issue a ticket to the client with session state, the session identifier included in the Server Hello message may be empty. If the session identifier is not empty, then the secure session server 120 may be supporting stateful session resumption.

The secure session server 120 also transmits a Certificate message to the client device 110 at operation 1.3 (a server Certificate). The Certificate message includes a digital certificate for the requested domain. For example, if the requested domain is example.com, the Certificate message includes a digital certificate bound to example.com. The digital certificate includes, among other things, a public key. At operation 1.4, the secure session server 120 transmits a Server Hello Done message to the client device 110 that indicates that the hello-message phase of the handshake is complete.

At operation 1.5, the client 110 transmits a Client Key Exchange message to the secure session server 120. The Client Key Exchange message includes a random value called a premaster secret that has been encrypted using the public key included in the Certificate message of operation 1.3. By way of a specific example, if the RSA algorithm is being used for key agreement and authentication, the client device 110 generates a 48-byte value for the premaster secret and encrypts it using the public key from the server's certificate and transmits the encrypted premaster secret to the secure session server 120. As will be described below, the decrypted premaster secret is used to generate a shared secret between the client device 110 and the secure session 120 (called the master secret), which is then used when generating the encryption and decryption keys used to encrypt and decrypt data transmitted during the secure session. It should be understood that if the encrypted premaster secret cannot be decrypted, then the handshake will fail and the secure session will not be established.

The secure session server 120 does not have the private key to decrypt the premaster secret. However, the private key is stored on the key server 130 (as one of the private key(s) 150). Although FIG. 1 illustrates the key server 130 storing the private keys, in other embodiments the key server 130 has access to the private keys but those private keys are stored on a different device. At operation 1.6, the secure session server 120 transmits the encrypted premaster secret to the key server 130. The key server 130 decrypts the encrypted premaster secret using the private key for the requested domain. The key server 130 then transmits the decrypted premaster secret to the secure session server 120 at operation 1.7. In one embodiment, the messages of operations 1.6 and 1.7 are transmitted over a secure connection 155 (e.g., encrypted using SSL or TLS, or other mechanisms) and/or the encrypted premaster secret and the decrypted premaster secret are otherwise encrypted.

In one embodiment, the key server 130 stores or has access to private keys for multiple domains and/or zones, which may be owned or controlled by different entities. For example, the key server 130 may store or have access to the private key for example.com and example2.com. In such an embodiment, in conjunction with transmitting the encrypted premaster secret to the key server 130, the secure session server 120 indicates the domain or zone in which the client device 110 is requesting a connection. For example, if the client device 110 is requesting a secure session with example.com, then the secure session server 120 indicates to the key server 130 that example.com is the requested domain. The client device 110 may specify the destination domain using the Server Name Indication (SNI) extension in the Client Hello message. SNI is described in RFC 3546, June 2003. If the destination is not specified by the client device 110 (e.g., the client device 110 does not support SNI), then the secure session server 120 matches the destination IP address of the client-hello message sent by the client device 110 with the corresponding hostname (e.g., the secure session server 120 may include a mapping of IP addresses and hostnames). The secure session server 120 may transmit the indication of the domain or zone name to the key server 130 in a number of different ways including in a header, a custom binary structure, or a serialization format (e.g., protobuf, JavaScript Object Notation (JSON), etc.). After receiving the indication of the domain or zone name in which the client is attempting to connect, the key server 130 accesses the corresponding private key and decrypts the encrypted premaster secret. In another embodiment, a certificate fingerprint or a hash of the modulus (for RSA) may be used to identify the corresponding private key. For example, the secure session server 120 may generate a fingerprint over the certificate included in the Certificate message of operation 1.3 (e.g., a hash may be generated over the certificate) and transmit that fingerprint value to the key server 130. The key server 130 uses the same fingerprint algorithm to generate a fingerprint over its digital certificates and matches each to the corresponding private key. Upon receiving the fingerprint value from the secure session server 120, the key server 130 matches that fingerprint value with one of the fingerprint values it generated over the public certificate (the same public certificate included in the Certificate message of operation 1.3) to lookup the corresponding private key. As another example, the secure session server 120 may hash the modulus of the public key included in the certificate of the Certificate message of operation 1.3 and transmit that hash value to the key server 130. The key server 130 uses the same hash algorithm to generate a hash value over the modulus over its stored public keys and matches each to the corresponding private key. Upon receiving the hash value from the secure session server 120, the key server 130 matches that hash value with one of the hash values it generated to lookup the corresponding private key.

The secure session server 120 uses the decrypted premaster secret to calculate the master secret. The client device 110 and the secure session server 120 use the same algorithm and data to calculate the same master secret. By way of example, the master secret is calculated using a pseudorandom function that takes as input the premaster secret, the ClientHello.random value, and the ServerHello.random value.

The master secret is used by the client device 110 and the secure session server 120 to generate session keys that are used to encrypt and decrypt information during the secure session. By way of a specific example, the master secret is used to generate a client write Message Authentication Code (MAC) key, a server write MAC key, a client write encryption key, and a server write encryption key. A client write Initialization Vector (IV) and a server write IV may also be generated depending on the cipher used.

At operation 1.8, the client device 110 transmits a Change Cipher Spec message to the secure session server 120. The Change Cipher Spec message from the client device 110 indicates that future messages transmitted by the client device 110 will be encrypted. At operation 1.9, the client device 110 transmits a Finished message to the secure session server 120. The Finished message is encrypted using the generated session keys. By way of example, the Finished message includes an encrypted hash of all of the messages in the handshake previously sent and received.

At operation 1.10, the secure session server 120 transmits a Change Cipher Spec message to the client device 110 that indicates that future messages transmitted by the secure session server 120 will be encrypted. At operation 1.11, the secure session server 120 transmits a Finished message to the client device 110. The Finished message may include an encrypted hash of all of the messages in the handshake previously sent and received.

After the Finished message of operation 1.11, the handshake is complete and the secure session 160 is considered to be established. At operation 1.12, future messages of the secure session between the client device 110 and secure session server 120 are encrypted over the secure session 160, which carry the application data of the connection.

As described above, the connection between the secure session server 120 and the key server 130 may be a secure connection for securely transmitting the decrypted premaster secret and optionally securely transmitting the encrypted premaster secret. As described above, a secure session (e.g., SSL or TLS) may be established between the secure session server 120 and the key server 130. As part of establishing the secure session, the key server 130 may request a client certificate from the secure session server 120 and the secure session server 120 may transmit a client Certificate message that includes its certificate to the key server 130. The data in the client Certificate message is used by the key server 130 to authenticate the identity of the secure session server 120.

In some embodiments, the key server 130 may use IP address blocking to accept connections (such as from the secure session server 120) from only certain IP addresses. For example, the key server 130 may have a whitelist of IP address(es) and/or IP address range(s) that are allowed to connect to the key server 130 or have a blacklist of IP address(es) and/or IP address range(s) that are not allowed to connect to the key server 130. IP address blocking may also be used at one or more intermediary network devices between the secure session server 120 and the key server 130.

Although a secure session has been described between the secure session server 120 and the key server 130 that is initiated by the secure session server 120, in other embodiments the secure session can be initiated by the key server 130.

In some embodiments, the messages transmitted by the secure session server 120 to the key server 130 are signed with a private key that is known only to the secure session server 120. In such embodiments, the key server 130 verifies the validity of the signature of a message prior to acting on that message. By way of example, the message that includes the encrypted premaster secret at operation 1.6 may be signed with a private key known only to the secure session server 120. The key server 130 verifies whether the signature is valid using the corresponding public key and will only continue with the operations if the signature is valid.

A combination of the security techniques described may be used to provide security for the connection between the secure session server 120 and the key server 130. For example, a combination of requiring a client Certificate, IP address blocking, and signing the messages transmitted by the secure session server with a private key known only to the secure session server may be used to provide security for the connection between the secure session server 120 and the key server 130.

In one embodiment, the secure connection 155 between the secure session server 120 and the key server 130 may be a Virtual Private Network (VPN) connection, which may be desirable in a firewalled environment.

Figure 2:
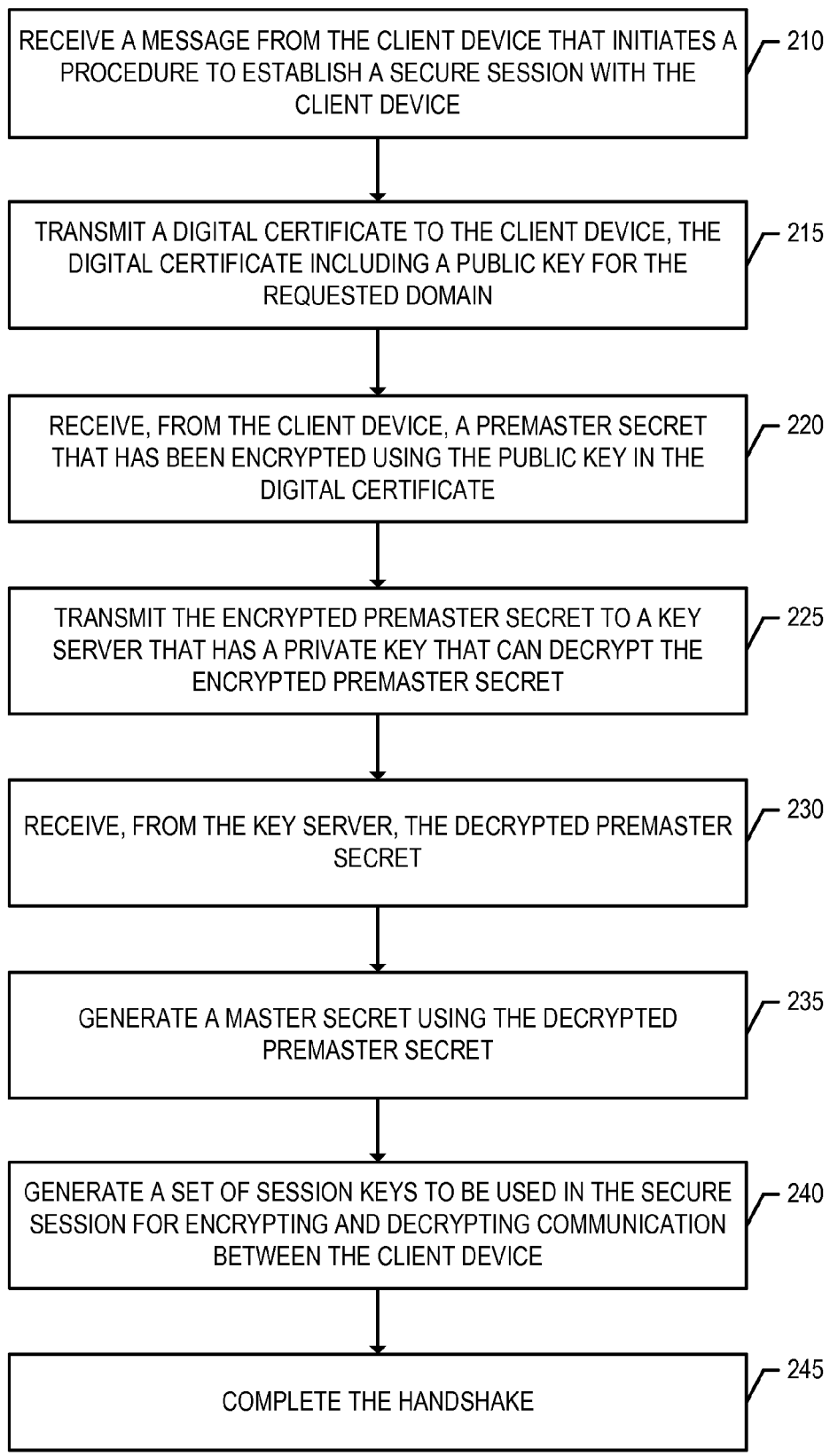
FIG. 2 is a flow diagram that illustrates exemplary operations for establishing a secure session implemented with public-key cryptography between a client device and a secure session server where the secure session server does not have access to a private key for the requested domain according to one embodiment.

FIG. 2 is a flow diagram that illustrates exemplary operations for establishing a secure session implemented with public-key cryptography between a client device and a secure session server where the secure session server does not have access to a private key for the requested domain according to one embodiment. The private key is stored remotely from the secure session server (e.g., on a key server).

At operation 210, the secure session server receives a message from the client device that initiates a procedure to establish a secure session with the client device. For example, the secure session server may receive a Client Hello message from the client device (e.g., an SSL or TLS Client Hello message). Depending on the protocol and capabilities of the client device, the message may indicate the destination host name in which the client device wishes to establish a secure session (e.g., the Client Hello message may include the Server Name Indication (SNI) extension and specify the destination host name).

In response to receiving the message in operation 210, the secure session server may perform a number of operations, including transmitting a digital certificate to the client device at operation 215. The digital certificate includes a public key for the requested domain. It should be understood that the private key that corresponds to the public key is not stored on the secure session server (e.g., it is stored remotely on a key server). The digital certificate may be transmitted in an SSL or TLS Certificate message. Prior to transmitting the digital certificate, the secure session server may perform a number of other operations including transmitting a Server Hello message to the client device. If the message in operation 210 indicates the destination domain, the secure session server transmits the digital certificate bound to that destination domain. If the message in operation 210 does not indicate the destination host name, the secure session server transmits the digital certificate that is associated with the destination IP address of the message in operation 210, which is bound to the requested domain. Flow moves from operation 215 to operation 220.

At operation 220, the secure session server receives from the client device a premaster secret that has been encrypted using the public key in the digital certificate transmitted in operation 215. The encrypted premaster secret may be sent by the client device in a SSL or TLS Client Key Exchange message. Flow moves from operation 220 to operation 225.

The secure session server does not have the private key that corresponds with the public key that encrypted the premaster secret. As a result, the secure session server cannot decrypt the encrypted premaster secret to obtain the premaster secret. At operation 225, the secure session server transmits the encrypted premaster secret to a key server that has the private key that can decrypt the encrypted premaster secret. In one embodiment, the key server is located remotely from the secure session server. Moreover, in some embodiments, the secure session server and the key server may be owned and/or operated by different entities. For example, the secure session server may not be under physical control of the owner of the requested domain while the key server is under physical control of the owner of the requested domain. In one embodiment, the encrypted premaster secret is transmitted to the key server over a secure connection (e.g., encrypted using SSL or TLS) and/or is otherwise encrypted. Flow moves from operation 225 to operation 230.

Figure 3:
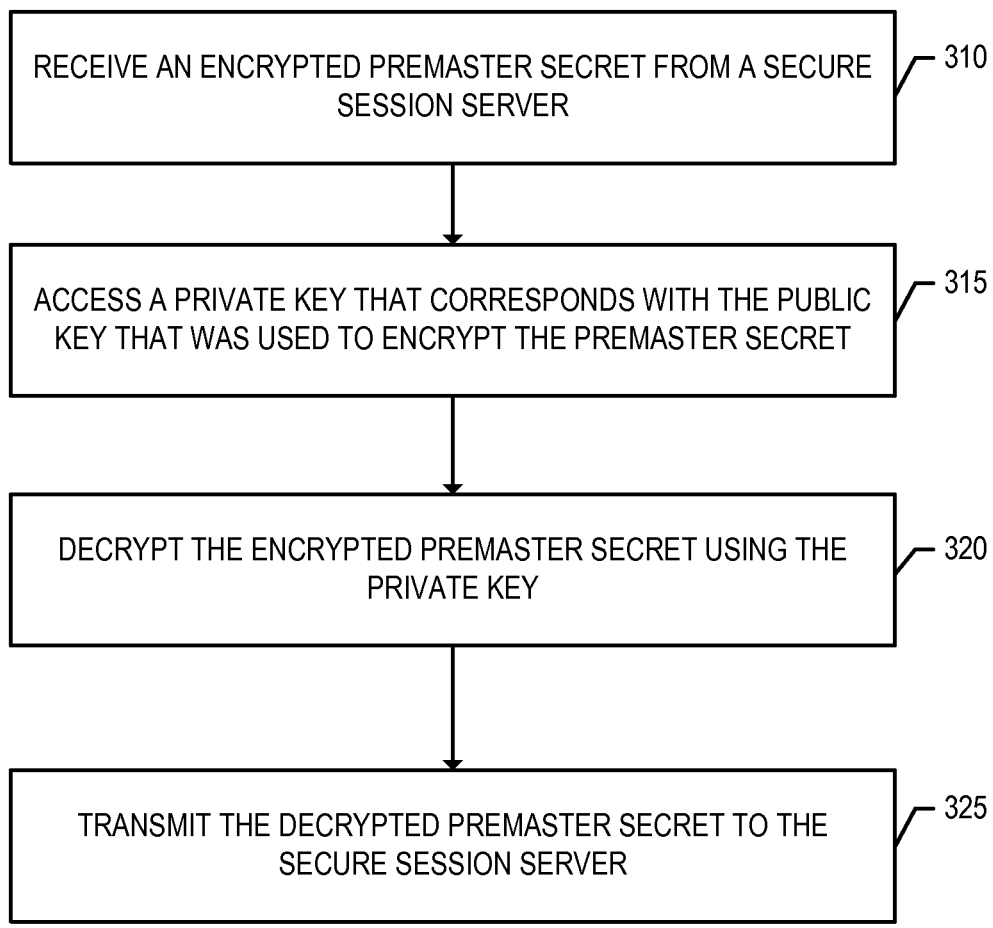
FIG. 3 is a flow diagram that illustrates exemplary operations performed by a key server in response to receiving an encrypted premaster secret from a secure session server according to one embodiment.

In response to receiving the encrypted premaster secret, the key server decrypts the encrypted premaster secret and obtains the premaster secret. FIG. 3 is a flow diagram that illustrates exemplary operations performed by a key server in response to receiving an encrypted premaster secret from a secure session server according to one embodiment. At operation 310, the key server receives an encrypted premaster secret from the secure session server. For example, the key server receives the encrypted premaster secret transmitted by the secure session server in operation 225 of FIG. 2.

Flow then moves to operation 315 where the key server accesses a private key that corresponds with the public key that was used to encrypt the premaster secret. The key server may receive from the secure session server an indication of the domain or zone name in which the client device is attempting to establish a secure session for. This indication may be transmitted in a number of different ways including in a header, a custom binary structure, or a serialization format (e.g., protobuf, JavaScript Object Notation (JSON), etc.). The key server uses this indication to access the private key that corresponds with the public key that encrypted the premaster secret.

Flow then moves to operation 320 where the key server decrypts the encrypted premaster secret using the accessed private key. Flow then moves to operation 325 where the key server transmits the decrypted premaster secret to the secure session server.

As described above, the key server may transmit the decrypted premaster secret to the secure session over a secure session. As part of establishing the secure session between the key server and the secure session server, the key server may request a client certificate from the secure session server in order to authenticate the identity of the secure session server. In some embodiments, the key server may use IP address based blocking to verify that the key server is communicating with a legitimate secure session server (e.g., by verifying that the secure session server is communicating with an IP address having a value that is expected by the key server). In some embodiments, the connection between the key server and the secure session server is a VPN connection. In some embodiments, the messages transmitted by the secure session server to the key server are signed with a private key that is known only to the secure session server. In such embodiments, the key server verifies the validity of the signature of a message prior to acting on that message. In some embodiments, any combination of these security techniques may be used.

Referring back to FIG. 2, at operation 230, the secure session server receives the decrypted premaster secret from the key server. In one embodiment, the decrypted premaster secret is transmitted to the secure session server over a secure connection (e.g., encrypted using SSL or TLS) and/or is otherwise encrypted such that the secure session server is able to decrypt the message. Flow moves from operation 230 to operation 235.

After obtaining the decrypted premaster secret from the key server, the secure session server can proceed with the secure session handshake with the client device and establish the secure session. For example, at operation 235, the secure session server generates a master secret using the decrypted premaster secret. The client device also generates the same master secret.

Flow then moves to operation 240 where the secure session server generates a set of session keys to be used in the secure session when encrypting and decrypting information. By way of a specific example, the master secret is used to generate a client write Message Authentication Code (MAC) key, a server write MAC key, a client write encryption key, and a server write encryption key. A client write Initialization Vector (IV) and a server write IV may also be generated depending on the cipher used.

Flow moves from operation 240 to operation 245 where the secure session server completes the handshake with the client device and establishes a secure session with the client device. For example, the client device and secure session server each may transmit a Change Cipher Spec message and a Finished message, as previously described herein. While the secure session is in operation, the client device and secure session server may exchange data securely.

Figure 4:
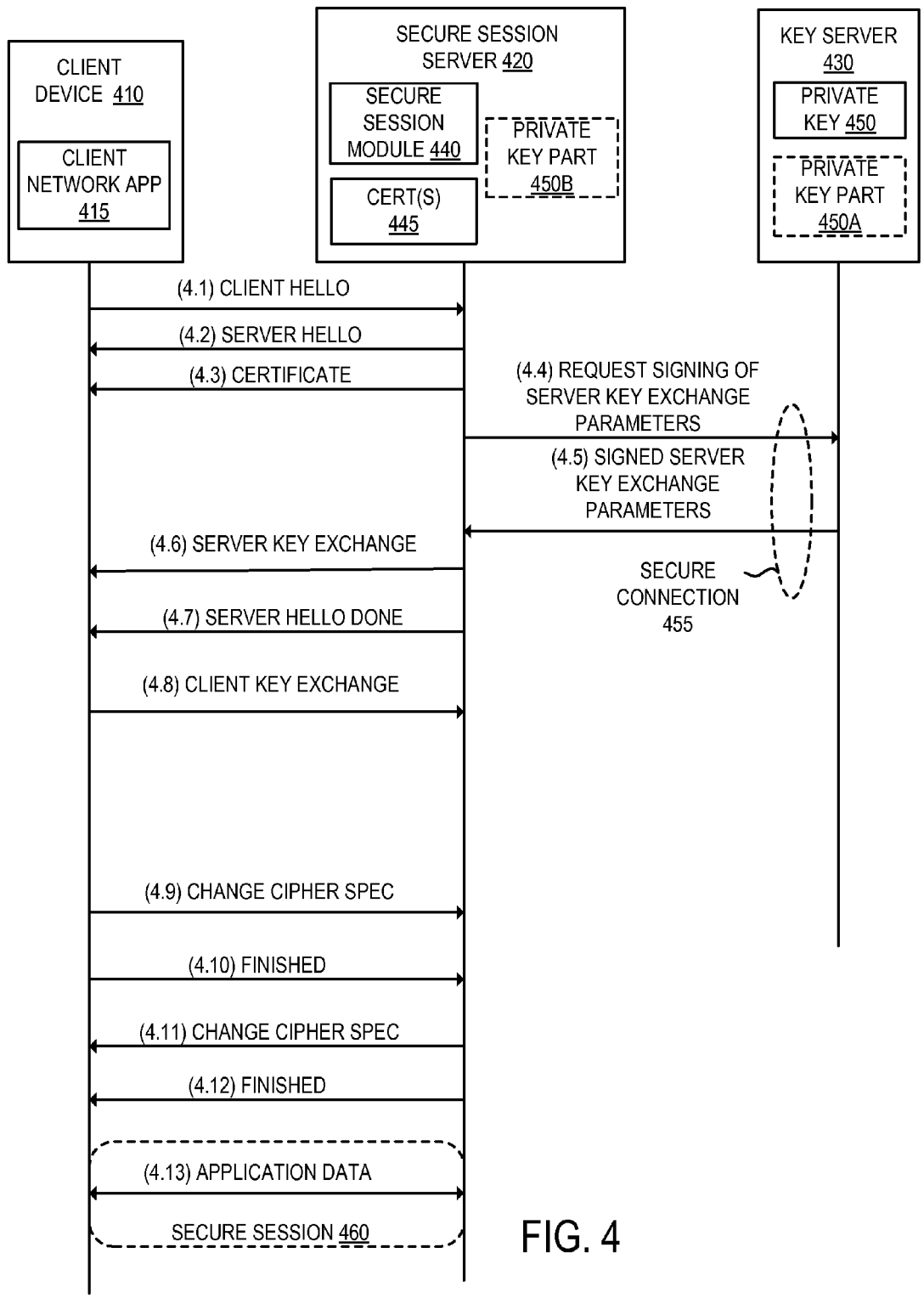
FIG. 4 illustrates exemplary messages for establishing a secure session using public-key cryptography between a client device and a secure session server where the secure session server does not have access to the private key used during the secure session handshake according to another embodiment.

FIG. 4 illustrates exemplary messages for establishing a secure session using public-key cryptography between a client device 410 and a secure session server 420 where the secure session server 420 does not have access to the private key used during the secure session handshake according to one embodiment. The embodiment described in FIG. 4 describes the messages for establishing a secure session where the cipher suite chosen requires the use of a Server Key Exchange message (e.g., a Diffie-Hellman cipher suite is used such as ephemeral Diffie-Hellman RSA (DHE_RSA), ephemeral Diffie-Hellman Digital Signature Standard (DHE_DSS), Ephemeral Elliptic Curve Diffie-Hellman (ECDHE) (e.g., (ECDHE) (e.g., ECDHE_ECDSA, ECDHE_RSA))). The client device 410 (including the client network application 415) is similar to the client device 110 of FIG. 1. The secure session server 420, including the secure session module 440 and the certificate(s) 445, are similar to the secure session server 120 (including the secure session module 140 and the certificate(s) 145), but perform different operations as will be described below. The key server 430 is similar to the key server 130 of FIG. 1, but performs different operations as will be described below.

At operation 4.1, the client device 410 transmits a Client Hello message to the secure session server 420. This Client Hello message is similar to the Client Hello message described in operation 1.1 of FIG. 1. In response to the Client Hello message, at operation 4.2 the secure session server 420 transmits a Server Hello message to the client device 410. This Server Hello message is similar to the Server Hello message described in operation 1.2 of FIG. 1. The secure session server 420 also transmits a Certificate message to the client device 410 at operation 4.3 (a server Certificate). This Certificate message is similar to the Certificate message described in operation 1.3 of FIG. 1, but it does not include enough data to allow the client device 410 to generate the premaster secret.

Although not illustrated in FIG. 4, the secure session server 420 has selected a cipher suite that has a key exchange in which the certificate message transmitted in operation 4.3 does not include enough data to allow the client device 410 to generate a premaster secret. For example, the selected cipher suite may use Diffie-Hellman as the key exchange mechanism (e.g., DHE_RSA, DHE_DSS, Ephemeral Elliptic Curve Diffie-Hellman (ECDHE) (e.g., ECDHE_ECDSA, ECDHE_RSA)). Because of this, the secure session server 420 will transmit a message to the client device 410 that conveys cryptographic information to allow the client device 410 and the secure session server 420 to each generate the same premaster secret. By way of a specific example where the key exchange mechanism is Diffie-Hellman such as DHE_DSS or DHE_RSA, the cryptographic information includes a set of cryptographic parameters that may include the following: the prime modulus used for the Diffie-Hellman operation (p), the generator used for the Diffie-Hellman operation (g), and a Diffie-Hellman public value of the server (g^X mod p, where X is the Diffie-Hellman private value of the server). As another specific example where the key exchange mechanism is Ephemeral Elliptic Curve Diffie-Hellman (ECDHE) such as ECDHE_ECDSA or ECDHE_RSA, the cryptographic parameters include the Ephemeral ECDH public key and a specification of the corresponding curve (the corresponding elliptic curve domain parameters) (e.g., as defined in RFC 4492). The message that conveys the cryptographic information is referred to as a Server Key Exchange message. The cryptographic information of the Server Key Exchange message may need to be signed with the private key 450 corresponding to the public key of the server transmitted in the Certificate message transmitted in operation 4.3 (e.g., if the key exchange mechanism is DHE_RSA, DHE_DSS, ECDHE_ECDSA, or ECDHE_RSA). For example, private key 450 may be used to sign the set of cryptographic parameters, the ClientHello.random value, and the ServerHello.random value. As similarly described with respect to the embodiment discussed in FIG. 1, the secure session server 420 does not have local access to this private key 450. As a result, the secure session server 420 cannot sign the Server Key Exchange message with this private key 450.

Since the secure session server 420 does not have local access to the private key 450, at operation 4.4 the secure session server 420 transmits a request to the key server 430 to sign the cryptographic parameters of the Server Key Exchange message with the private key 450.

In one embodiment, the secure session server 420 generates these cryptographic parameters (and selects the server's private value used in the Diffie-Hellman operation) and transmits these cryptographic parameters and any other required information (e.g., the ClientHello.random and ServerHello.random values) to the key server 430 to sign using the private key 450. In this embodiment, the private key 450 is typically an RSA key if the key exchange mechanism is DHE_RSA or ECDHE_RSA, and is typically a Digital Signature Algorithm (DSA) key if the key exchange mechanism is DHE_DSS or an ECDSA key if the key exchange mechanism is ECDHE_ECDSA.

The key server 430 transmits the result of the signed server key exchange parameters to the secure session server 420 at operation 4.5. In one embodiment, the messages of operations 4.4 and 4.5 are transmitted over a secure connection 455 (e.g., encrypted using SSL or TLS, or other mechanisms) and/or are otherwise encrypted.

In one embodiment, the key server 430 stores or has access to private keys for multiple domains and/or zones, which may be owned or controlled by different entities. For example, the key server 430 may store or have access to the private key for example.com and example2.com. In such an embodiment, the secure session server 420 indicates the domain or zone in which the client device 410 is requesting a connection. For example, if the client device 410 is requesting a secure session with example.com, then the secure session server 420 indicates to the key server 430 that example.com is the requested domain. The client device 410 may specify the destination domain using the SNI extension in the Client Hello message. If the destination is not specified by the client device 410 (e.g., the client device 410 does not support SNI), then the secure session server 420 matches the destination IP address of the client-hello message sent by the client device 410 with the corresponding hostname (e.g., the secure session server 420 may include a mapping of IP addresses and hostnames). The secure session server 420 may transmit the indication of the domain or zone name to the key server 430 in a number of different ways including in a header, a custom binary structure, or a serialization format (e.g., protobuf, JavaScript Object Notation (JSON), etc.). After receiving the indication of the domain or zone name in which the client is attempting to connect, the key server 430 accesses the corresponding private key. In another embodiment, a certificate fingerprint or a hash of the modulus (for RSA) may be used to identify the corresponding private key. For example, the secure session server 420 may generate a fingerprint over the certificate included in the Certificate message of operation 4.3 (e.g., a hash may be generated over the certificate) and transmit that fingerprint value to the key server 430. The key server 430 uses the same fingerprint algorithm to generate a fingerprint over its digital certificates and matches each to the corresponding private key. Upon receiving the fingerprint value from the secure session server 420, the key server 430 matches that fingerprint value with one of the fingerprint values it generated over the public certificate (the same public certificate included in the Certificate message of operation 4.3) to lookup the corresponding private key. As another example, the secure session server 420 may hash the modulus of the public key included in the certificate of the Certificate message of operation 4.3 and transmit that hash value to the key server 430. The key server 430 uses the same hash algorithm to generate a hash value over the modulus over its stored public keys and matches each to the corresponding private key. Upon receiving the hash value from the secure session server 420, the key server 430 matches that hash value with one of the hash values it generated to lookup the corresponding private key.

At operation 4.6, the secure session server 420 transmits the Server Key Exchange message to the client device 410, which includes the signed cryptographic parameters. The secure session server 420 also transmits a Server Hello Done message to the client device 410 at operation 4.7 that indicates that the hello-message phase of the handshake is complete.

The client device 410 authenticates the information in the Server Key Exchange message using the corresponding public key (e.g., the public key received in the Certificate message transmitted in operation 4.3). Assuming that the information is authenticated, the client device 410 generates the premaster secret using that information. The client transmits the Client Key Exchange message in operation 4.8.

Unlike the Client Key Exchange message of FIG. 1, this Client Key Exchange message transmitted in operation 4.8 does not include the premaster secret. Rather, this Client Key Exchange message includes the information necessary for the server (the secure session server 420) to generate the same premaster secret (e.g., it includes the client's Diffie-Hellman public value). For example, in an embodiment where the secure session server 420 generates the Diffie-Hellman cryptographic parameters, the secure session server 420 generates the premaster secret using the client's Diffie-Hellman public value (received in the Client Key Exchange message) and its Diffie-Hellman private value.

The secure session server 420 uses the premaster secret to calculate the master secret. The client device 410 and the secure session server 420 use the same algorithm and data to calculate the same master secret. By way of example, the master secret is calculated using a pseudorandom function that takes as input the premaster secret, the ClientHello.random value, and the ServerHello.random value. The master secret is used by the client device 410 and the secure session server 420 to generate session keys that are used to encrypt and decrypt information during the secure session. By way of a specific example, the master secret is used to generate a client write Message Authentication Code (MAC) key, a server write MAC key, a client write encryption key, and a server write encryption key. A client write Initialization Vector (IV) and a server write IV may also be generated depending on the cipher used.

At operation 4.9, the client device 410 transmits a Change Cipher Spec message to the secure session server 420. The Change Cipher Spec message from the client device 410 indicates that future messages transmitted by the client device 410 will be encrypted. At operation 4.10, the client device 410 transmits a Finished message to the secure session server 420. The Finished message is encrypted using the generated session keys. By way of example, the Finished message includes an encrypted hash of all of the messages in the handshake previously sent and received.

At operation 4.11, the secure session server 420 transmits a Change Cipher Spec message to the client device 410 that indicates that future messages transmitted by the secure session server 420 will be encrypted. At operation 4.12, the secure session server 420 transmits a Finished message to the client device 410. The Finished message may include an encrypted hash of all of the messages in the handshake previously sent and received.

After the Finished message of operation 4.12, the handshake is complete and the secure session 460 is considered to be established. At operation 4.13, future messages during the session between the client device 410 and secure session server 420 are encrypted over the secure session 460, which carry the application data of the connection.

As described above, the connection between the secure session server 420 and the key server 430 may be a secure connection. As described above, a secure session (e.g., SSL or TLS) may be established between the secure session server 420 and the key server 430. As part of establishing the secure session, the key server 430 may request a client certificate from the secure session server 420 and the secure session server 420 may transmit a client Certificate message that includes its certificate to the key server 430. The data in the client Certificate message is used by the key server 430 to authenticate the identity of the secure session server 420.

In some embodiments, the key server 430 may use IP address blocking to accept connections (such as from the secure session server 420) from only certain IP addresses. For example, the key server 430 may have a whitelist of IP address(es) and/or IP address range(s) that are allowed to connect to the key server 430 or have a blacklist of IP address(es) and/or IP address range(s) that are not allowed to connect to the key server 430. IP address blocking may also be used at one or more intermediary network devices between the secure session server 420 and the key server 430.

Although a secure session has been described between the secure session server 420 and the key server 430 that is initiated by the secure session server 420, in other embodiments the secure session can be initiated by the key server 430.

In some embodiments, the messages transmitted by the secure session server 420 to the key server 430 are signed with a private key that is known only to the secure session server 420. In such embodiments, the key server 430 verifies the validity of the signature of a message prior to acting on that message. By way of example, the message that includes the request to sign the server key exchange parameters of operation 4.4 may be signed with a private key known only to the secure session server 420. The key server 430 verifies whether the signature is valid using the corresponding public key and will only continue with the operations if the signature is valid.

A combination of the security techniques described may be used. For example, a combination of requiring a client Certificate, IP address blocking, and signing the messages transmitted by the secure session server with a private key known only to the secure session server may be used to provide security for the connection between the secure session server 420 and the key server 430.

In one embodiment, the secure connection 455 between the secure session server 420 and the key server 430 may be a Virtual Private Network (VPN) connection, which may be desirable in a firewalled environment.

Figure 5:
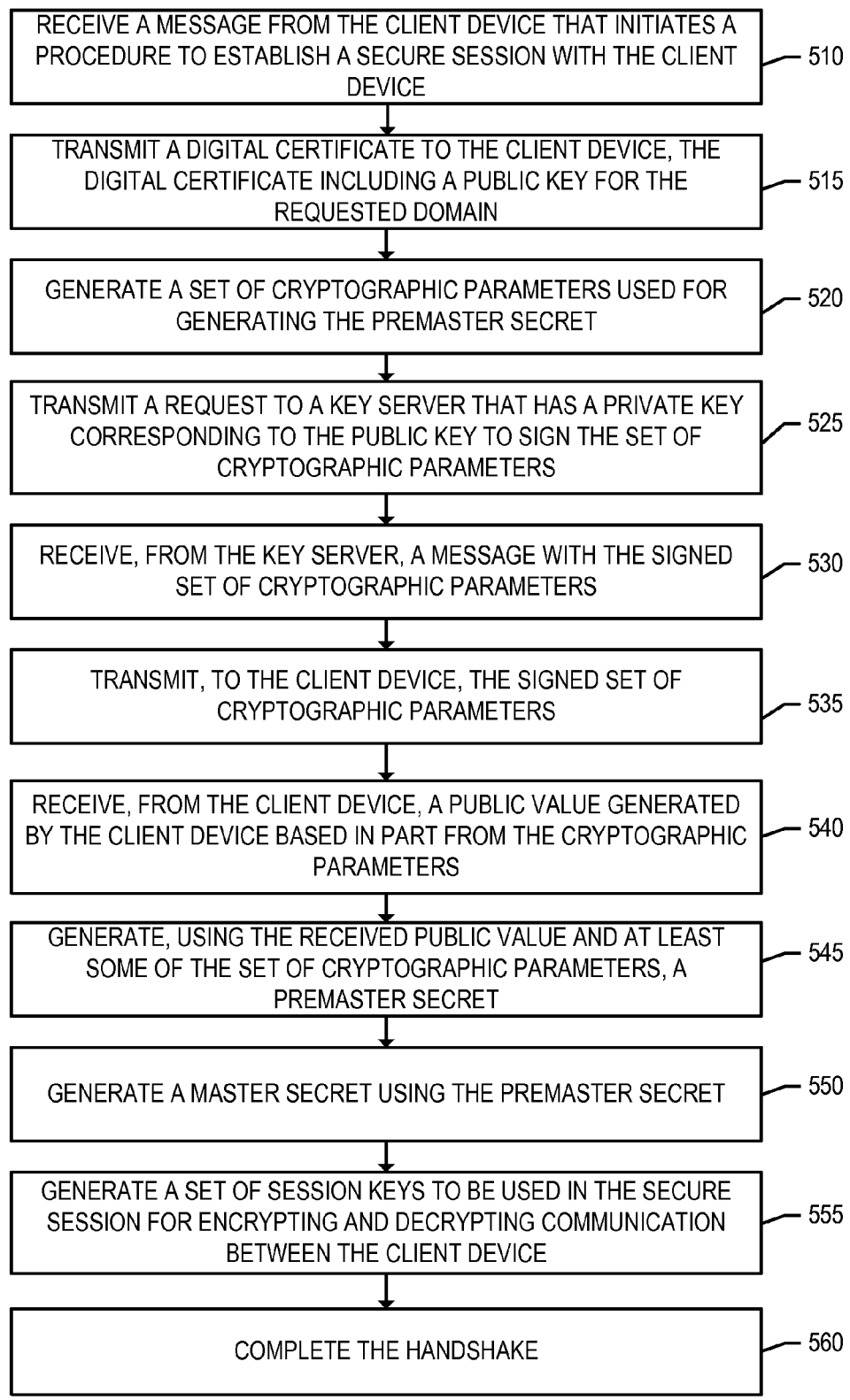
FIG. 5 is a flow diagram that illustrates exemplary operations for establishing a secure session implemented with public-key cryptography between a client device and a secure session server where the secure session server does not have access to the private key used during the secure session handshake according to one embodiment.

FIG. 5 is a flow diagram that illustrates exemplary operations for establishing a secure session implemented with public-key cryptography between a client device and a secure session server where the secure session server does not have access to the private key used during the secure session handshake according to one embodiment.

At operation 510, the secure session server receives a message from the client device that initiates a procedure to establish a secure session with the client device. For example, the secure session server may receive a Client Hello message from the client device (e.g., an SSL or TLS Client Hello message). Depending on the protocol and capabilities of the client device, the message may indicate the destination host name in which the client device wishes to establish a secure session (e.g., the Client Hello message may include the Server Name Indication (SNI) extension and specify the destination host name).

In response to receiving the message in operation 510, the secure session server may perform a number of operations, including transmitting a digital certificate to the client device at operation 515. The digital certificate includes a public key for the requested domain. It should be understood that the private key that corresponds to the public key is not stored on the secure session server (e.g., it is stored remotely on a key server). The digital certificate may be transmitted in an SSL or TLS Certificate message. Prior to transmitting the digital certificate, the secure session server may perform a number of other operations including transmitting a Server Hello message to the client device. If the message in operation 510 indicates the destination domain, the secure session server transmits the digital certificate bound to that destination domain. If the message in operation 510 does not indicate the destination host name, the secure session server transmits the digital certificate that is associated with the destination IP address of the message in operation 510, which is bound to the requested domain. Flow moves from operation 515 to operation 520.

In the embodiment of FIG. 5, the secure session server has selected a cipher suite that has a key exchange in which the certificate message transmitted by the secure session server does not include enough data to allow the client device to generate a premaster secret. For example, the selected cipher suite may use Diffie-Hellman as the key exchange mechanism (e.g., DHE_RSA, DHE_DSS, ECDHE_ECDSA, or ECDHE_RSA).

At operation 520, the secure session server generates a set of cryptographic parameters used for generating the premaster secret for the selected key exchange message. By way of a specific example where the key exchange mechanism is Diffie-Hellman such as DHE_DSS or DHE_RSA, the cryptographic parameters may include the following: the prime modulus used for the Diffie-Hellman operation (p), the generator used for the Diffie-Hellman operation (g), and a Diffie-Hellman public value of the secure session server ($g^X \mod p$, where X is the Diffie-Hellman private value selected by the secure session server). As another specific example where the key exchange mechanism is Ephemeral Elliptic Curve Diffie-Hellman (ECDHE) such as ECDHE_ECDSA or ECDHE_RSA, the cryptographic parameters include the Ephemeral ECDH public key and a specification of the corresponding curve (the corresponding elliptic curve domain parameters) (e.g., as defined in RFC 4492). Flow moves from operation 520 to operation 525.

The set of cryptographic parameters will be included in a message to be transmitted to the client device. Depending on the selected cipher suite, these cryptographic parameters may be required to be signed (e.g., with the private key that corresponds to the public key for the requested domain). The secure session server does not have local access to the private key (e.g., it is stored on a key server that is located remotely from the secure session server). At operation 525, the secure session server transmits a request to a key server to sign the set of cryptographic parameters with a private key that corresponds to the public key for the requested domain. In addition to the cryptographic parameters, the request may also include one or more random values that are also signed (e.g., the ClientHello.random and ServerHello.random values). The signed set of cryptographic parameters and other random values will be included in a message to the client device in which the client device authenticates. Flow moves from operation 525 to operation 530.

Figure 6:
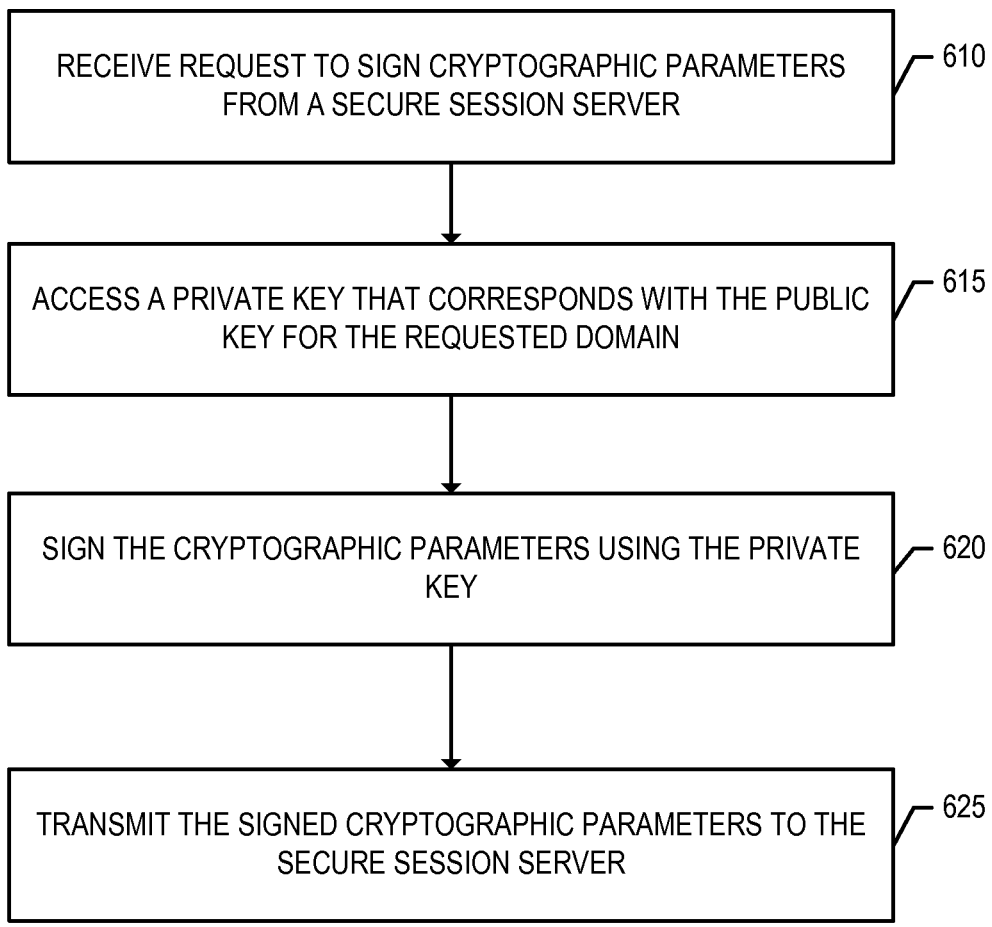
FIG. 6 is a flow diagram that illustrates exemplary operations performed by a key server in response to receiving a request to sign cryptographic parameters from a secure session server according to one embodiment.

FIG. 6 is a flow diagram that illustrates exemplary operations performed by a key server in response to receiving a request to sign cryptographic parameters from a secure session server according to one embodiment. At operation 610, the key server receives a request to sign cryptographic parameters from a secure session server. For example, the key server receives the request transmitted by the secure session server in operation 525 of FIG. 5.

Flow then moves to operation 615 where the key server accesses a private key that corresponds with the public key for the requested domain. The key server may receive an indication from the secure session server of the domain or zone name in which the client device is attempting to establish a secure session for. This indication may be transmitted in a number of different ways including in a header, a custom binary structure, or a serialization format (e.g., protobuf, JavaScript Object Notation (JSON), etc.). The key server uses this indication to access the private key that corresponds with the public key for the requested domain. Flow then moves to operation 620.

At operation 620, the key server signs the cryptographic parameters using the accessed private key. Flow then moves to operation 625 where the key server transmits the signed cryptographic parameters to the secure session server.

The key server may transmit the signed cryptographic parameters over a secure session. As part of establishing the secure session between the key server and the secure session server, the key server may request a client certificate from the secure session server in order to authenticate the identity of the secure session server. In some embodiments, the key server may use IP address based blocking to verify that the key server is communicating with a legitimate secure session server (e.g., by verifying that the secure session server is communicating with an IP address having a value that is expected by the key server). In some embodiments, the connection between the key server and the secure session server is a Virtual Private Network (VPN) connection. In some embodiments, the messages transmitted by the secure session server to the key server are signed with a private key that is known only to the secure session server. In such embodiments, the key server verifies the validity of the signature of a message prior to acting on that message. In some embodiments, any combination of these security techniques may be used.

Referring back to FIG. 5, at operation 530, the secure session server receives, from the key server, a message with the signed set of cryptographic parameters. Flow then moves to operation 535 where the secure session server transmits the signed set of cryptographic parameters to the client device. The signed set of cryptographic parameters may be transmitted to the client in a Server Key Exchange message. Flow moves from operation 535 to operation 540.

The client device will authenticate the information in the message (e.g., authenticate the signature) using the public key previously received from the server. Assuming that it is authenticated, the client device will generate the premaster secret using in part that information. The client device, however, does not communicate the premaster secret to the secure session server in this embodiment. Rather, it communicates the information necessary for the secure session server to generate the same premaster secret. For example, the client device transmits its Diffie-Hellman public value (generated in part from the set of cryptographic parameters received from the secure session server) to the secure session server. Thus, at operation 540, the secure session server receives a public value generated by the client device based in part on the cryptographic parameters (e.g., the client device's Diffie-Hellman public value). Flow moves from operation 540 to operation 545.

At operation 545, the secure session server generates the premaster secret (which should be the same premaster secret as generated by the client device) using the received public value and at least some of the cryptographic parameters. By way of a specific example, the secure session server generates the premaster secret by computing y^X mod p, where y is the public value of the client device, X is the private value of the secure session server, and p is the prime modulus value.

Flow moves from operation 545 to operation 550, where the secure session server generates a master secret using the premaster secret. The client device also generates the same master secret. Flow then moves to operation 555, where the secure session server generates a set of session keys to be used in the secure session when encrypting and decrypting information. By way of a specific example, the master secret is used to generate a client write Message Authentication Code (MAC) key, a server write MAC key, a client write encryption key, and a server write encryption key. A client write Initialization Vector (IV) and a server write IV may also be generated depending on the cipher used.

Flow moves from operation 555 to operation 560 where the secure session server completes the handshake with the client device and establishes a secure session with the client device. For example, the client device and secure session server each may transmit a Change Cipher Spec message and a Finished message, as previously described herein. While the secure session is in operation, the client device and secure session server may exchange data securely.

Figure 7:
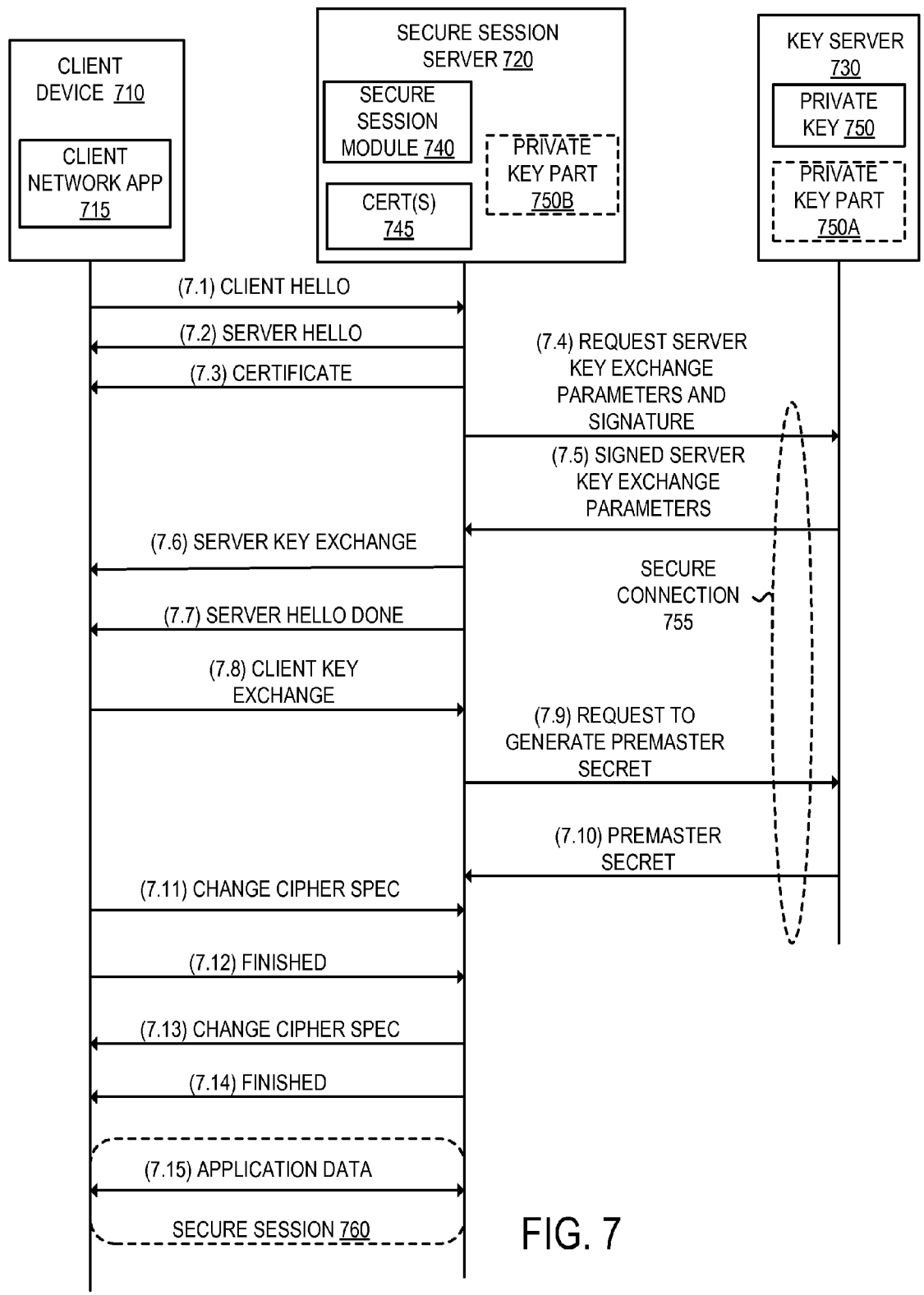
FIG. 7 illustrates another embodiment for establishing a secure session between a client device and a secure session server where the secure session server does not have access to the private key used during the secure session handshake.

FIG. 7 illustrates another embodiment for establishing a secure session between a client device and a secure session server where the secure session server does not have access to the private key used during the secure session handshake. Similar to the embodiment described in FIG. 4, the embodiment described in FIG. 7 describes the messages where the cipher suite chosen requires the use of a Server Key Exchange message (e.g., a Diffie-Hellman cipher suite is used such as DHE_RSA, DHE_DSS, ECDHE_RSA, or ECDHE_ECDSA). Unlike the embodiment described in FIG. 4, however, in the embodiment of FIG. 7, the key server generates the cryptographic parameters used during the key exchange. The client device 710 (including the client network application 715) is similar to the client device 110 of FIG. 1. The secure session server 720, including the secure session module 740 and the certificate(s) 745, are similar to the secure session server 120 (including the secure session module 140 and the certificate(s) 145), but perform different operations as will be described below. The key server 730 is similar to the key server 130 of FIG. 1, but performs different operations as will be described below.

At operation 7.1, the client device 710 transmits a Client Hello message to the secure session server 720. This Client Hello message is similar to the Client Hello message described in operation 1.1 of FIG. 1. In response to the Client Hello message, at operation 7.2 the secure session server 720 transmits a Server Hello message to the client device 710. This Server Hello message is similar to the Server Hello message described in operation 1.2 of FIG. 1. The secure session server 720 also transmits a Certificate message to the client device 710 at operation 7.3 (a server Certificate). This Certificate message is similar to the Certificate message described in operation 1.3 of FIG. 1, but it does not include enough data to allow the client device 710 to generate the premaster secret.

Although not illustrated in FIG. 7, the secure session server 720 has selected a cipher suite that has a key exchange in which the certificate message transmitted in operation 7.3 does not include enough data to allow the client device 710 to generate a premaster secret. For example, the selected cipher suite may use Diffie-Hellman as the key exchange mechanism (e.g., DHE_RSA, DHE_DSS, ECDHE_ECDSA, or ECDHE_RSA). Because of this, the secure session server 720 will transmit a message to the client device 710 that conveys cryptographic information to allow the client device 710 and the secure session server 720 to each generate the same premaster secret. By way of a specific example where the key exchange mechanism is Diffie-Hellman such as DHE_DSS or DHE_RSA, the cryptographic information includes a set of cryptographic parameters that may include the following: the prime modulus used for the Diffie-Hellman operation (p), the generator used for the Diffie-Hellman operation (g), and a Diffie-Hellman public value of the server (g^X mod p, where X is the Diffie-Hellman private value of the server). As another specific example where the key exchange mechanism is ECDHE such as ECDHE_ECDSA or ECDHE_RSA, the cryptographic parameters include the Ephemeral ECDH public key and a specification of the corresponding curve (the corresponding elliptic curve domain parameters) (e.g., as defined in RFC 4492). The message that conveys the cryptographic information is referred to as a Server Key Exchange message. The cryptographic information of the Server Key Exchange message may need to be signed with the private key 750 corresponding to the public key of the server transmitted in the Certificate message transmitted in operation 7.3 (e.g., if the key exchange mechanism is DHE_RSA, DHE_DSS, ECDHE_RSA, or ECDHE_ECDSA). For example, private key 750 may be used to sign the set of cryptographic parameters, the ClientHello.random value, and the ServerHello.random value. As similarly described with respect to the embodiment discussed in FIG. 1, the secure session server 720 does not have local access to this private key 750. As a result, the secure session server 720 cannot sign the Server Key Exchange message with this private key 750.

At operation 7.4 the secure session server 720 transmits a request to the key server 730 to generate and sign the cryptographic parameters to be used in the Server Key Exchange message. The key server 730 generates the cryptographic parameters (the secure session server 420 may transmit any other required information such as the ClientHello.random and ServerHello.random values that may be used when signing) and signs the result using the private key 750. In this embodiment, the private key 750 is typically an RSA key if the key exchange mechanism is DHE_RSA or ECDHE_RSA, and is typically a DSA key if the key exchange mechanism is DHE_DSS or an ECDSA key if the key exchange mechanism is ECDHE_ECDSA.

At operation 7.5, the key server 730 transmits the signed server key exchange parameters back to the secure session server 720. The secure session server 720 uses the signed parameters in the Server Key Exchange message transmitted to the client device 710 at operation 7.6. The secure session server 720 also transmits a Server Hello Done message to the client device 710 that indicates that the hello-message phase of the handshake is complete at operation 7.7.

In one embodiment, the key server 730 stores or has access to private keys for multiple domains and/or zones, which may be owned or controlled by different entities. For example, the key server 730 may store or have access to the private key for example.com and example2.com. In such an embodiment, the secure session server 720 indicates the domain or zone in which the client device 710 is requesting a connection. For example, if the client device 410 is requesting a secure session with example.com, then the secure session server 720 indicates to the key server 730 that example.com is the requested domain. The client device 710 may specify the destination domain using the SNI extension in the Client Hello message. If the destination is not specified by the client device 710 (e.g., the client device 710 does not support SNI), then the secure session server 720 matches the destination IP address of the client-hello message sent by the client device 710 with the corresponding hostname (e.g., the secure session server 720 may include a mapping of IP addresses and hostnames). The secure session server 720 may transmit the indication of the domain or zone name to the key server 730 in a number of different ways including in a header, a custom binary structure, or a serialization format (e.g., protobuf, JavaScript Object Notation (JSON), etc.). After receiving the indication of the domain or zone name in which the client is attempting to connect, the key server 730 accesses the corresponding private key. In another embodiment, a certificate fingerprint or a hash of the modulus (for RSA) may be used to identify the corresponding private key. For example, the secure session server 720 may generate a fingerprint over the certificate included in the Certificate message of operation 7.3 (e.g., a hash may be generated over the certificate) and transmit that fingerprint value to the key server 730. The key server 730 uses the same fingerprint algorithm to generate a fingerprint over its digital certificates and matches each to the corresponding private key. Upon receiving the fingerprint value from the secure session server 720, the key server 730 matches that fingerprint value with one of the fingerprint values it generated over the public certificate (the same public certificate included in the Certificate message of operation 7.3) to lookup the corresponding private key. As another example, the secure session server 720 may hash the modulus of the public key included in the certificate of the Certificate message of operation 74.3 and transmit that hash value to the key server 730. The key server 730 uses the same hash algorithm to generate a hash value over the modulus over its stored public keys and matches each to the corresponding private key. Upon receiving the hash value from the secure session server 720, the key server 730 matches that hash value with one of the hash values it generated to lookup the corresponding private key.

The client device 710 authenticates the information in the Server Key Exchange message using the corresponding public key (e.g., the public key received in the Certificate message transmitted in operation 7.3). Assuming that the information is authenticated, the client device 710 generates the premaster secret using that information. The client transmits the Client Key Exchange message in operation 7.8.

This Client Key Exchange message includes the information necessary for the key server 730 to generate the same premaster secret (e.g., it includes the client's Diffie-Hellman public value). The secure session server 720 transmits a request to the key server 730 to generate the premaster secret using the client's public value at operation 7.9. The key server 730 generates the premaster secret using the client's public value and transmits the premaster secret to the secure session server 720 at operation 7.10.

The secure session server 720 uses the premaster secret to calculate the master secret. The client device 710 and the secure session server 720 use the same algorithm and data to calculate the same master secret. By way of example, the master secret is calculated using a pseudorandom function that takes as input the premaster secret, the ClientHello.random value, and the ServerHello.random value. The master secret is used by the client device 710 and the secure session server 720 to generate session keys that are used to encrypt and decrypt information during the secure session. By way of a specific example, the master secret is used to generate a client write Message Authentication Code (MAC) key, a server write MAC key, a client write encryption key, and a server write encryption key. A client write Initialization Vector (IV) and a server write IV may also be generated depending on the cipher used.

At operation 7.11, the client device 710 transmits a Change Cipher Spec message to the secure session server 720. The Change Cipher Spec message from the client device 710 indicates that future messages transmitted by the client device 710 will be encrypted. At operation 7.12, the client device 710 transmits a Finished message to the secure session server 720. The Finished message is encrypted using the generated session keys. By way of example, the Finished message includes an encrypted hash of all of the messages in the handshake previously sent and received.

At operation 7.13, the secure session server 720 transmits a Change Cipher Spec message to the client device 710 that indicates that future messages transmitted by the secure session server 720 will be encrypted. At operation 7.14, the secure session server 720 transmits a Finished message to the client device 710. The Finished message may include an encrypted hash of all of the messages in the handshake previously sent and received.

After the Finished message of operation 7.14, the handshake is complete and the secure session 760 is considered to be established. At operation 7.15 future messages during the session between the client device 110 and secure session server 120 are encrypted over the secure session 760, which carry the application data of the connection.

In one embodiment, the messages transmitted in operations 7.4, 7.5, 7.9, and 7.10 are transmitted over a secure connection 755 (e.g., encrypted using SSL or TLS, or other mechanisms) and/or are otherwise encrypted.

As described above, a secure session (e.g., SSL or TLS) may be established between the secure session server 720 and the key server 730. As part of establishing the secure session, the key server 730 may request a client certificate from the secure session server 720 and the secure session server 720 may transmit a client Certificate message that includes its certificate to the key server 730. The data in the client Certificate message is used by the key server 730 to authenticate the identity of the secure session server 720.

In some embodiments, the key server 730 may use IP address blocking to accept connections (such as from the secure session server 720) from only certain IP addresses. For example, the key server 730 may have a whitelist of IP address(es) and/or IP address range(s) that are allowed to connect to the key server 730 or have a blacklist of IP address (es) and/or IP address range(s) that are not allowed to connect to the key server 730. IP address blocking may also be used at one or more intermediary network devices between the secure session server 720 and the key server 730.

Although a secure session has been described between the secure session server 720 and the key server 730 that is initiated by the secure session server 720, in other embodiments the secure session can be initiated by the key server 730.

In some embodiments, the messages transmitted by the secure session server 720 to the key server 730 are signed with a private key that is known only to the secure session server 720. In such embodiments, the key server 730 verifies the validity of the signature of a message prior to acting on that message. By way of example, the message that includes the request to sign the server key exchange parameters of operation 7.4 may be signed with a private key known only to the secure session server 720. The key server 730 verifies whether the signature is valid using the corresponding public key and will only continue with the operations if the signature is valid.

A combination of the security techniques described may be used. For example, a combination of requiring a client Certificate, IP address blocking, and signing the messages transmitted by the secure session server with a private key known only to the secure session server may be used to provide security for the connection between the secure session server 720 and the key server 730.

In one embodiment, the secure connection 755 between the secure session server 720 and the key server 730 may be a Virtual Private Network (VPN) connection, which may be desirable in a firewalled environment.

Figure 8:
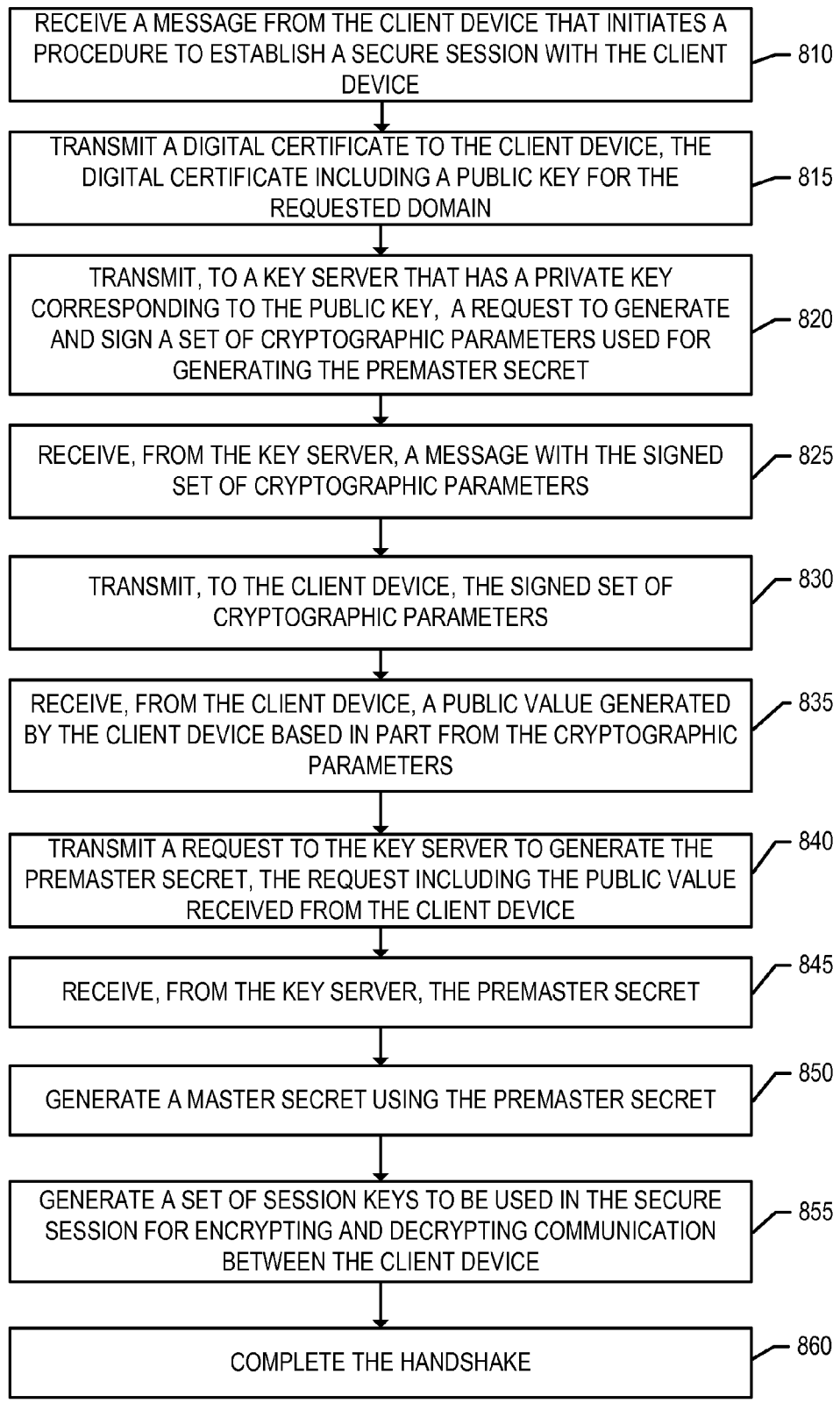
FIG. 8 is a flow diagram that illustrates exemplary operations for establishing a secure session implemented with public-key cryptography between a client device and a secure session server where the secure session server does not have access to the private key used during the secure session handshake according to another embodiment.

FIG. 8 is a flow diagram that illustrates exemplary operations for establishing a secure session implemented with public-key cryptography between a client device and a secure session server where the secure session server does not have access to the private key used during the secure session handshake according to another embodiment. At operation 810, the secure session server receives a message from the client device that initiates a procedure to establish a secure session with the client device. For example, the secure session server may receive a Client Hello message from the client device (e.g., an SSL or TLS Client Hello message). Depending on the protocol and capabilities of the client device, the message may indicate the destination host name in which the client device wishes to establish a secure session (e.g., the Client Hello message may include the Server Name Indication (SNI) extension and specify the destination host name).

In response to receiving the message in operation 810, the secure session server may perform a number of operations, including transmitting a digital certificate to the client device at operation 815. The digital certificate includes a public key for the requested domain. It should be understood that the private key that corresponds to the public key is not stored on the secure session server (e.g., it is stored remotely on a key server). The digital certificate may be transmitted in an SSL or TLS Certificate message. Prior to transmitting the digital certificate, the secure session server may perform a number of other operations including transmitting a Server Hello message to the client device. If the message in operation 810 indicates the destination domain, the secure session server transmits the digital certificate bound to that destination domain. If the message in operation 810 does not indicate the destination host name, the secure session server transmits the digital certificate that is associated with the destination IP address of the message in operation 810, which is bound to the requested domain. Flow moves from operation 815 to operation 820.

In the embodiment of FIG. 8, the secure session server has selected a cipher suite that has a key exchange in which the certificate message transmitted by the secure session server does not include enough data to allow the client device to generate a premaster secret. For example, the selected cipher suite may use Diffie-Hellman as the key exchange mechanism (e.g., DHE_RSA, DHE_DSS, ECDHE_ECDSA, or ECDHE_RSA).

In contrast to the embodiment described with reference to FIG. 5, the secure session server does not generate the set of cryptographic parameters used for generating the premaster secret. Instead, the key server generates these cryptographic parameters. At operation 820, the secure session server transmits a request to generate and sign a set of cryptographic parameters used for generating the premaster secret to the key server. The request may also include one or more random values that will also be signed (e.g., the ClientHello.random and ServerHello.random values). Flow moves from operation 820 to operation 825.

Figure 9:
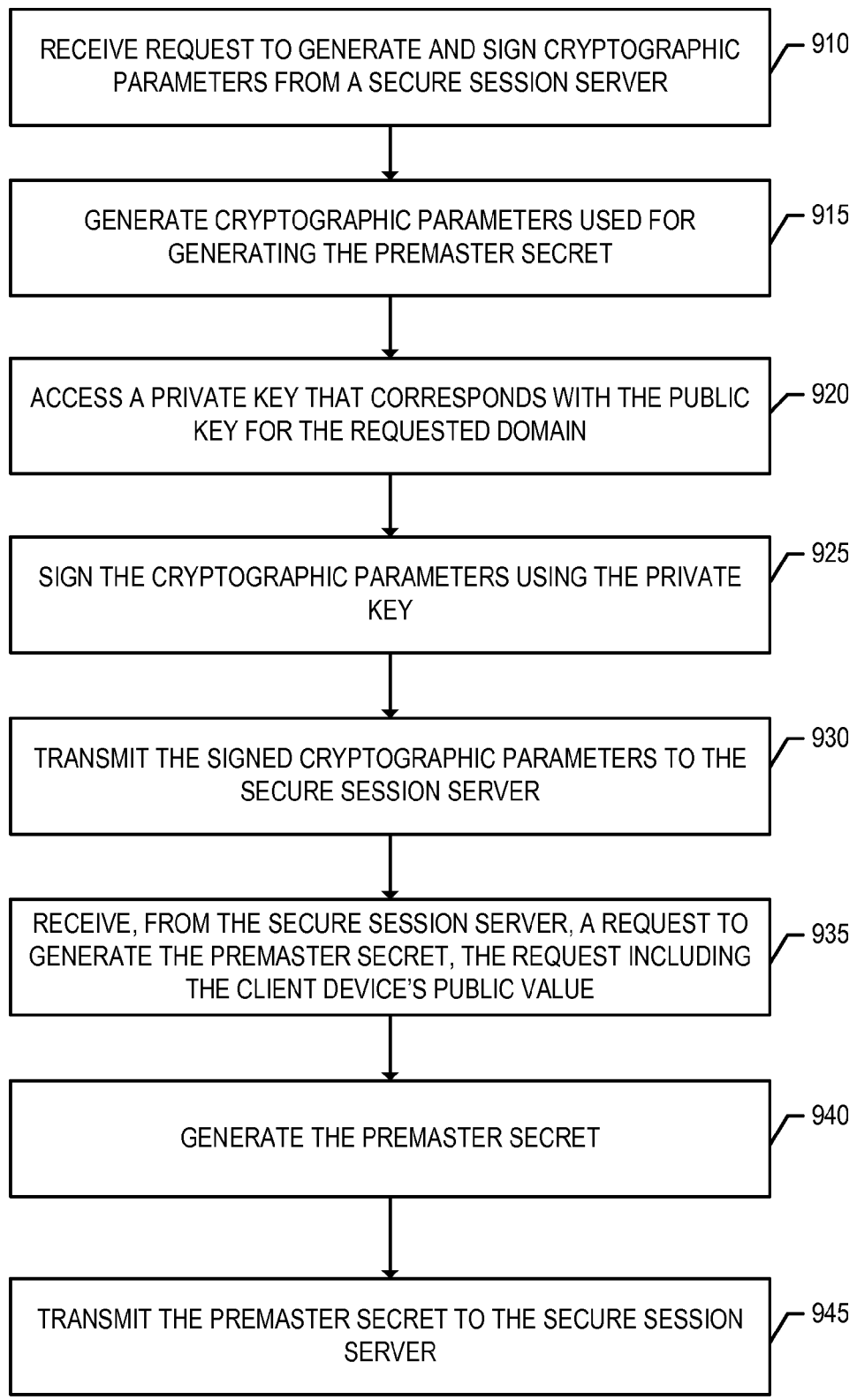
FIG. 9 is a flow diagram that illustrates exemplary operations performed by a key server according to one embodiment.

FIG. 9 is a flow diagram that illustrates exemplary operations performed by a key server according to one embodiment. At operation 910, the key server receives a request from a secure session server to generate and sign cryptographic parameters to be used during generating the premaster secret. For example, the key server receives the request transmitted by the secure session server in operation 820 of FIG. 8. Flow then moves to operation 915 where the key server generates the cryptographic parameters used for generating the premaster secret. By way of a specific example where the key exchange mechanism is Diffie-Hellman such as DHE_DSS or DHE_RSA, the cryptographic parameters may include the following: the prime modulus used for the Diffie-Hellman operation (p), the generator used for the Diffie-Hellman operation (g), and a Diffie-Hellman public value of the key server (g^X mod p, where X is the Diffie-Hellman private value selected by the key server). As another specific example where the key exchange mechanism is ECDHE such as ECDHE_ECDSA or ECDHE_RSA, the cryptographic parameters include the Ephemeral ECDH public key and a specification of the corresponding curve (the corresponding elliptic curve domain parameters) (e.g., as defined in RFC 4492). Flow moves from operation 915 to operation 920.

At operation 920, the key server accesses a private key that corresponds with the public key for the requested domain. The key server may receive an indication from the secure session server of the domain or zone name in which the client device is attempting to establish a secure session for. This indication may be transmitted in a number of different ways including in a header, a custom binary structure, or a serialization format (e.g., protobuf, JavaScript Object Notation (JSON), etc.). The key server uses this indication to access the private key that corresponds with the public key for the requested domain. Flow then moves to operation 925.

At operation 925, the key server signs the cryptographic parameters using the accessed private key. Flow then moves to operation 930 where the key server transmits the signed cryptographic parameters to the secure session server.

Referring back to FIG. 8, at operation 825, the secure session server receives a message with the signed set of cryptographic parameters from the key server. Flow then moves to operation 830 where the secure session server transmits the signed set of cryptographic parameters to the client device. The signed set of cryptographic parameters may be transmitted to the client in a Server Key Exchange message. Flow moves from operation 830 to operation 835.

The client device will authenticate the information in the message (e.g., authenticate the signature) using the public key previously received from the server. Assuming that it is authenticated, the client device will generate the premaster secret using in part that information. The client device, however, does not communicate the premaster secret to the secure session server in this embodiment. Rather, it communicates the information necessary for the secure session server to generate the same premaster secret. For example, the client device transmits its Diffie-Hellman public value (generated in part from the set of cryptographic parameters received from the secure session server) to the secure session server. Thus, at operation 835, the secure session server receives a public value generated by the client device based in part on the cryptographic parameters (e.g., the client device's Diffie-Hellman public value). Flow moves from operation 835 to operation 840.

At operation 840, the secure session server transmits a request to the key server to generate the premaster secret. This request includes the public value received from the client device.

Referring back to FIG. 9, the key server receives the request to generate the premaster secret in operation 935. Flow then moves to operation 940 and the key server generates the premaster secret using the received public value and at least some of the generated cryptographic parameters. For example, the key server generates the premaster secret by computing y^X mod p, where y is the public value of the client device, X is the private value of the key server, and p is the prime modulus value. Flow then moves to operation 945 where the key server transmits the premaster secret to the secure session server.

Referring back to FIG. 8, at operation 845, the secure session server receives the premaster secret from the key server. Flow then moves to operation 850 and the secure session server generates a master secret using the premaster secret. The client device also generates the same master secret. Flow then moves to operation 855, where the secure session server generates a set of session keys to be used in the secure session when encrypting and decrypting information. By way of a specific example, the master secret is used to generate a client write Message Authentication Code (MAC) key, a server write MAC key, a client write encryption key, and a server write encryption key. A client write Initialization Vector (IV) and a server write IV may also be generated depending on the cipher used.

Flow moves from operation 855 to operation 860 where the secure session server completes the handshake with the client device and establishes a secure session with the client device. For example, the client device and secure session server each may transmit a Change Cipher Spec message and a Finished message, as previously described herein. While the secure session is in operation, the client device and secure session server may exchange data securely.

The key server may transmit the signed cryptographic parameters and/or the premaster secret over a secure session. As part of establishing the secure session between the key server and the secure session server, the key server may request a client certificate from the secure session server in order to authenticate the identity of the secure session server. In some embodiments, the key server may use IP address based blocking to verify that the key server is communicating with a legitimate secure session server (e.g., by verifying that the secure session server is communicating with an IP address having a value that is expected by the key server). In some embodiments, the connection between the key server and the secure session server is a VPN connection. In some embodiments, the messages transmitted by the secure session server to the key server are signed with a private key that is known only to the secure session server. In such embodiments, the key server verifies the validity of the signature of a message prior to acting on that message. In some embodiments, any combination of these security techniques may be used.

In another embodiment, the secure session server may request the key server to generate and sign the cryptographic parameters necessary to generate the premaster secret and may also request and receive the key server's chosen private value used to generate the premaster secret. In such an embodiment, the secure session server can generate the premaster secret using the client device's Diffie-Hellman public value and the Diffie-Hellman private value chosen by the key server.

In another embodiment that is similar to the embodiment described with reference to FIG. 7, the key server also generates the master secret in addition to generating the premaster secret. In such an embodiment, the secure session server also transmits to the key server other information that may be necessary to generate the master secret in addition to the premaster secret such as the client's Diffie-Hellman public value (used to generate the premaster secret), the ClientHello.random value (included in the Client Hello message of operation 7.1), and the ServerHello.random value (included in the Server Hello message of operation 7.2) if not already transmitted to the key server. By way of example, the master secret is calculated using a pseudorandom function that takes at least as input the premaster secret, the ClientHello.random value, and the ServerHello.random value. In such an embodiment, the key server may transmit the generated master secret to the secure session server which will proceed with the rest of the handshake without being required to generate the master secret.

In another embodiment that is similar to the embodiment described with reference to FIG. 7, the key server generates the master secret and generates the session keys that will be used in the secure session between the client device and the secure session server in addition to generating the premaster secret. In such an embodiment, the secure session server also transmits to the key server any necessary information to the key server to generate the master secret and the session keys in addition to generating the premaster secret. For example, this information may include the client's Diffie-Hellman public value (which the key server uses to generate the premaster secret), the ClientHello.random value, the ServerHello.random value, and an indication of the negotiated cipher suite (e.g., the information may specify the negotiated cipher suite that defines the cipher specification (the key server may look up the parameters of the cipher specification) or may specify parameters of the negotiated cipher suite for generating the session keys including information identifying the pseudo-random function (PRF) algorithm, encrypted key length, fixed IV length, and MAC key length) if they are not already transmitted to the key server.

The key server generates the premaster secret and the master secret as previously described herein. The session keys may be generated using the PRF that takes as input the master secret, the ClientHello.random value, the ServerHello.random value, and a label (e.g., a Key Expansion label) to generate a key block that is partitioned into the client write MAC key, server write MAC key, client write encryption key, and server write encryption key. The key server transmits the session keys to the secure session server for use in the secure session between the client device and the secure session server. The key server may also transmit the master secret to the secure session server for use verifying that the key exchange was successful and also for resuming sessions.

Figure 10:
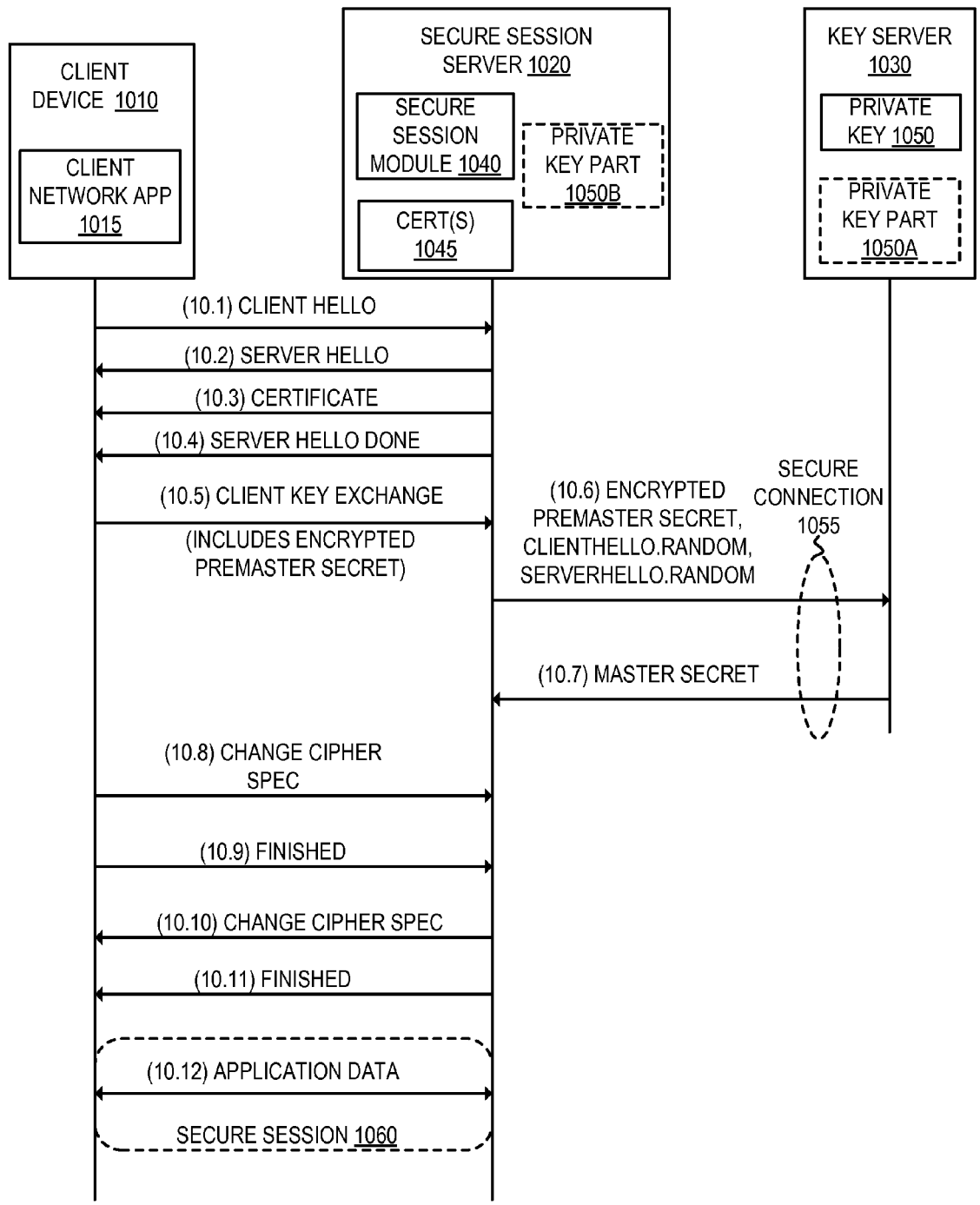
FIG. 10 illustrates exemplary messages for establishing a secure session using public-key cryptography between a client device and a secure session server where the secure session server does not have access to the private key used during the secure session handshake according to another embodiment.

FIG. 10 illustrates exemplary messages for establishing a secure session using public-key cryptography between a client device 1010 and a secure session server 1020 where the secure session server 1020 does not have access to the private key used during the secure session handshake according to another embodiment. The embodiment described with reference to FIG. 10 is similar to the embodiment described with reference to FIG. 1 with the exception that in addition to transmitting the encrypted premaster secret to the key server, the secure session server 1020 also transmits the ClientHello.random value and the ServerHello.random value to the key server 1030, and the key server 1030 decrypts the encrypted premaster secret and generates the master secret.

The client device 1010 (including the client network application 1015) is similar to the client device 110 of FIG. 1. The secure session server 1020, including the secure session module 1040 and the certificate(s) 1045, are similar to the secure session server 120 (including the secure session module 140 and the certificate(s) 145), but perform different operations as will be described below. The key server 1030 is similar to the key server 130 of FIG. 1, but performs different operations as will be described below.

At operation 10.1, the client device 1010 transmits a Client Hello message to the secure session server 1020. This Client Hello message is similar to the Client Hello message described in operation 1.1 of FIG. 1 and transmitted to the secure session server 1020 for similar reasons. The Client Hello message includes, among other data, a ClientHello.random value.

In response to the Client Hello message, at operation 10.2 the secure session server 1020 transmits a Server Hello message to the client device 1010. This Server Hello message is similar to the Server Hello message described in operation 1.2 of FIG. 1. The Server Hello message includes, among other data, a ServerHello.random value.

The secure session server 1020 also transmits a Certificate message to the client device 1010 at operation 10.3 (a server Certificate). This Certificate message is similar to the Certificate message described in operation 1.3 of FIG. 1. The Certificate message includes a digital certificate for the requested domain. For example, if the requested domain is example.com, the Certificate message includes a digital certificate bound to example.com. The digital certificate includes, among other things, a public key. The secure session server 1020 does not store the private key that corresponds with the public key included in the certificate.

At operation 10.4, the secure session server 1020 transmits a Server Hello Done message to the client device 1010 that indicates that the hello-message phase of the handshake is complete.

At operation 10.5, the client device 1010 transmits a Client Key Exchange message to the secure session server 1020. The Client Key Exchange message includes a random value called a premaster secret that has been encrypted using the public key included in the Certificate message of operation 10.3. By way of a specific example, if the RSA algorithm is being used for key agreement and authentication, the client device 1010 generates a 48-byte value for the premaster secret and encrypts it using the public key from the server's certificate and transmits the encrypted premaster secret to the secure session server 1020. As will be described below, the decrypted premaster secret is used to generate a shared secret between the client device 1010 and the secure session 1020 (called the master secret), which is then used when generating the encryption and decryption keys used to encrypt and decrypt data transmitted during the secure session. It should be understood that if the encrypted premaster secret cannot be decrypted, then the handshake will fail and the secure session will not be established.

The secure session server 1020 does not have the private key to decrypt the premaster secret. However, the private key is stored on the key server 1030 (as one of the private key(s) 1050). Although FIG. 10 illustrates the key server 1030 storing the private keys, in other embodiments the key server 1030 has access to the private keys but those private keys are stored on a different device.

At operation 10.6, the secure session server 1020 transmits the encrypted premaster secret to the key server 1030. In addition to the encrypted premaster secret, the secure session server 1020 also transmits the ClientHello.random value and the ServerHello.random value to the key server 1030 in operation 10.6.

The key server 1030 decrypts the encrypted premaster secret using the appropriate private key for the requested domain. The key server 1030 uses the decrypted premaster secret to calculate the master secret. The client device 1010 and the key server 1030 use the same algorithm and data to calculate the same master secret. By way of example, the master secret is calculated using a pseudorandom function that takes as input the premaster secret, the ClientHello.random value, and the ServerHello.random value.

After generating the master secret, the key server 1030 transmits the master secret to the secure session server 1020 at operation 10.7. In one embodiment, the messages of operations 10.6 and 10.7 are transmitted over a secure connection 1055 (e.g., encrypted using SSL or TLS, or other mechanisms) and/or the encrypted premaster secret and the decrypted premaster secret are otherwise encrypted.

In one embodiment, the key server 1030 stores or has access to private keys for multiple domains and/or zones, which may be owned or controlled by different entities. For example, the key server 1030 may store or have access to the private key for example.com and example2.com, which may be owned or controlled by different entities. In such an embodiment, in conjunction with transmitting the encrypted premaster secret to the key server 1030, the secure session server 1020 indicates the domain or zone in which the client device 1010 is requesting a connection. For example, if the client device 1010 is requesting a secure session with example.com, then the secure session server 1020 indicates to the key server 1030 that example.com is the requested domain. The client device 1010 may specify the destination domain using the Server Name Indication (SNI) extension in the Client Hello message. SNI is described in RFC 3546, June 2003. If the destination is not specified by the client device 1010 (e.g., the client device 1010 does not support SNI), then the secure session server 1020 matches the destination IP address of the client-hello message sent by the client device 1010 with the corresponding hostname (e.g., the secure session server 1020 may include a mapping of IP addresses and hostnames). The secure session server 1020 may transmit the indication of the domain or zone name to the key server 1030 in a number of different ways including in a header, a custom binary structure, or a serialization format (e.g., protobuf, JavaScript Object Notation (JSON), etc.). After receiving the indication of the domain or zone name in which the client is attempting to connect, the key server 1030 accesses the corresponding private key and decrypts the encrypted premaster secret. In another embodiment, a certificate fingerprint or a hash of the modulus (for RSA) may be used to identify the corresponding private key. For example, the secure session server 1020 may generate a fingerprint over the certificate included in the Certificate message of operation 10.3 (e.g., a hash may be generated over the certificate) and transmit that fingerprint value to the key server 1030. The key server 1030 uses the same fingerprint algorithm to generate a fingerprint over its digital certificates and matches each to the corresponding private key. Upon receiving the fingerprint value from the secure session server 1020, the key server 1030 matches that fingerprint value with one of the fingerprint values it generated over the public certificate (the same public certificate included in the Certificate message of operation 10.3) to lookup the corresponding private key. As another example, the secure session server 1020 may hash the modulus of the public key included in the certificate of the Certificate message of operation 10.3 and transmit that hash value to the key server 1030. The key server 1030 uses the same hash algorithm to generate a hash value over the modulus over its stored public keys and matches each to the corresponding private key. Upon receiving the hash value from the secure session server 1020, the key server 1030 matches that hash value with one of the hash values it generated to lookup the corresponding private key.

The master secret is used by the client device 1010 and the secure session server 1020 to generate session keys that are used to encrypt and decrypt information during the secure session. By way of a specific example, the master secret is used to generate a client write Message Authentication Code (MAC) key, a server write MAC key, a client write encryption key, and a server write encryption key. A client write Initialization Vector (IV) and a server write IV may also be generated depending on the cipher used.

At operation 10.8, the client device 1010 transmits a Change Cipher Spec message to the secure session server 1020. The Change Cipher Spec message from the client device 1010 indicates that future messages transmitted by the client device 1010 will be encrypted. At operation 10.9, the client device 1010 transmits a Finished message to the secure session server 1020. The Finished message is encrypted using the generated session keys. By way of example, the Finished message includes an encrypted hash of all of the messages in the handshake previously sent and received.

At operation 10.10, the secure session server 1020 transmits a Change Cipher Spec message to the client device 1010 that indicates that future messages transmitted by the secure session server 1020 will be encrypted. At operation 10.11, the secure session server 1020 transmits a Finished message to the client device 1010. The Finished message may include an encrypted hash of all of the messages in the handshake previously sent and received.

After the Finished message of operation 10.11, the handshake is complete and the secure session 1060 is considered to be established. At operation 10.12, future messages of the secure session between the client device 1010 and secure session server 1020 are encrypted over the secure session 1060, which carry the application data of the connection.

As described above, the connection between the secure session server 1020 and the key server 1030 may be a secure connection for securely transmitting the decrypted premaster secret and optionally securely transmitting the encrypted premaster secret. As described above, a secure session (e.g., SSL or TLS) may be established between the secure session server 1020 and the key server 1030. As part of establishing the secure session, the key server 1030 may request a client certificate from the secure session server 1020 and the secure session server 1020 may transmit a client Certificate message that includes its certificate to the key server 1030. The data in the client Certificate message is used by the key server 1030 to authenticate the identity of the secure session server 1020.

In some embodiments, the key server 1030 may use IP address blocking to accept connections (such as from the secure session server 1020) from only certain IP addresses. For example, the key server 1030 may have a whitelist of IP address(es) and/or IP address range(s) that are allowed to connect to the key server 1030 or have a blacklist of IP address(es) and/or IP address range(s) that are not allowed to connect to the key server 1030. IP address blocking may also be used at one or more intermediary network devices between the secure session server 1020 and the key server 1030.

Although a secure session has been described between the secure session server 1020 and the key server 1030 that is initiated by the secure session server 1020, in other embodiments the secure session can be initiated by the key server 1030.

In some embodiments, the messages transmitted by the secure session server 1020 to the key server 1030 are signed with a private key that is known only to the secure session server 1020. In such embodiments, the key server 1030 verifies the validity of the signature of a message prior to acting on that message. By way of example, the message that includes the encrypted premaster secret at operation 10.6 may be signed with a private key known only to the secure session server 1020. The key server 1030 verifies whether the signature is valid using the corresponding public key and will only continue with the operations if the signature is valid.

A combination of the security techniques described may be used to provide security for the decrypted premaster secret. For example, a combination of requiring a client Certificate, IP address blocking, and signing the messages transmitted by the secure session server with a private key known only to the secure session server may be used to provide security for the connection between the secure session server 1020 and the key server 1030.

In one embodiment, the secure connection 1055 between the secure session server 1020 and the key server 1030 may be a Virtual Private Network (VPN) connection, which may be desirable in a firewalled environment.

Figure 11:
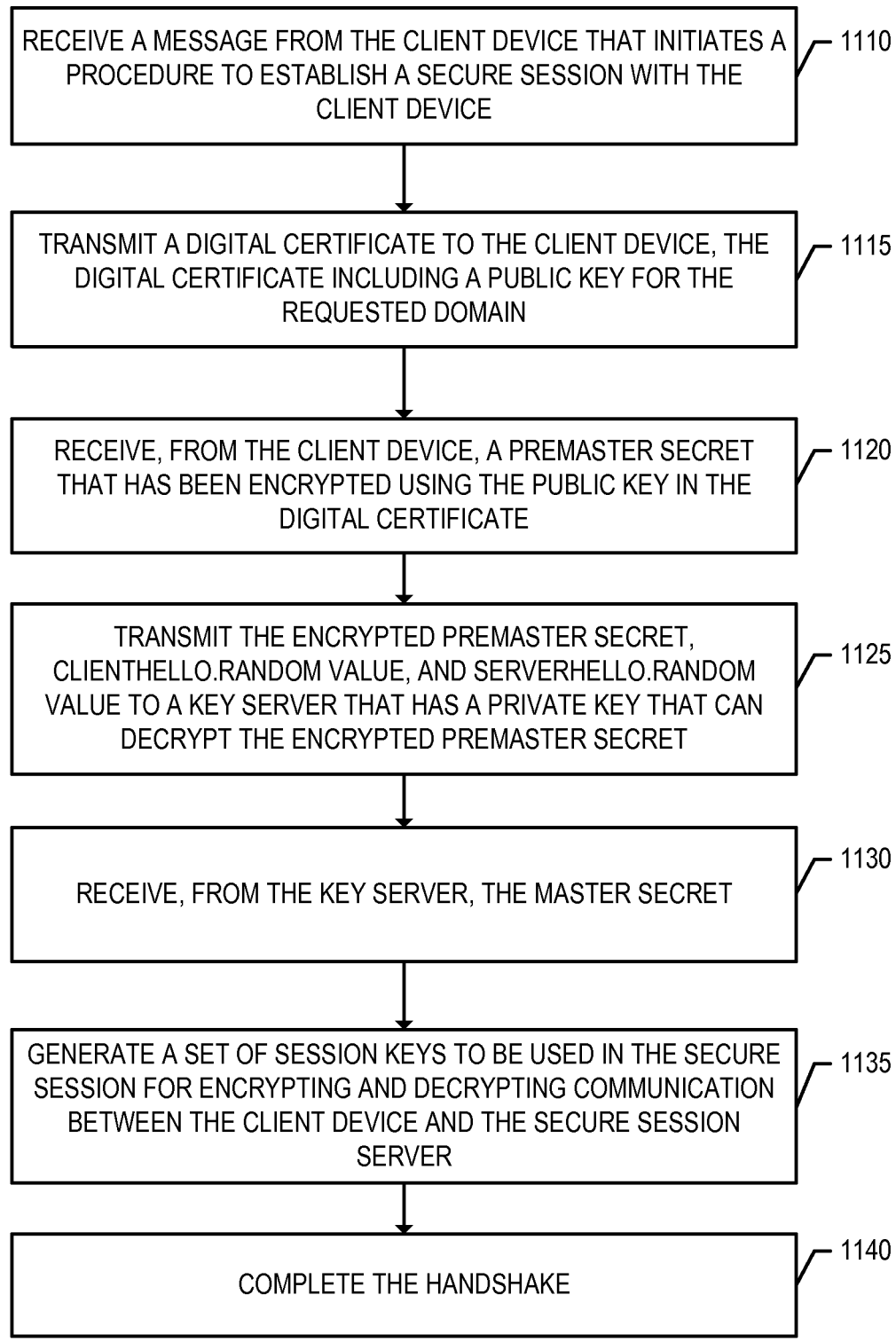
FIG. 11 is a flow diagram that illustrates exemplary operations performed on a secure session server for establishing a secure session implemented with public-key cryptography between a client device and the secure session server where the secure session server does not have access to a private key for the requested domain according to one embodiment.

FIG. 11 is a flow diagram that illustrates exemplary operations performed on a secure session server for establishing a secure session implemented with public-key cryptography between a client device and the secure session server where the secure session server does not have access to a private key for the requested domain according to another embodiment. The private key is stored remotely from the secure session server (e.g., on a key server). The embodiment described with reference to FIG. 11 is similar to the embodiment described with reference to FIG. 2 with the exception that in addition to transmitting the encrypted premaster secret to the key server, the secure session server also transmits the ClientHello.random value and the ServerHello.random value to the key server and the key server decrypts the encrypted premaster secret and generates the master secret.

At operation 1110, the secure session server receives a message from the client device that initiates a procedure to establish a secure session with the client device. For example, the secure session server may receive a Client Hello message from the client device (e.g., an SSL or TLS Client Hello message). Depending on the protocol and capabilities of the client device, the message may indicate the destination host name in which the client device wishes to establish a secure session (e.g., the Client Hello message may include the Server Name Indication (SNI) extension and specify the destination host name). The message may also include random data used for cryptographic purposes (sometimes referred to as ClientHello.random), and may indicate whether and what type of extensions (defined by the protocol) the client supports.

In response to receiving the message in operation 1110, the secure session server may perform a number of operations, including transmitting a digital certificate to the client device at operation 1115. The digital certificate includes a public key for the requested domain. It should be understood that the private key that corresponds to the public key is not stored on the secure session server (e.g., it is stored remotely on a key server). The digital certificate may be transmitted in an SSL or TLS Certificate message. Prior to transmitting the digital certificate, the secure session server may perform a number of other operations including transmitting a Server Hello message to the client device which includes random data used for cryptographic purposes that is different than the random data included in the ClientHello message (sometimes referred to as ServerHello.random) and may include a list of the extensions that the secure session server supports.

If the message in operation 1110 indicates the destination domain, the secure session server transmits the digital certificate bound to that destination domain. If the message in operation 1110 does not indicate the destination host name, the secure session server transmits the digital certificate that is associated with the destination IP address of the message in operation 1110, which is bound to the requested domain. Flow moves from operation 1115 to operation 1120.

At operation 1120, the secure session server receives from the client device a premaster secret that has been encrypted using the public key in the digital certificate transmitted in operation 1115. The encrypted premaster secret may be sent by the client device in a SSL or TLS Client Key Exchange message. Flow moves from operation 1120 to operation 1125.

The secure session server does not have the private key that corresponds with the public key that encrypted the premaster secret. As a result, the secure session server cannot decrypt the encrypted premaster secret to obtain the premaster secret. At operation 1125, the secure session server transmits the encrypted premaster secret, the ClientHello.random value, and the ServerHello.random value to a key server that has the private key that can decrypt the encrypted premaster secret.

In one embodiment, the key server is located remotely from the secure session server. Moreover, in some embodiments, the secure session server and the key server may be owned and/or operated by different entities. For example, the secure session server may not be under physical control of the owner of the requested domain while the key server is under physical control of the owner of the requested domain. In one embodiment, the encrypted premaster secret, the ClientHello.random value, and the ServerHello.random value are transmitted to the key server over a secure connection (e.g., encrypted using SSL or TLS) and/or is otherwise encrypted. Flow moves from operation 1125 to operation 1130.

Figure 12:
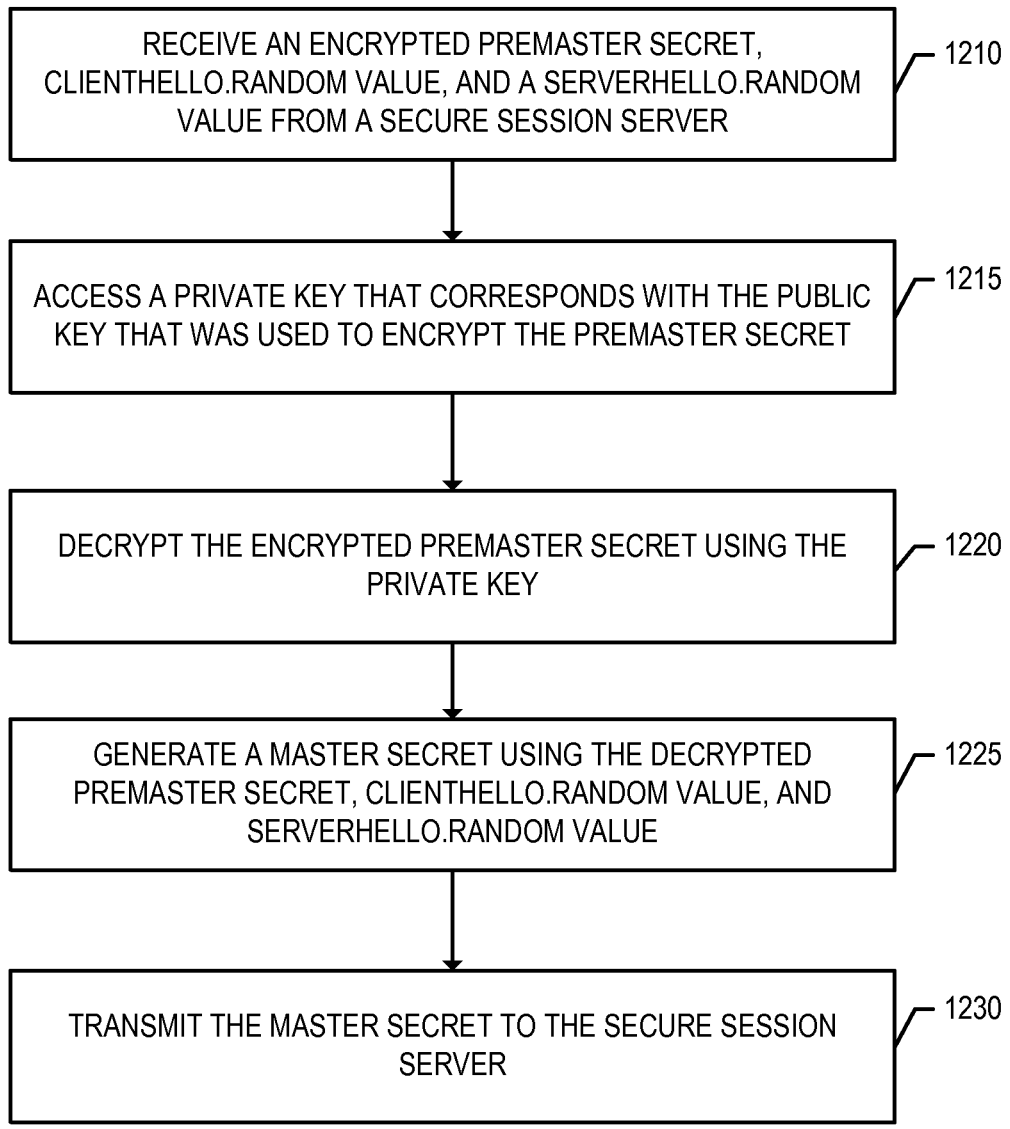
FIG. 12 is a flow diagram that illustrates exemplary operations performed by a key server for establishing a secure session according to one embodiment.

In response to receiving the encrypted premaster secret, the key server decrypts the encrypted premaster secret to obtain the premaster secret. In addition, the key server generates the master secret using the premaster secret, the ClientHello.random value, and the ServerHello.random value. FIG. 12 is a flow diagram that illustrates exemplary operations performed by a key server in response to receiving an encrypted premaster secret, a ClientHello.random value, and a ServerHello.random value from a secure session server according to one embodiment.

At operation 1210, the key server receives an encrypted premaster secret, a ClientHello.random value, and a ServerHello.random value from the secure session server. For example, the key server receives the encrypted premaster secret, ClientHello.random value, and ServerHello.random value transmitted by the secure session server in operation 1125 of FIG. 11.

Flow then moves to operation 1215 where the key server accesses a private key that corresponds with the public key that was used to encrypt the premaster secret. The key server may receive from the secure session server an indication of the domain or zone name in which the client device is attempting to establish a secure session for. This indication may be transmitted in a number of different ways including in a header, a custom binary structure, or a serialization format (e.g., protobuf, JavaScript Object Notation (JSON), etc.). The key server uses this indication to access the private key that corresponds with the public key that encrypted the premaster secret.

Flow then moves to operation 1220 where the key server decrypts the encrypted premaster secret using the accessed private key. Flow then moves to operation 1225 where the key server generates a master secret using the decrypted premaster secret, the ClientHello.random value, and the ServerHello.random value. By way of example, the master secret is calculated using a pseudorandom function that takes as input at least the premaster secret, the ClientHello.random value, and the ServerHello.random value. The client device will use the same pseudorandom function over the same input to compute the same master secret.

Flow then moves to operation 1230 where the key server transmits the generated master secret to the secure session server. The transmission of the master secret to the secure session server may be over a secure session between the secure session server and the key server and/or may itself be encrypted in a way that can be decrypted by the secure session server. If the transmission is over a secure session between the key server and the secure session server, as part of establishing that secure session the key server may request a client certificate from the secure session server in order to authenticate the identity of the secure session server. In some embodiments, the key server may use IP address based blocking to verify that the key server is communicating with a legitimate secure session server (e.g., by verifying that the secure session server is communicating with an IP address having a value that is expected by the key server). In some embodiments, the connection between the key server and the secure session server is a VPN connection. In some embodiments, the messages transmitted by the secure session server to the key server are signed with a private key that is known only to the secure session server. In such embodiments, the key server verifies the validity of the signature of a message prior to acting on that message. In some embodiments, any combination of these security techniques may be used.

Referring back to FIG. 11, at operation 1130, the secure session server receives the master secret from the key server. In one embodiment, the master secret is transmitted to the key server over a secure connection (e.g., encrypted using SSL or TLS) and/or is otherwise encrypted such that the secure session server is able to decrypt the message containing the master secret. Flow moves from operation 1130 to operation 1135.

After receiving the master secret from the key server, the secure session server can proceed with the secure session handshake with the client device and establish the secure session. At operation 1135, the secure session server uses the master secret to generate a set of session keys to be used in the secure session when encrypting and decrypting information. By way of a specific example, the master secret is used to generate a client write Message Authentication Code (MAC) key, a server write MAC key, a client write encryption key, and a server write encryption key. A client write Initialization Vector (IV) and a server write IV may also be generated depending on the cipher used.

Flow moves from operation 1135 to operation 1140 where the secure session server completes the handshake with the client device and establishes a secure session with the client device. For example, the client device and secure session server each may transmit a Change Cipher Spec message and a Finished message, as previously described herein. While the secure session is in operation, the client device and secure session server may exchange data securely.

Figure 13:
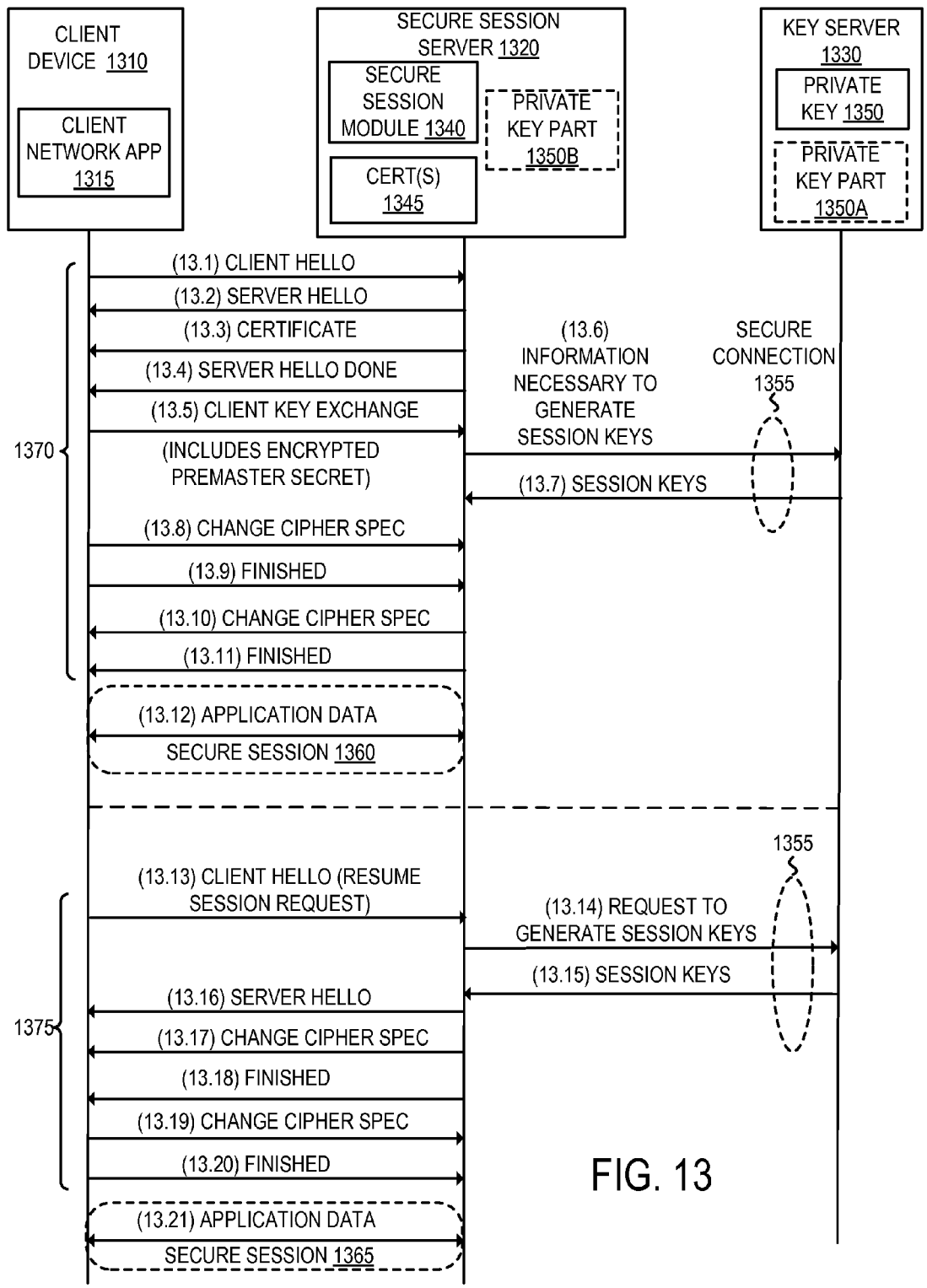
FIG. 13 illustrates exemplary messages for establishing a secure session using public-key cryptography between a client device and a secure session server where the secure session server does not have access to the private key used during the secure session handshake according to another embodiment.

While FIGS. 10, 11, and 12 were described with respect to the key server transmitting the master secret to the secure session server where the secure session server generates the session keys used in the secure session, in other embodiments the key server also generates the session keys and transmits the session keys to the secure session server. FIG. 13 illustrates exemplary messages for establishing a secure session using public-key cryptography between a client device 1310 and a secure session server 1320 where the secure session server 1320 does not have access to the private key used during the secure session handshake according to another embodiment. The embodiment described with reference to FIG. 13 is similar to the embodiment described with reference to FIG. 10 with a difference that the key server 1330 generates and transmits the session keys to the secure session server 1320 that are to be used in the secure session between the client device 1310 and the secure session server 1320. For example, the secure session server 1320 transmits the necessary information to generate the session keys to the key server 1330 in addition to the encrypted premaster secret.

The client device 1310 (including the client network application 1315) is similar to the client device 110 of FIG. 1. The secure session server 1320, including the secure session module 1340 and the certificate(s) 1345, are similar to the secure session server 120 (including the secure session module 140 and the certificate(s) 145), but perform different operations as will be described below. The key server 1330 is similar to the key server 130 of FIG. 1, but performs different operations as will be described below.

At operation 13.1, the client device 1310 transmits a Client Hello message to the secure session server 1320. This Client Hello message is similar to the Client Hello message described in operation 1.1 of FIG. 1 and transmitted to the secure session server 1320 for similar reasons. The Client Hello message includes, among other data, a ClientHello.random value.

In response to the Client Hello message, at operation 13.2 the secure session server 1320 transmits a Server Hello message to the client device 1310. This Server Hello message is similar to the Server Hello message described in operation 1.2 of FIG. 1. The Server Hello message includes, among other data, a ServerHello.random value.

The secure session server 1320 also transmits a Certificate message to the client device 1310 at operation 13.3 (a server Certificate). This Certificate message is similar to the Certificate message described in operation 1.3 of FIG. 1. The Certificate message includes a digital certificate for the requested domain. For example, if the requested domain is example.com, the Certificate message includes a digital certificate bound to example.com. The digital certificate includes, among other things, a public key. The secure session server 1320 does not store the private key that corresponds with the public key included in the certificate.

At operation 13.4, the secure session server 1320 transmits a Server Hello Done message to the client device 1310 that indicates that the hello-message phase of the handshake 1370 is complete.

At operation 13.5, the client device 1310 transmits a Client Key Exchange message to the secure session server 1320. The Client Key Exchange message includes a random value called a premaster secret that has been encrypted using the public key included in the Certificate message of operation 13.3. By way of a specific example, if the RSA algorithm is being used for key agreement and authentication, the client device 1310 generates a 48-byte value for the premaster secret and encrypts it using the public key from the server's certificate and transmits the encrypted premaster secret to the secure session server 1320. As will be described below, the decrypted premaster secret is used to generate a master secret that is used when generating the encryption and decryption keys used to encrypt and decrypt data transmitted during the secure session. It should be understood that if the encrypted premaster secret cannot be decrypted, then the handshake will fail and the secure session will not be established.

The secure session server 1320 does not have the private key to decrypt the premaster secret. However, the private key is stored on the key server 1330 (as one of the private key(s) 1350). Although FIG. 13 illustrates the key server 1330 storing the private keys, in other embodiments the key server 1330 has access to the private keys but those private keys are stored on a different device.

At operation 13.6, the secure session server 1320 transmits to the key server 1330 the necessary information to generate the session keys to be used in the secure session. For example, this information may include the encrypted premaster secret (which the key server 1330 decrypts using the private key 1350 which is then used to generate the master secret), the ClientHello.random value, the ServerHello.random value, and an indication of the negotiated cipher suite (e.g., the information may specify the negotiated cipher suite that defines the cipher specification (the key server may look up the parameters of the cipher specification) or may specify parameters of the negotiated cipher suite for generating the session keys including information identifying the pseudo-random function (PRF) algorithm, encrypted key length, fixed IV length, and MAC key length) if they are not already transmitted to the key server 1330. The key server 1330 decrypts the encrypted premaster secret using the appropriate private key for the requested domain. The key server 1330 uses the decrypted premaster secret to calculate the master secret. The client device 1310 and the key server 1330 use the same algorithm and data to calculate the same master secret. By way of example, the master secret is calculated using a pseudorandom function that takes as input the premaster secret, the ClientHello.random value, and the ServerHello.random value.

After generating the master secret, the key server 1330 uses the master secret and the information sent in operation 13.6 to generate session keys that are used to encrypt and decrypt information during the secure session. By way of a specific example, a client write Message Authentication Code (MAC) key, a server write MAC key, a client write encryption key, and a server write encryption key is generated. A client write Initialization Vector (IV) and a server write IV may also be generated depending on the cipher used.

After generating the session keys, the key server 1330 transmits the session keys to the secure session server 1320 at operation 13.7. In one embodiment, the messages of operations 13.6 and 13.7 are transmitted over a secure connection 1355 (e.g., encrypted using SSL or TLS, or other mechanisms) and/or the data itself is otherwise encrypted.

In one embodiment, the key server 1330 stores or has access to private keys for multiple domains and/or zones, which may be owned or controlled by different entities. For example, the key server 1330 may store or have access to the private key for example.com and example2.com, which may be owned or controlled by different entities. In such an embodiment, in conjunction with transmitting the information necessary to generate the session keys to the key server 1330, the secure session server 1320 indicates the domain or zone in which the client device 1310 is requesting a connection. For example, if the client device 1310 is requesting a secure session with example.com, then the secure session server 1320 indicates to the key server 1330 that example.com is the requested domain. The client device 1310 may specify the destination domain using the Server Name Indication (SNI) extension in the Client Hello message. SNI is described in RFC 3546, June 2003. If the destination is not specified by the client device 1310 (e.g., the client device 1310 does not support SNI), then the secure session server 1320 matches the destination IP address of the client-hello message sent by the client device 1310 with the corresponding hostname (e.g., the secure session server 1320 may include a mapping of IP addresses and hostnames). The secure session server 1320 may transmit the indication of the domain or zone name to the key server 1330 in a number of different ways including in a header, a custom binary structure, or a serialization format (e.g., protobuf, JavaScript Object Notation (JSON), etc.). After receiving the indication of the domain or zone name in which the client is attempting to connect, the key server 1330 accesses the corresponding private key. In another embodiment, a certificate fingerprint or a hash of the modulus (for RSA) may be used to identify the corresponding private key. For example, the secure session server 1320 may generate a fingerprint over the certificate included in the Certificate message of operation 13.3 (e.g., a hash may be generated over the certificate) and transmit that fingerprint value to the key server 1330. The key server 1330 uses the same fingerprint algorithm to generate a fingerprint over its digital certificates and matches each to the corresponding private key. Upon receiving the fingerprint value from the secure session server 1320, the key server 1330 matches that fingerprint value with one of the fingerprint values it generated over the public certificate (the same public certificate included in the Certificate message of operation 13.3) to lookup the corresponding private key. As another example, the secure session server 1320 may hash the modulus of the public key included in the certificate of the Certificate message of operation 13.3 and transmit that hash value to the key server 1330. The key server 1330 uses the same hash algorithm to generate a hash value over the modulus over its stored public keys and matches each to the corresponding private key. Upon receiving the hash value from the secure session server 1320, the key server 1330 matches that hash value with one of the hash values it generated to lookup the corresponding private key.

At operation 13.8, the client device 1310 transmits a Change Cipher Spec message to the secure session server 1320. The Change Cipher Spec message from the client device 1310 indicates that future messages transmitted by the client device 1310 will be encrypted. At operation 13.9, the client device 1310 transmits a Finished message to the secure session server 1320. The Finished message is encrypted using the generated session keys. By way of example, the Finished message includes an encrypted hash of all of the messages in the handshake 1370 previously sent and received.

In one embodiment the secure session server 1320 uses the information in the Finished message to verify that the key exchange was successful. In one embodiment, verifying that the key exchange was successful includes using a pseudorandom function that includes as its input the master secret. In such an embodiment, the secure session server 1320 may receive the master secret from the key server 1330. For example, verifying that the key exchange was successful may include the secure session server 1320 calculating a value using a pseudorandom function that takes as input the master secret, a finished label (e.g., a client finished label), and a hash of all of the messages in the handshake 1370 previously sent to the client device 1310 and received from the client device 1310 (e.g., the Client Hello message of operation 13.1, the Server Hello message of operation 13.2, the Certificate message of operation 13.3, the Server Hello Done message of operation 13.4, the Client Key Exchange message of operation 13.5, and the Change Cipher Spec message of operation 13.8). That calculated value is compared with the value received in the Finished message (the values should be the same if the key exchange was successful). It should be understood that if the verification fails, the handshake 1370 does not continue. In order to generate the hash of the messages in the handshake 1370, the secure session server 1320 may cache the messages that it receives from the client device 1310 and sends to the client device 1310 such that it may generate the hash for the comparison. Alternatively the secure session server 1320 may use incremental hashing and update the hash value upon receiving each message from the client device 1310 and transmitting each message to the client device 1310.

In an alternative embodiment where the key server 1330 does not transmit the master secret to the secure session server 1320, the secure session server 1320 transmits the value included in the Finished message received in operation 13.9 or the Finished message itself to the key server 1330 for verifying that the key exchange was successful. The secure session server 1320 may also generate the hash value and transmit it to the key server 1330 for use in the verification. In such an embodiment, the key server 1330 responds to the secure session server 1320 whether the key exchange was verified as successful. It should be understood that if the key exchange is not verified, the handshake will not continue.

At operation 13.10, the secure session server 1320 transmits a Change Cipher Spec message to the client device 1310 that indicates that future messages transmitted by the secure session server 1320 will be encrypted. At operation 13.11, the secure session server 1320 transmits a Finished message to the client device 1310. The Finished message may include an encrypted hash of all of the messages in the handshake 1370 previously sent and received and is used by the client device 1310 to verify that the key exchange was successful. In one embodiment the Finished message includes a value calculated using a pseudorandom function that takes as input the master secret, a finished label (e.g., a server finished label), and a hash of all of the messages in the handshake 1370 previously received from the client device 1310 and sent to the client device 1310 (e.g., the Client Hello message of operation 13.1, the Server Hello message of operation 13.2, the Certificate message of operation 13.3, the Server Hello Done message of operation 13.4, the Client Key Exchange message of operation 13.5, the Change Cipher Spec message of operation 13.8, the Finished message of operation 13.9, and the Change Cipher Spec message of operation 13.10). In such an embodiment, the secure session server 1320 may receive the master secret from the key server 1330. In order to generate the hash of the messages in the handshake 1370, the secure session server 1320 may cache the messages that it receives from the client device 1310 and sends to the client device 1310 such that it may generate the hash for the comparison. Alternatively the secure session server 1320 may use incremental hashing and update the hash value upon receiving each message from the client device 1310 and transmitting each message to the client device 1310.

In an alternative embodiment, the secure session server 1320 transmits a request to the key server 1330 to generate the value to be included in the Finished message or to generate the entire Finished message that will be transmitted to the client device 1310. The secure session server 1320 may also generate the hash value and transmit it to the key server 1330 for use in generating the value included in the Finished message. In such an embodiment, the key server 1330 responds to the secure session server 1320 with either the generated value to be included in the Finished message or the generated Finished message that includes the generated value.

After the Finished message of operation 13.11, the handshake 1370 is complete and the secure session 1360 is considered to be established. At operation 13.12, future messages of the secure session between the client device 1310 and secure session server 1320 are encrypted over the secure session 1360, which carry the application data of the connection.

As described above, the connection between the secure session server 1320 and the key server 1330 may be a secure connection for securely transmitting the information necessary to generate the session keys and the generated session keys. As described above, a secure session (e.g., SSL or TLS) may be established between the secure session server 1320 and the key server 1330. As part of establishing the secure session, the key server 1330 may request a client certificate from the secure session server 1320 and the secure session server 1320 may transmit a client Certificate message that includes its certificate to the key server 1330. The data in the client Certificate message is used by the key server 1330 to authenticate the identity of the secure session server 1320.

In some embodiments, the key server 1330 may use IP address blocking to accept connections (such as from the secure session server 1320) from only certain IP addresses. For example, the key server 1330 may have a whitelist of IP address(es) and/or IP address range(s) that are allowed to connect to the key server 1330 or have a blacklist of IP address(es) and/or IP address range(s) that are not allowed to connect to the key server 1330. IP address blocking may also be used at one or more intermediary network devices between the secure session server 1320 and the key server 1330.

Although a secure session has been described between the secure session server 1320 and the key server 1330 that is initiated by the secure session server 1320, in other embodiments the secure session can be initiated by the key server 1330.

In some embodiments, the messages transmitted by the secure session server 1320 to the key server 1330 are signed with a private key that is known only to the secure session server 1320. In such embodiments, the key server 1330 verifies the validity of the signature of a message prior to acting on that message. By way of example, the message that includes the information necessary to generate the session keys at operation 13.6 may be signed with a private key known only to the secure session server 1320. The key server 1330 verifies whether the signature is valid using the corresponding public key and will only continue with the operations if the signature is valid.

A combination of the security techniques described may be used to provide security for the generation of the session keys.

For example, a combination of requiring a client Certificate, IP address blocking, and signing the messages transmitted by the secure session server with a private key known only to the secure session server may be used to provide security for the connection between the secure session server 1320 and the key server 1330.

In one embodiment, the secure connection 1355 between the secure session server 1320 and the key server 1330 may be a Virtual Private Network (VPN) connection, which may be desirable in a firewalled environment.

In some embodiments the key server 1330 may transmit the master secret it generated to the secure session server 1320. The master secret may be used by the secure session server 1320 to support resuming sessions. Sessions may be resumed using a stateful session resumption or using a stateless session resumption. Stateful session resumption includes storing session state on the server (e.g., the master secret and the cipher suite). Stateless session resumption includes storing session state (e.g., the master secret and the cipher suite) in a ticket (encrypted with a key not known to the client) that is presented to the client and returned by the client when requesting session resumption. For example, when a connection is established by resuming a session (e.g., the client device 1310 transmits a ClientHello message with a session ID of a session that is capable of being resumed), new ClientHello.random and ServerHello.random values are generated and hashed with the master secret of the established session. If the master secret is not transmitted to the secure session server 1320, the secure session server 1320 may request the key server 1330 to hash the new ClientHello.random and ServerHello.random values with the master secret and provide the result to the secure session server 1320.

For example, the operations 13.13 through 13.21 illustrate resuming a session according to one embodiment. Prior to operation 13.13, the secure session 1360 between the client device 1310 and the secure session server 1320 has been closed. At some point later, at operation 13.13, the secure session server 1320 receives a Client Hello message from the client device 1310. This Client Hello message differs from the Client Hello message of operation 13.1 in that it effectively includes a request to resume the session. This Client Hello message may include a session ID that was set for a previously established secure session (e.g., the secure session 1360). The Client Hello message of operation 13.13 includes a different random value than the Client Hello message of operation 13.1 (a different ClientHello.random value).

Embodiments may support the use of stateful session resumption and/or stateless session resumption. In the case of stateless session resumption, encrypted session state information is transmitted to the client device 1310 in the form of a ticket that the client may present back to the secure session server 1320 when requesting resumption of a session. The ticket includes session state (e.g., the cipher suite and the master secret) and is encrypted with a key that is not known by the client device 1310 (e.g., it may be encrypted with a key that is known only to the key server 1330 and/or to the secure session server 1320). The client device 1310 can request a session be resumed using the ticket. In some embodiments the ticket is generated by the key server 1330 whereas in other embodiments the ticket is generated by the secure session server 1320. An exemplary format of the ticket may be defined in accordance with RFC 5077, "Transport Layer Security (TLS) Session Resumption without Server-Side State", January 2008. If the secure session server 1320 is generating the ticket, then the key server 1330 transmits the master secret to the secure session server 1320. If the key server 1330 is generating the ticket, the secure session server 1320 may transmit a request to the key server 1330 to generate the ticket only when the client device 1310 indicates that it supports this extension, where this request may be transmitted to the key server 1330 after the Finished message transmitted by the client device 1310 has been successfully verified. The key server 1330 receives the request to generate the ticket, generates the ticket (encrypting it with a key that is known only to the key server 1330 for example), and transmits the ticket to the secure session server 1320. The secure session server 1320 transmits the ticket to the client device 1310 before the Change Cipher Spec message of operation 13.10 and after the Finished message of the client device 1310 has been verified. In such embodiments, the Client Hello message of operation 13.13 includes the ticket (e.g., in a SessionTicket extension as defined in RFC 5077).

At operation 13.14 the secure session server 1320 transmits a request to the key server 1330 to generate session keys for resuming the session. As part of this request, the secure session server 1320 transmits the ClientHello.random value included in the Client Hello message of operation 13.13, a new ServerHello.random value to the key server 1330 (this ServerHello.random value is different than the ServerHello.random value used in the secure session 1360). If the Client Hello message of operation 13.13 includes a ticket for resuming the session that was created by the key server 1330 and encrypted with a key known only to the key server 1330, then secure session server 1420 also transmits the ticket to the key server 1330 for resuming the session (which may be in the request of operation 13.14). The secure session server 1320 may also transmit the session identifier included in the Client Hello message of operation 13.13 (if non-empty) to the key server 1330. In one embodiment, instead of the secure session server 1320 generating and transmitting a new ServerHello.random value to the key server 1330, the key server 1330 generates the new ServerHello.random value.

Assuming that the session can be resumed (e.g., a valid ticket was included in the Client Hello message of operation 13.13 or the session identifier included in the Client Hello message of operation 13.13 matches session information in the key server 1330 and the key server 1330 is willing to re-establish the connection under the specified session state), the key server 1330 generates the session keys for the resumed session (which will be different than the session keys used for the secure session 1360) using the existing master secret generated for the secure session 1360 and the new ClientHello.random and ServerHello.random values (along with other security parameters that have been previously negotiated). The key server 1330 may retrieve the session state (e.g., the master secret and cipher suite) from the contents of the ticket (if included in the Client Hello message of operation 13.13) for stateless session resumption or through its session cache if resuming under stateful session resumption. The session keys may include a client write MAC key, a server write MAC key, a client write encryption key, and a server write encryption key. A client write IV and a server write IV may also be generated depending on the cipher used. The key server 1330 transmits the session keys to the secure session server 1320 at operation 13.15.

In one embodiment, the messages of operations 13.14 and 13.15 are transmitted over a secure connection 1355 (e.g., encrypted using SSL or TLS, or other mechanisms) and/or the data itself is otherwise encrypted. The secure connection used between the secure session server 1320 and the key server 1330 may be a persistent connection or it may be a new secure session (e.g., different than the secure connection 1355).

At operation 13.16, the secure session server 1320 transmits a Server Hello message to the client device 1310. This Server Hello message includes a new ServerHello.random value. At operation 13.17, the secure session server 1320 transmits a Change Cipher Spec message to the client device 1310 that indicates that future messages transmitted by the secure session server 1320 will be encrypted using the newly negotiated keys. At operation 13.18, the secure session server 1320 transmits a Finished message to the client device 1310. The Finished message may include an encrypted hash of all of the messages in the handshake 1375 previously sent and received and is used by the client device 1310 to verify that the key exchange was successful. In one embodiment the Finished message includes a value calculated using a pseudorandom function that takes as input the master secret, a finished label (e.g., a server finished label), and a hash of all of the messages in the handshake 1375 previously received from the client device 1310 and sent to the client device 1310 for this handshake 1375 (e.g., the Client Hello message of operation 13.13, the Server Hello message of operation 13.16, and the Change Cipher Spec message of operation 13.17).

At operation 13.19, the client device 1310 transmits a Change Cipher Spec message to the secure session server 1320. The Change Cipher Spec message from the client device 1310 indicates that future messages transmitted by the client device 1310 will be encrypted using the newly negotiated keys. At operation 13.20, the client device 1310 transmits a Finished message to the secure session server 1320. The Finished message is encrypted using the generated session keys. By way of example, the Finished message includes an encrypted hash of all of the messages in this handshake 1375 previously sent and received.

The information in the Finished message of operation 13.20 is verified to determine whether the key exchange was successful. As described above with respect to verifying the information in the Finished message of operation 13.9, in some embodiments the secure session server 1320 verifies the Finished message and in other embodiments the secure session server 1320 transmits the value included in the Finished message or the Finished message itself to the key server 1330 for verifying whether the key exchange was successful.

After the Finished message of operation 13.20 has been verified, the handshake 1375 is complete and the secure session 1365 is considered to be established. At operation 13.21, future messages of the secure session between the client device 1310 and secure session server 1320 are encrypted over the secure session 1360, which carry the application data of the connection.

While FIG. 13 illustrates an exemplary order of messages being transmitted between the client device 1310, the secure session server 1320, and the key server 1330, certain messages may be transmitted in a different order in some embodiments. For example, the information transmitted to the key server 1330 in operation 13.6 may be transmitted after receiving the Change Cipher Spec message of operation 13.8 or after receiving the Finished message of operation 13.9. As another example, the message in operation 13.14 may be transmitted after the Server Hello message of operation 13.16 or the Change Cipher Spec message of operation 13.17. As yet another example, the session keys transmitted in operation 13.15 may be transmitted after the Server Hello message of operation 13.16 or the Change Cipher Spec message of operation 13.17.

In embodiments where a ticket is used for resuming a session as previously described, the key server 1330 may also renew the ticket by transmitting a message (e.g., a NewSessionTicket message) to the secure session server 1320 which may transmit the message to the client device 1310 after the Server Hello message of operation 13.16.

Although FIG. 13 illustrates the key server 1330 generating the session keys after receiving a request to resume the session, in one embodiment the secure session server 1320 generates the session keys after receiving a request to resume the session. For example, in an embodiment where the key server 1330 generates a ticket that includes the session state (e.g., the master key and the cipher suite) that is encrypted with a key that is not known or shared with the client device 1310, the key server 1330 may transmit the key to decrypt the ticket to the secure session server 1320. Accordingly, upon receiving a request to resume a session from the client device 1310 that includes a session resumption ticket, the secure session server 1320 may decrypt the ticket with the key received from the key server 1330, retrieve the session state from the contents of the ticket, and generate the session keys using the retrieved session state. Alternatively, the key server 1330 may generate a ticket that includes the session state (e.g., the master key and the cipher suite) that is encrypted with a key that is not known or shared with the client device 1310 or the secure session server 1320, where upon receiving a request to resume a session from the client device 1310 that includes a session resumption ticket, the secure session server 1320 may transmit the encrypted ticket to the key server 1330, which then decrypts the ticket, and transmits the decrypted information back to the secure session server 1320. The secure session server 1320 then uses the session state included in the decrypted information to generate the session keys. As another alternative, the key server 1330 may generate a ticket and transmit that ticket to the secure session server 1320 in unencrypted form where prior to transmitting the ticket to the client device 1310, the secure session server 1320 encrypts the ticket using a key known only to the secure session server 1320. Upon receiving a request to resume a session from the client device 1310 that includes a session resumption ticket, the secure session server 1320 may decrypt the ticket with appropriate key, retrieve the session state from the contents of the ticket, and generate the session keys using the retrieved session state.

As another example, the key server 1330 may transmit the master secret to the secure session server 1320 such that secure session server 1320 may use either stateful session resumption or stateless session resumption without requiring further interaction with the key server 1330. For example in the case of stateful session resumption, the secure session server 1320 may receive the master secret from the key server 1330 and store it in association with other session state parameters in its session cache (e.g., the cipher suite). Upon receiving a request to resume a session from a client that includes a session identifier of the session to be resumed, the secure session server 1320 checks its session cache for a matching identifier and if found and the secure session server 1320 is willing to re-establish the connection (the secure session server 1320 may deny the request to resume a session for a variety of reasons including if a lifetime of the session identifier has been reached), the secure session server 1320 will use that stored session state to generate new session keys for the resumed session. In the case of stateless session resumption, the secure session server 1320 may receive the master secret from the key server 1330 and generate and encrypt the ticket that includes the session state information (encrypted with a ticket that may be only known to the secure session server 1320). The secure session server 1320 will provide the ticket to the client device 1310 (e.g., before the Change Cipher Spec message of operation 13.10 and after the Finished message of the client device 1310 has been verified). Upon receiving a request to resume a session from the client device 1310 that includes a session resumption ticket, the secure session server 1320 may decrypt the ticket, retrieve the session state from the contents of the ticket, and generate the session keys using the retrieved session state.

Figure 14:
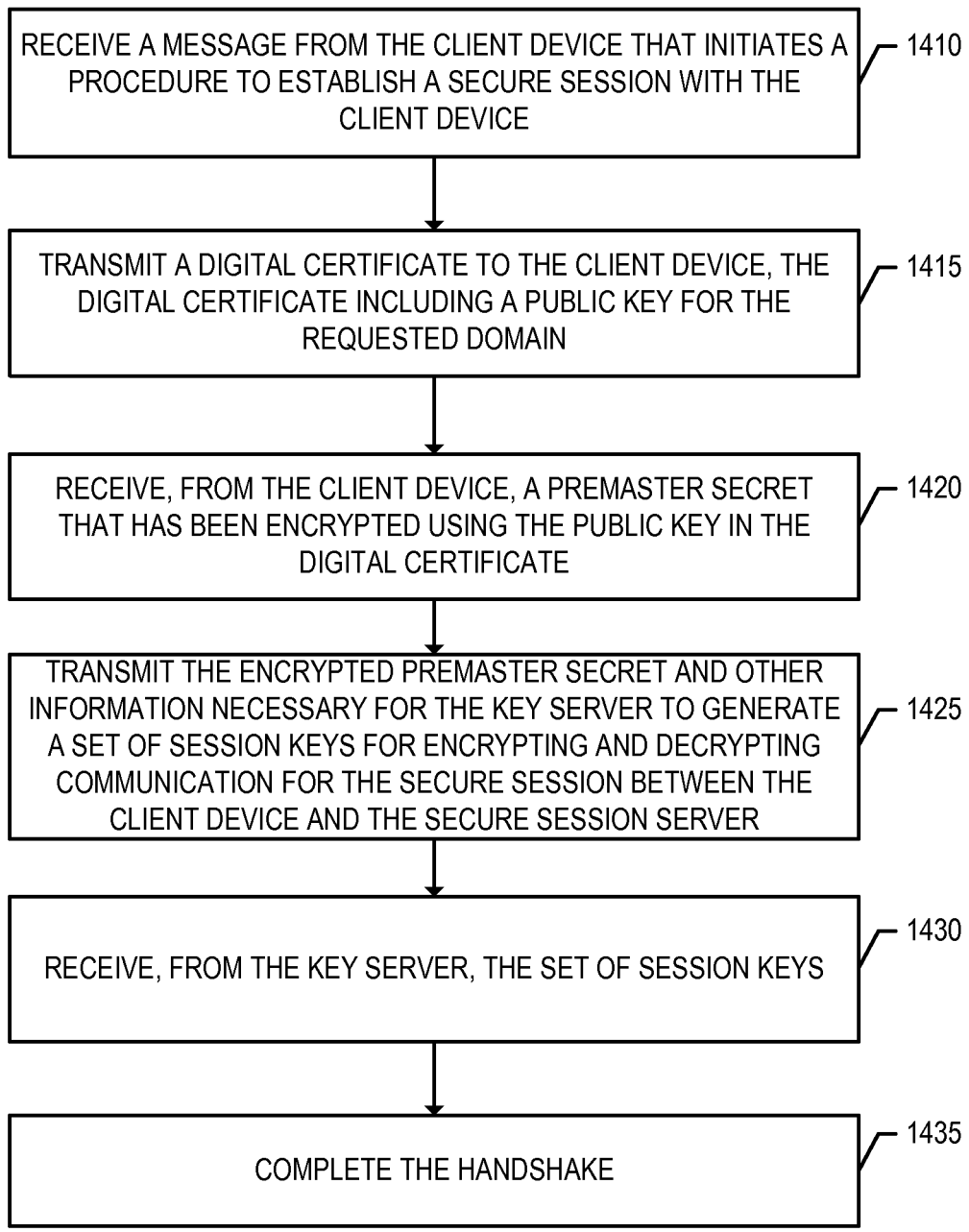
FIG. 14 is a flow diagram that illustrates exemplary operations performed on a secure session server for establishing a secure session implemented with public-key cryptography between a client device and a secure session server where the secure session server does not have access to a private key for the requested domain according to one embodiment.

FIG. 14 is a flow diagram that illustrates exemplary operations performed on a secure session server for establishing a secure session implemented with public-key cryptography between a client device and a secure session server where the secure session server does not have access to a private key for the requested domain according to another embodiment. The private key is stored remotely from the secure session server (e.g., on a key server). The embodiment described with reference to FIG. 14 is similar to the embodiment described with reference to FIG. 2 with the exception that in addition to transmitting the encrypted premaster secret to the key server, the secure session server also transmits the necessary information for the key server to generate the session keys that will be used in the secure session between the client device and the secure session server.

At operation 1410, the secure session server receives a message from the client device that initiates a procedure to establish a secure session with the client device. For example, the secure session server may receive a Client Hello message from the client device (e.g., an SSL or TLS Client Hello message). Depending on the protocol and capabilities of the client device, the message may indicate the destination host name in which the client device wishes to establish a secure session (e.g., the Client Hello message may include the Server Name Indication (SNI) extension and specify the destination host name). The message may also include random data used for cryptographic purposes (sometimes referred to as ClientHello.random), and may indicate whether and what type of extensions (defined by the protocol) the client supports.

In response to receiving the message in operation 1410, the secure session server may perform a number of operations, including transmitting a digital certificate to the client device at operation 1415. The digital certificate includes a public key for the requested domain. It should be understood that the private key that corresponds to the public key is not stored on the secure session server (e.g., it is stored remotely on a key server). The digital certificate may be transmitted in an SSL or TLS Certificate message. Prior to transmitting the digital certificate, the secure session server may perform a number of other operations including transmitting a Server Hello message to the client device which includes random data used for cryptographic purposes that is different than the random data included in the ClientHello message (sometimes referred to as ServerHello.random) and may include a list of the extensions that the secure session server supports.

If the message in operation 1410 indicates the destination domain, the secure session server transmits the digital certificate bound to that destination domain. If the message in operation 1410 does not indicate the destination host name, the secure session server transmits the digital certificate that is associated with the destination IP address of the message in operation 1410, which is bound to the requested domain. Flow moves from operation 1415 to operation 1420.

At operation 1420, the secure session server receives from the client device a premaster secret that has been encrypted using the public key in the digital certificate transmitted in operation 1415. The encrypted premaster secret may be sent by the client device in a SSL or TLS Client Key Exchange message. Flow moves from operation 1420 to operation 1425.

The secure session server does not have the private key that corresponds with the public key that encrypted the premaster secret. As a result, the secure session server cannot decrypt the encrypted premaster secret to obtain the premaster secret.

At operation 1425, the secure session server transmits the encrypted premaster secret and the other information necessary to generate the session keys that are used to encrypt and decrypt information in the secure session between the client device and the secure session server. For example, the information transmitted to the key server may include the encrypted premaster secret (which the key server decrypts using the corresponding private key which is then used to generate the master secret), the ClientHello.random value, the ServerHello.random value, and an indication of the negotiated cipher suite (e.g., the information may specify the negotiated cipher suite that defines the cipher specification (the key server may look up the parameters of the cipher specification) or may specify parameters of the negotiated cipher suite for generating the session keys including information identifying the pseudorandom function (PRF) algorithm, encrypted key length, fixed IV length, and MAC key length) if they are not already transmitted to the key server.

In one embodiment, the key server is located remotely from the secure session server. Moreover, in some embodiments, the secure session server and the key server may be owned and/or operated by different entities. For example, the secure session server may not be under physical control of the owner of the requested domain while the key server is under physical control of the owner of the requested domain. In one embodiment, the encrypted premaster secret and the other information necessary to generate the session keys are transmitted to the key server over a secure connection (e.g., encrypted using SSL or TLS) and/or is otherwise encrypted. Flow moves from operation 1425 to operation 1430.

Figure 15:
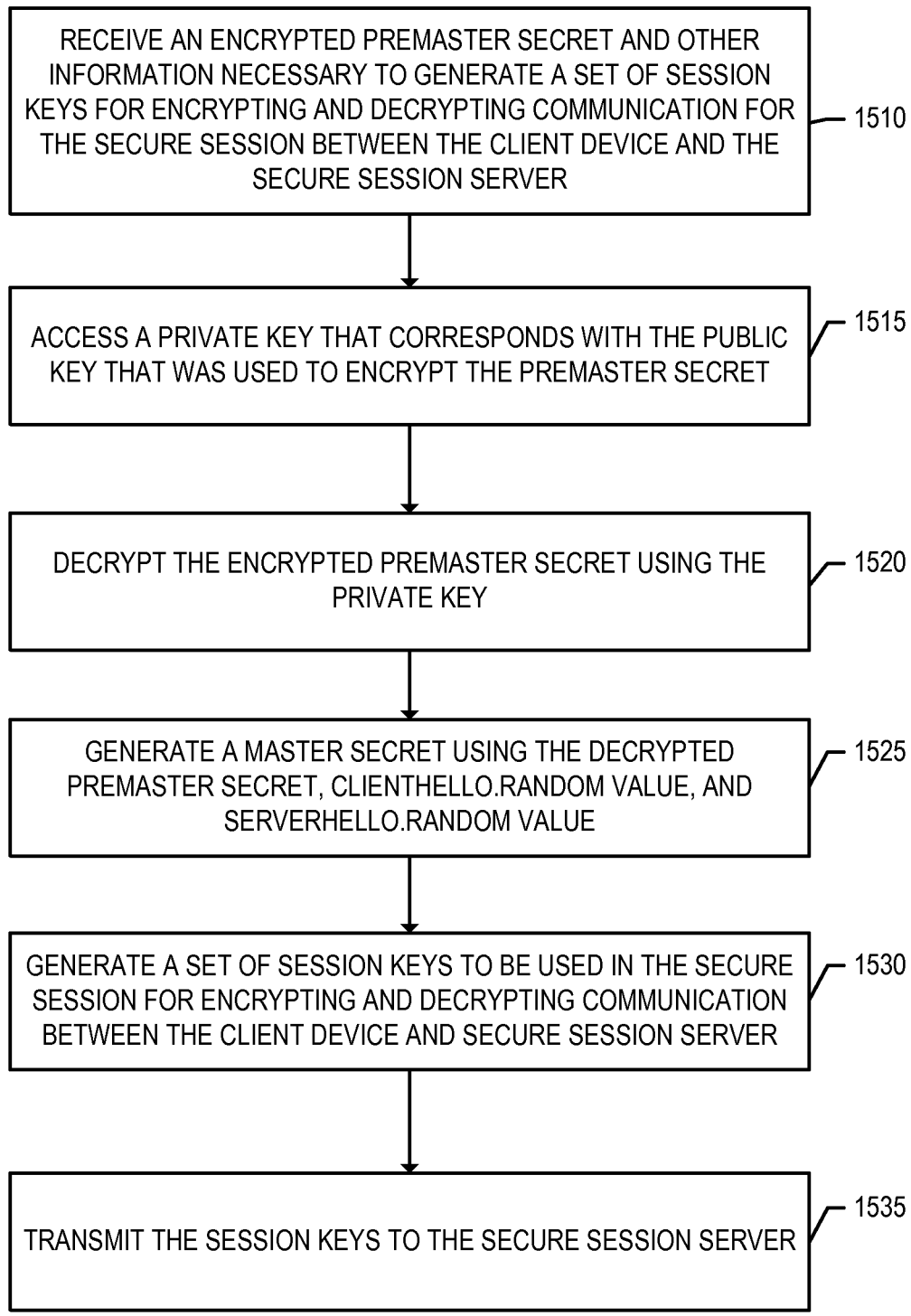
FIG. 15 is a flow diagram that illustrates exemplary operations performed by a key server in response to receiving an encrypted premaster secret and other information to generate a set of session keys for a secure session between a client device and a secure session server according to one embodiment.

In response to receiving the encrypted premaster secret and the other information necessary to generate the session keys, the key server decrypts the encrypted premaster secret to obtain the premaster secret using the appropriate private key, generates the master secret using the premaster secret, the ClientHello.random value, and the ServerHello.random value, and generates the session keys. FIG. 15 is a flow diagram that illustrates exemplary operations performed by a key server in response to receiving an encrypted premaster secret and other information to generate a set of session keys for a secure session between a client device and a secure session server according to one embodiment.

At operation 1510, the key server receives an encrypted premaster secret and other information necessary to generate a set of session keys used for encrypting and decrypting communication between a client device and a secure session server. For example, the information may include the ClientHello.random value, the ServerHello.random value and an indication of the negotiated cipher suite (e.g., the information may specify the negotiated cipher suite that defines the cipher specification (the key server may look up the parameters of the cipher specification) or may specify parameters of the negotiated cipher suite for generating the session keys including information identifying the pseudorandom function (PRF) algorithm, encrypted key length, fixed IV length, and MAC key length).

Flow then moves to operation 1515 where the key server accesses a private key that corresponds with the public key that was used to encrypt the premaster secret. The key server may receive from the secure session server an indication of the domain or zone name in which the client device is attempting to establish a secure session for. This indication may be transmitted in a number of different ways including in a header, a custom binary structure, or a serialization format (e.g., protobuf, JavaScript Object Notation (JSON), etc.). The key server uses this indication to access the private key that corresponds with the public key that encrypted the premaster secret.

Flow then moves to operation 1520 where the key server decrypts the encrypted premaster secret using the accessed private key. Flow then moves to operation 1525 where the key server generates a master secret using the decrypted premaster secret, the ClientHello.random value, and the ServerHello.random value. By way of example, the master secret is calculated using a pseudorandom function that takes as input at least the premaster secret, the ClientHello.random value, and the ServerHello.random value. The client device will use the same pseudorandom function over the same input to compute the same master secret.

Flow then moves to operation 1530 where the key server generates a set of session keys to be used in the secure session for encrypting and decrypting communication between the client device and the secure session server. By way of a specific example, the master secret and other required information (e.g., received in operation 1510) is used to generate a client write Message Authentication Code (MAC) key, a server write MAC key, a client write encryption key, and a server write encryption key. A client write Initialization Vector (IV) and a server write IV may also be generated depending on the cipher used.

Flow then moves to operation 1535 where the key server transmits the generated session keys to the secure session server. The transmission of the session keys to the secure session server may be over a secure session between the secure session server and the key server and/or the session keys may be encrypted in a way that they can be decrypted by the secure session server. If the transmission is over a secure session between the key server and the secure session server, as part of establishing that secure session the key server may request a client certificate from the secure session server in order to authenticate the identity of the secure session server. In some embodiments, the key server may use IP address based blocking to verify that the key server is communicating with a legitimate secure session server (e.g., by verifying that the secure session server is communicating with an IP address having a value that is expected by the key server). In some embodiments, the connection between the key server and the secure session server is a VPN connection. In some embodiments, the messages transmitted by the secure session server to the key server are signed with a private key that is known only to the secure session server. In such embodiments, the key server verifies the validity of the signature of a message prior to acting on that message. In some embodiments, any combination of these security techniques may be used.

Referring back to FIG. 14, at operation 1430, the secure session server receives the session keys from the key server. In one embodiment, the session keys are transmitted to the key server over a secure connection (e.g., encrypted using SSL or TLS) and/or is otherwise encrypted such that the secure session server is able to decrypt the session keys. Flow moves from operation 1430 to operation 1435 where the secure session server completes the handshake with the client device and establishes a secure session with the client device. For example, the client device and secure session server each may transmit a Change Cipher Spec message and a Finished message, as previously described herein. While the secure session is in operation, the client device and secure session server may exchange data securely.

In addition to transmitting the session keys to the secure session server, the key server may also transmit the generated master secret to the secure session server. The generated master secret may be used when verifying the information included in the Finished message received from the client and when generating the Finished message to transmit to the client. In addition, the master secret may be used when resuming a session between the client device and the secure session server. For example, when a connection is established by resuming a session (e.g., the client transmits a ClientHello message with a session ID of a session that is capable of being resumed or includes a session resumption ticket), new ClientHello.random and ServerHello.random values are generated and hashed with the master secret of the established session. If the master secret is not transmitted to the secure session server, the secure session server may request the key server to hash the new ClientHello.random and ServerHello.random values with the master secret and provide the result to the secure session server to support resumption of sessions.

If the master secret is not transmitted to the secure session server, the secure session server may transmit the value included in the Finished message received from the client device or the entire Finished message to the key server to verify that the key exchange was successful. The secure session server may generate the hash value and transmit it to the key server for use in the verification. In such an embodiment, the key server responds to the secure session server whether the key exchange was verified as successful. It should be understood that if the key exchange is not verified, the handshake will not continue.

In an alternative embodiment, instead of generating the Finished message (e.g., if the secure session server does not have access to the master secret), the secure session server transmits a request to the key server to generate the value to be included in the Finished message or to generate the entire Finished message that will be transmitted to the client device. The secure session server may also generate the hash value and transmit it to the key server for use in generating the value included in the Finished message. In such an embodiment, the key server responds to the secure session server with either the generated value to be included in the Finished message or the generated Finished message that includes the generated value.

Figure 16A:
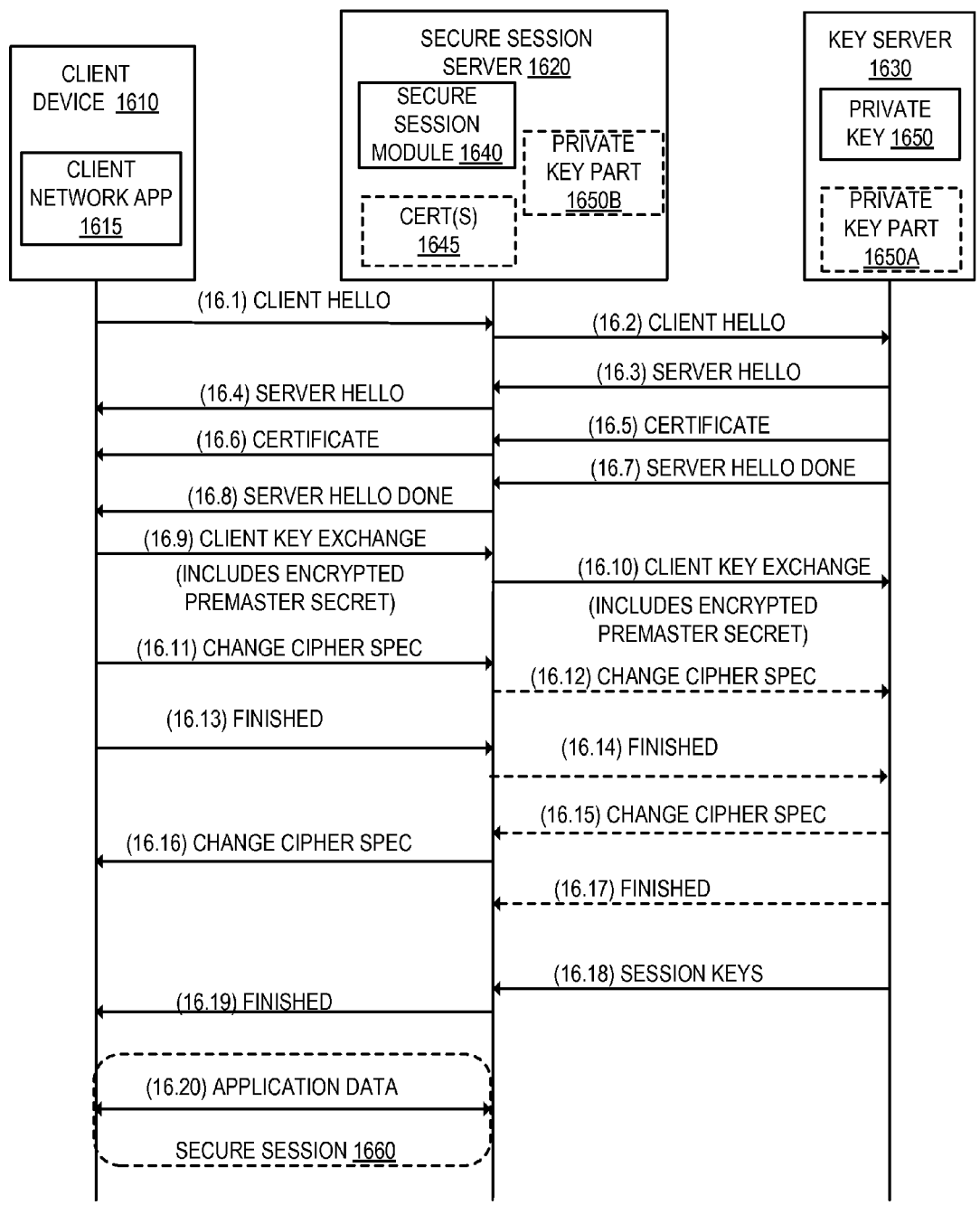
FIG. 16A illustrates exemplary messages for establishing a secure session using public-key cryptography between a client device and a secure session server where the secure session server does not have access to the private key for the requested domain and where the key server generates and transmits to the secure session server the session keys used for the secure session according to one embodiment.

In another embodiment, the secure session server proxies the messages of the handshake between the client device and the key server where the key server generates and transmits to the secure session server the set of session keys to be used during the secure session between the client device and the secure session server. FIG. 16A illustrates exemplary messages for establishing a secure session using public-key cryptography between a client device 1610 and a secure session server 1620 where the key server 1630 generates and transmits to the secure session server 1620 the session keys used for the secure session.

The client device 1610 (including the client network application 1615) is similar to the client device 110 of FIG. 1. The secure session server 1620, including the secure session module 1640 and the optional certificate(s) 1645, are similar to the secure session server 120 (including the secure session module 140 and the certificate(s) 145), but perform different operations as will be described below. The key server 1630 is similar to the key server 130 of FIG. 1, but performs different operations as will be described below.

At operation 16.1, the client device 1610 transmits a Client Hello message to the secure session server 1620. This Client Hello message is similar to the Client Hello message described in operation 1.1 of FIG. 1 and transmitted to the secure session server 1620 for similar reasons. The Client Hello message includes, among other data, a ClientHello.random value. The secure session server 1620 transmits the Client Hello message to the key server 1630 at operation 16.2.

This Client Hello message is the same or substantially the same as the Client Hello message of operation 16.1.

In one embodiment, the secure session server 1620 may terminate secure session connections for multiple domains that are owned by different entities and the respective private keys for those domains are stored on different key servers. By way of example and assuming that the domain example.com and example2.com are owned by different entities, the secure session server 1620 may terminate secure session connections for those domains and a first key server may store or have access to the private key for example.com and a second key server may store or have access to the private key for example2.com. If the secure session server 1620 is supporting multiple domains whose respective private keys are stored on different key servers, the secure session server 1620 determines which key server to transmit the Client Hello message. If the client device 1610 specifies the destination domain using the SNI extension in the Client Hello message, the secure session server 1620 uses the destination domain to determine which key server the Client Hello message should be transmitted to. If the client device 1610 does not specify the destination domain using the SNI extension, then the secure session server 1620 matches the destination IP address of the Client Hello message received form the client device 1610 with the corresponding hostname to determine which key server to determine which key server the Client Hello message should be transmitted to (e.g., the secure session server 1620 may include a mapping of IP addresses and hostnames). The secure session server 1620 may also transmit the destination hostname to the key server 1630 (e.g., if the Client Hello message does not include the SNI extension).

In response to receiving the Client Hello message, at operation 16.3 the key server 1630 transmits a Server Hello message to secure session server 1620. The Server Hello message is similar to the Server Hello message described in operation 1.2 of FIG. 1. The Server Hello message includes, among other data, a ServerHello.random value. The secure session server 1620 transmits the Server Hello message to the client device 1610 at operation 16.4.

The key server 1630 also transmits a Certificate message to the secure session server 1620 at operation 16.5 (a server Certificate). This Certificate message is similar to the Certificate message described in operation 1.3 of FIG. 1. The Certificate message includes a digital certificate for the requested domain. For example, if the requested domain is example.com, the Certificate message includes a digital certificate bound to example.com. The digital certificate includes, among other things, a public key. The secure session server 1620 does not store the private key that corresponds with the public key included in the certificate. The secure session server 1620 may also not store the digital certificate bound to the requested domain. The secure session server 1620 transmits the Certificate message to the client device 1610 at operation 166.

At operation 16.7, the key server 1630 transmits a Server Hello Done message to the secure session server 1620 that indicates that the hello-message phase of the handshake is complete. This Server Hello Done message is similar to the Server Hello Done message described in operation 1.4 of FIG. 1. The secure session server 1620 transmits the Server Hello Done message to the client device 1610 at operation 16.8.

At operation 16.9, the client device 1610 transmits a Client Key Exchange message to the secure session server 1620. The Client Key Exchange message includes a premaster secret that has been encrypted using the public key included in the Certificate message of operation 16.6. By way of a specific example, if the RSA algorithm is being used for key agreement and authentication, the client device 1610 generates a 48-byte value for the premaster secret and encrypts it using the public key from the server's certificate and transmits the encrypted premaster secret to the secure session server 1620. The secure session server 1620 does not have the private key to decrypt the premaster secret. However, the private key is stored on the key server 1630 (as one of the private key(s) 1650). Although FIG. 16A illustrates the key server 1630 storing the private keys, in other embodiments the key server 1630 has access to the private keys but those private keys are stored on a different device. At operation 16.10, the secure session server 1620 transmits the Client Key Exchange message to the key server 1630.

The key server 1630 decrypts the encrypted premaster secret included in the Client Key Exchange message using the appropriate private key for the requested domain. Using the premaster secret, the key server 1630 calculates the master secret. By way of example, the master secret is calculated using a pseudorandom function that takes as input the premaster secret, the ClientHello.random value, and the ServerHello.random value. The client device 1610 also generates the same master secret. The master secret is used by the client device 1610 and the key server 1630 to generate session keys that are used to encrypt and decrypt information during the secure session. By way of a specific example, the master secret is used to generate a client write Message Authentication Code (MAC) key, a server write MAC key, a client write encryption key, and a server write encryption key. A client write Initialization Vector (IV) and a server write IV may also be generated depending on the cipher used.

At operation 16.11, the client device 1610 transmits a Change Cipher Spec message to the secure session server 1620. The Change Cipher Spec message from the client device 1610 indicates that future messages transmitted by the client device 1610 will be encrypted. In one embodiment, the secure session server 1620 transmits the Change Cipher Spec message to the key server 1630 at operation 16.12. In another embodiment, the secure session server 1620 does not transmit the Change Cipher Spec message to the key server 1630.

At operation 16.13, the client device 1610 transmits a Finished message to the secure session server 1620. The Finished message is used to verify that the key exchange and authentication processes were successful. The Finished message is encrypted using the generated session keys. By way of example, the Finished message includes an encrypted hash of all of the messages in the handshake previously sent to the client device 1610 and received from the client device 1610. For example, the message may include a value calculated using a pseudorandom function that takes as input the master secret, a finished label (e.g., a client finished label), and a hash of all of the messages in the handshake previously sent to the client device 1610 and received from the client device 1610. In one embodiment, the secure session server 1620 transmits the Finished message to the key server 1630 at operation 16.14.

In another embodiment, the secure session server 1620 does not transmit the Finished message to the key server 1630. If the secure session server 1620 does not transmit the Finished message to the key server 1630, the secure session server 1620 will verify whether the key exchange was successful. In one embodiment, verifying that the key exchange was successful includes using a pseudorandom function that includes as its input the master secret. In such an embodiment, the secure session server 1620 may receive the master secret from the key server 1630. For example, verifying that the key exchange was successful may include the secure session server 1620 calculating a value using the same pseudorandom function that takes as input the master secret, a finished label (e.g., a client finished label), and a hash of all of the messages in the handshake previously sent to the client device 1610 and received from the client device 1610 (e.g., the Client Hello message of operation 16.1, the Server Hello message of operation 16.4, the Certificate message of operation 16.6, the Server Hello Done message of operation 16.8, the Client Key Exchange message of operation 16.9, and the Change Cipher Spec message of operation 16.11). That calculated value is compared with the value received in the Finished message (the values should be the same if the key exchange was successful). It should be understood that if the verification fails, the handshake does not continue. In order to generate the hash of the messages in the handshake, the secure session server 1620 may cache the messages that it receives from the client device 1610 and transmits to the client device 1610 such that it may generate the hash for the comparison. Alternatively the secure session server 1620 may use incremental hashing and update the hash value upon receiving each message from the client device 1610 and transmitting each message to the client device 1610 for generating the hash.

At operation 16.15, the key server 1630 transmits a Change Cipher Spec message to the secure session server 1620. At operation 16.16, the secure session server 1620 transmits the Change Cipher Spec message to the client device 1610.

At operation 16.17, the key server 1630 transmits a Finished message to the secure session server 1620. The Finished message may include an encrypted hash of all of the messages in the handshake previously sent and received. For example, the message may include a value calculated using a pseudorandom function that takes as input the master secret, a finished label (e.g., a server finished label), and a hash of all of the messages in the handshake previously sent and received.

At operation 16.18, the key server 1630 transmits to the secure session server 1620 the set of session keys that are used to encrypt and decrypt messages during the secure session between the client device 1610 and the secure session server 1620. The session keys may include a client write MAC key, a server write MAC key, a client write encryption key, and a server write encryption key. The session keys may also include a client write IV and a server write IV depending on the cipher used.

The operation 16.18 (transmission of the session keys) may be performed at any time after receiving the Client Key Exchange message in operation 16.10. For example, the key server 1630 may generate the session keys after receiving the Client Key Exchange message in operation 16.10 prior to receiving the Change Cipher Spec message in operation 16.12 or the Finished message in operation 16.14, or prior to transmitting the Change Cipher Spec message in operation 16.15 or the Finished message in operation 16.17.

The session keys will be used by the secure session server 1620 when encrypting and decrypting information sent between the client device 1610 and the secure session server 1620. For example, the client write key is used by the client device to encrypt data and used by the secure session server to decrypt data received from the client device, the client write MAC key is used to authenticate data written by the client device, the server write key is used by the secure session server to encrypt data and used by the client device to decrypt data received from the secure session server, and the server write MAC key is used to authenticate data written by the secure session server.

At operation 16.19, the secure session server 1620 transmits the Finished message to the client device 1610. Thereafter, at operation 16.20, future messages of the secure session between the client device 1610 and secure session server 1620 are encrypted over the secure session 1660, which carry the application data of the connection.

In one embodiment, the messages transmitted between the secure session server 1620 and the key server 1630 may be transmitted over a secure connection (e.g., encrypted using SSL or TLS). The session keys transmitted to the secure session server 1620 may be encrypted in such a way that the secure session server may decrypt them.

In one embodiment, the operations of 16.12, 16.14, 16.15, and 16.17 are optional. For example, the secure session server 1620 may not forward the Change Cipher Spec message to the key server 1630. In order to perform the key exchange verification using the information included in the Finished message of operation 16.13, the secure session server 1620 may receive the master secret from the key server 1630 in addition to the session keys. The secure session server 1620 may generate and transmit a Change Cipher Spec message to the client device 1610 and generate and transmit a Finished message to the to the client device 1610. Generating the Finished message may include calculating a value using a pseudorandom function that takes as input the master secret, a finished label (e.g., a server finished label), and a hash of all of the messages in the handshake previously sent to the client device 1610 and received from the client device 1610 (e.g., the Client Hello message of operation 16.1, the Server Hello message of operation 16.4, the Certificate message of operation 16.6, the Server Hello Done message of operation 16.8, the Client Key Exchange message of operation 16.9, the Change Cipher Spec message of operation 16.11, the Finished message of operation 16.13, and the Change Cipher Spec message of operation 16.16). For generating the hash, the secure session server 1620 may cache the messages that it receives from the client device 1610 and transmits to the client device 1610 such that it may generate the hash in the message. Alternatively the secure session server 1620 may use incremental hashing and update the hash value upon receiving each message from the client device 1610 and transmitting each message to the client device 1610 for generating the hash in the Finished message.

In addition to receiving the session keys from the key server 1630, the secure session server 1620 may also receive the master secret from the key server 1630. As described above the master secret may be used when verifying information included in the Finished message received from the client device 1610 and/or when generating the Finished message to transmit to the client device 1610.

In addition, the master secret may be used when resuming a session between the client device 1610 and the secure session server 1620. Sessions may be resumed using a stateful session resumption or using a stateless session resumption. For example, when a connection is established by resuming a session (e.g., the client device 1610 transmits a ClientHello message with a session ID of a session that is capable of being resumed), new ClientHello.random and ServerHello.random values are generated and hashed with the master secret of the established session. If the master secret is not transmitted to the secure session server 1620, the secure session server 1620 may request the key server 1630 to hash the new ClientHello.random and ServerHello.random values with the master secret and provide the result to the secure session server 1620 to support resumption of sessions.

Figure 16B:
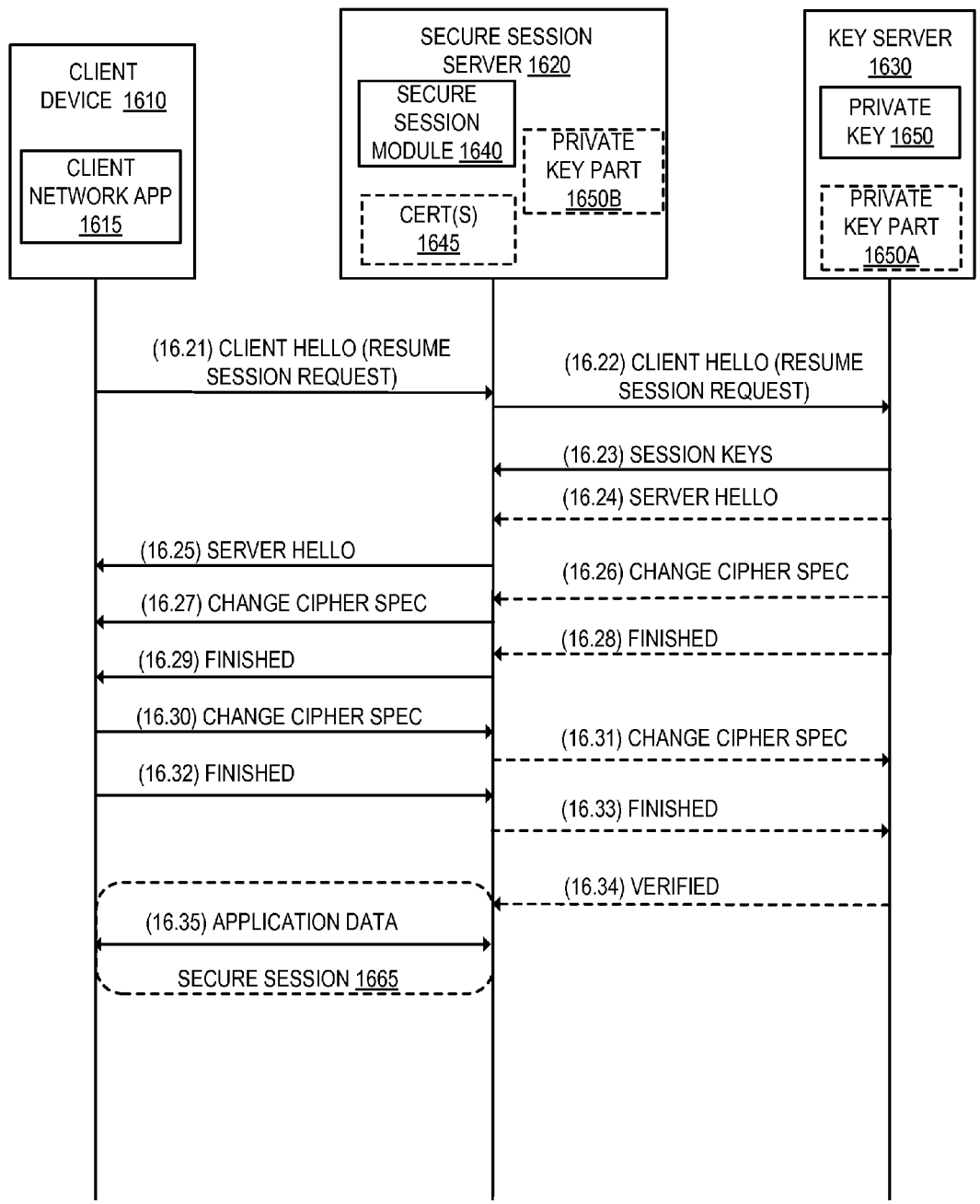
FIG. 16B illustrates exemplary operations for resuming a session according to the embodiment of FIG. 16A.

FIG. 16B illustrates exemplary operations for resuming a session according to the embodiment of FIG. 16A. Although not illustrated in FIG. 16B, prior to the operation 16.21, the secure session 1660 between the client device 1610 and the secure session server 1620 has been closed. At some point later, at operation 16.21, the secure session server 1620 receives a Client Hello message from the client device 1610. This Client Hello message differs from the Client Hello message of operation 16.1 in that it effectively includes a request to resume the session. This Client Hello message may include a session ID that was set for a previously established secure session (e.g., the secure session 1660). The Client Hello message of operation 16.21 includes a different random value than the Client Hello message of operation 16.1 (a different ClientHello.random value).

Embodiments may support the use of stateful session resumption and/or stateless session resumption. In the case of stateless session resumption, encrypted session state information is transmitted to the client device 1610 in the form of a ticket that the client may present back to the secure session server 1620 when requesting resumption of a session. The ticket includes session state (e.g., the cipher suite and the master secret) and is encrypted with a key that is not known by the client device 1610 (e.g., it may be encrypted with a key that is known only to the key server 1630 and/or to the secure session server 1620). The client device 1610 can request a session be resumed using the ticket. In some embodiments the ticket is generated by the key server 1630 whereas in other embodiments the ticket is generated by the secure session server 1620. An exemplary format of the ticket may be defined in accordance with RFC 5077. If the secure session server 1620 is generating the ticket, then the key server 1630 transmits the master secret to the secure session server 1620. If the key server 1630 is generating the ticket, the secure session server 1620 may transmit a request to the key server 1630 to generate the ticket only when the client device 1610 indicates that it supports this extension, where this request may be transmitted to the key server 1630 after the Finished message transmitted by the client device 1610 in operation 16.13 has been successfully verified. The key server 1630 receives the request to generate the ticket, generates the ticket (encrypting it with a key that is known only to the key server 1630 for example), and transmits the ticket to the secure session server 1620. The secure session server 1620 transmits the ticket to the client device 1610 before the Change Cipher Spec message of operation 16.16 and after the Finished message of the client device 1610 has been verified. In such embodiments, the Client Hello message of operation 16.21 includes the ticket (e.g., in a SessionTicket extension as defined in RFC 5077).

At operation 16.22, the secure session server 1620 transmits the Client Hello message to the key server 1630. This Client Hello message is the same or substantially the same as the Client Hello message of operation 16.21 and includes the request to resume the session.

Assuming that the session can be resumed (e.g., a valid ticket was included in the Client Hello message of operation 16.21 or the session identifier included in the Client Hello message of operation 16.21 matches session information in the key server 1630 and the key server 1630 is willing to re-establish the connection under the specified session state), the key server 1630 generates the session keys for the resumed session (which will be different than the session keys used for the secure session 1660) using the existing master secret generated for the secure session 1660, the new ClientHello.random value (included in the Client Hello message of operation 16.21), a new ServerHello.random value chosen by the key server 1630, and other security parameters that have been previously negotiated. The key server 1630 may retrieve the session state (e.g., the master secret and cipher suite) from the contents of the ticket (if included in the Client Hello message of operation 16.21) or through its session cache if resuming under stateful session resumption. The session keys may include a client write MAC key, a server write MAC key, a client write encryption key, and a server write encryption key. A client write IV and a server write IV may also be generated depending on the cipher used. The key server 1630 transmits the session keys to the secure session server 1620 at operation 16.23.

At operation 16.24, the key server transmits a Server Hello message to the secure session server 1620 that is destined for the client device 1610. This Server Hello message includes the new ServerHello.random value selected by the key server 1630. At operation 16.25, the secure session server 1620 forwards the Server Hello message to the client device 1610.

At operation 16.26, the key server 1630 transmits a Change Cipher Spec message to the secure session server 1620 which is transmitted by the secure session server 1620 to the client device 1610 at operation 16.27. The Change Cipher Spec message indicates that future messages transmitted by the secure session server 1620 will be encrypted using the newly negotiated keys.

At operation 16.28, the key server 1630 transmits a Finished message to the secure session server 1620 which is then transmitted by the secure session server 1620 to the client device 1610 at operation 16.29. The Finished message may include an encrypted hash of all the messages in the handshake to resume the session previously sent and received by the client device 1610 to verify that the key exchange was successful. In one embodiment the Finished message includes a value calculated using a pseudorandom function that takes as input the master secret, a finished label (e.g., a server finished label), and a hash of all of the messages in the handshake previously received from the client device 1610 and sent to the client device 1610 for this handshake (e.g., the Client Hello message of operation 16.21, the Server Hello message of operation 16.25, and the Change Cipher Spec message of operation 16.27).

At operation 16.30, the secure session server 1620 receives a Change Cipher Spec message from the client device 1610. The Change Cipher Spec message from the client device 1610 indicates that future messages transmitted by the client device 1610 will be encrypted using the newly negotiated keys. In one embodiment, at operation 16.31, the secure session server 1620 transmits the Change Cipher Spec message to the key server 1630. In another embodiment, the secure session server 1620 does not transmit the Change Cipher Spec message to the key server 1630.

At operation 16.32, the client device 1610 transmits a Finished message to the secure session server 1620. The Finished message is encrypted using the generated session keys. By way of example, the Finished message includes an encrypted hash of all of the messages in this handshake previously sent by and received by the client device 1610. The Finished message is used to verify that the key exchange and authentication processes were successful. For example, the message may include a value calculated using a pseudorandom function that takes as input the master secret, a finished label (e.g., a client finished label), and a hash of all of the messages in the handshake previously sent by the client device 1610 and received at the client device 1610. In one embodiment, the secure session server 1620 transmits the Finished message to the key server 1630 at operation 16.33.

In another embodiment, the secure session server 1620 does not transmit the Finished message to the key server 1630. If the secure session server 1620 does not transmit the Finished message to the key server 1630, the secure session server 1620 will verify whether the key exchange was successful. In one embodiment, verifying that the key exchange was successful includes using a pseudorandom function that includes as its input the master secret. In such an embodiment, the secure session server 1620 may receive the master secret from the key server 1630. For example, verifying that the key exchange was successful may include the secure session server 1620 calculating a value using the same pseudorandom function that takes as input the master secret, a finished label (e.g., a client finished label), and a hash of all of the messages in the handshake for this session that were previously sent to the client device 1610 and received from the client device 1610 (e.g., the Client Hello message of operation 16.21, the Server Hello message of operation 16.25, the Change Cipher Spec message of operation 16.27, the Finished message of operation 16.29, and the Change Cipher Spec message of operation 16.30). That calculated value is compared with the value received in the Finished message (the values should be the same if the key exchange was successful). It should be understood that if the verification fails, the handshake does not continue. In order to generate the hash of the messages in the handshake, the secure session server 1620 may cache the messages that it receives from the client device 1610 and transmits to the client device 1610 such that it may generate the hash for the comparison. Alternatively the secure session server 1620 may use incremental hashing and update the hash value upon receiving each message from the client device 1610 and transmitting each message to the client device 1610 for generating the hash.

At operation 16.34, the key server 1630 transmits a message indicating whether the key exchange and authentication processes were verified as being successful. Assuming that the key exchange and authentication processes are verified as being successful, thereafter at operation 16.35 future messages between the client device 1610 and the secure session server 1620 are encrypted over the secure session 1665, which carry the application data of the connection.

In one embodiment, the messages transmitted between the secure session server 1620 and the key server 1630 may be transmitted over a secure connection (e.g., encrypted using SSL or TLS). The session keys transmitted to the secure session server 1620 may be encrypted in such a way that the secure session server 1620 may decrypt them.

In one embodiment, the operations of 16.24, 16.26, 16.28, 16.31, 16.33, and/or 16.34 are optional. For example, in some embodiments the secure session server 1620 generates the Server Hello message instead of receiving it from the key server 1630. In such an embodiment, the secure session server 1620 may select a ServerHello.random value and transmit that value to the key server 1630 prior to the key server 1630 generating the session keys. As another example, in some embodiments the secure session server 1620 generates the Change Cipher Spec message to transmit to the client device 1610 instead of it being received from the key server 1630.

As another example, in some embodiments the secure session server 1620 generates the Finished message to transmit to the client device 1610 instead of it being received from the key server 1630. Generating the Finished message may include calculating a value using a pseudorandom function that takes as input the master secret, a finished label (e.g., a server finished label), and a hash of all of the messages in the handshake previously sent to the client device 1610 and received from the client device 1610 (e.g., the Client Hello message of operation 16.21, the Server Hello message of operation 16.25, and the Change Cipher Spec message of operation 16.27). For generating the hash, the secure session server 1620 may cache the messages that it receives from the client device 1610 and transmits to the client device 1610 such that it may generate the hash in the message. Alternatively the secure session server 1620 may use incremental hashing and update the hash value upon receiving each message from the client device 1610 and transmitting each message to the client device 1610 for generating the hash in the Finished message. In order to generate the Finished message, the secure session server 1620 receives the master secret from the key server 1630.

As another example, in some embodiments the secure session server 1620 may not transmit the Change Cipher Spec received from the client device 1610 in operation 16.30 to the key server 1630 and may not transmit the Finished message received from the client device 1610 in operation 16.33 to the key server 1630. In an embodiment where the Finished message is not transmitted to the key server 1630, the secure session server 1620 may perform the verification if it has access to the master secret from the key server 1630. For example, verifying that the key exchange was successful may include the secure session server 1620 calculating a value using a pseudorandom function that takes as input the master secret, a finished label (e.g., a client finished label), and a hash of all of the messages in the handshake previously sent to the client device 1610 and received from the client device 1610 (e.g., the Client Hello message of operation 16.21, the Server Hello message of operation 16.25, the Change Cipher Spec message of operation 16.27, the Finished message of operation 16.29, and the Change Cipher Spec message of operation 16.30). That calculated value is compared with the value received in the Finished message of operation 16.32 (the values should be the same if the key exchange was successful). It should be understood that if the verification fails, the handshake does not continue. In order to generate the hash of the messages in the handshake, the secure session server 1620 may cache the messages that it receives from the client device 1610 and sends to the client device 1610 such that it may generate the hash for the comparison. Alternatively the secure session server 1620 may use incremental hashing and update the hash value upon receiving each message from the client device 1610 and transmitting each message to the client device 1610.

As described above, the messages transmitted between the secure session server 1620 and the key server 1630 may be transmitted over a secure connection (e.g., encrypted using SSL or TLS). As part of establishing the secure session, the key server 1630 may request a client certificate from the secure session server 1620 and the secure session server 1620 may transmit a client Certificate message that includes its certificate to the key server 1630. The data in the client Certificate message is used by the key server 1630 to authenticate the identity of the secure session server 1620.

In some embodiments, the key server 1630 may use IP address blocking to accept connections (such as from the secure session server 1620) from only certain IP addresses. For example, the key server 1630 may have a whitelist of IP address(es) and/or IP address range(s) that are allowed to connect to the key server 1630 or have a blacklist of IP address(es) and/or IP address range(s) that are not allowed to connect to the key server 1630. IP address blocking may also be used at one or more intermediary network devices between the secure session server 1620 and the key server 1630.

Although a secure session has been described between the secure session server 1620 and the key server 1630 that is initiated by the secure session server 1620, in other embodiments the secure session can be initiated by the key server 1630.

In some embodiments, the messages transmitted by the secure session server 1620 to the key server 1630 are signed with a private key that is known only to the secure session server 1620. In such embodiments, the key server 1630 verifies the validity of the signature of a message prior to acting on that message. The key server 1630 verifies whether the signature is valid using the corresponding public key and will only continue with the operations if the signature is valid.

A combination of the security techniques described may be used to provide security for connection between the secure session server 1620 and the key server 1630. For example, a combination of requiring a client Certificate, IP address blocking, and signing the messages transmitted by the secure session server with a private key known only to the secure session server may be used to provide security for the connection between the secure session server 1620 and the key server 1630.

In one embodiment, the key server 1630 stores or has access to private keys for multiple domains and/or zones, which may be owned or controlled by different entities. For example, the key server 1630 may store or have access to the private key for example.com and example2.com, which may be owned or controlled by different entities. In such an embodiment, the secure session server 1620 indicates the domain or zone in which the client device 1610 is requesting a connection. For example, if the client device 1610 is requesting a secure session with example.com, then the secure session server 1620 indicates to the key server 1630 that example.com is the requested domain. The client device 1610 may specify the destination domain using the Server Name Indication (SNI) extension in the Client Hello message. SNI is described in RFC 3546, June 2003. If the client device 1610 includes the SNI extension in the Client Hello message of operation 16.1, then the Client Hello message of operation 16.2 also includes the SNI extension that indicates the destination domain. If the destination is not specified by the client device 1610 (e.g., the client device 1610 does not support SNI), then the secure session server 1620 matches the destination IP address of the client-hello message sent by the client device 1610 with the corresponding hostname (e.g., the secure session server 1620 may include a mapping of IP addresses and hostnames). The secure session server 1620 may transmit the indication of the domain or zone name to the key server 1630 in a number of different ways including in a header, a custom binary structure, or a serialization format (e.g., protobuf, JavaScript Object Notation (JSON), etc.). After receiving the indication of the domain or zone name in which the client is attempting to connect, the key server 1630 accesses the corresponding private key. In another embodiment, a certificate fingerprint or a hash of the modulus (for RSA) may be used to identify the corresponding private key. For example, the secure session server 1620 may generate a fingerprint over the certificate included in the Certificate message of operation 16.6 (e.g., a hash may be generated over the certificate) and transmit that fingerprint value to the key server 1630. The key server 1630 uses the same fingerprint algorithm to generate a fingerprint over its digital certificates and matches each to the corresponding private key. Upon receiving the fingerprint value from the secure session server 1620, the key server 1630 matches that fingerprint value with one of the fingerprint values it generated over the public certificate (the same public certificate included in the Certificate message of operation 16.6) to lookup the corresponding private key. As another example, the secure session server 1620 may hash the modulus of the public key included in the certificate of the Certificate message of operation 16.6 and transmit that hash value to the key server 1630. The key server 1630 uses the same hash algorithm to generate a hash value over the modulus over its stored public keys and matches each to the corresponding private key. Upon receiving the hash value from the secure session server 1620, the key server 1630 matches that hash value with one of the hash values it generated to lookup the corresponding private key.

In embodiments where a ticket is used for resuming a session as previously described, the key server 1630 may also renew the ticket by transmitting a message (e.g., a NewSessionTicket message) to the secure session server 1620 which may transmit the message to the client device 1610 after the Server Hello message of operation 16.25.

Although FIG. 16B illustrates the key server 1630 generating the session keys after receiving a request to resume the session, in one embodiment the secure session server 1620 generates the session keys after receiving a request to resume the session. For example, in an embodiment where the key server 1630 generates a ticket that includes the session state (e.g., the master key and the cipher suite) that is encrypted with a key that is not known or shared with the client device 1610, the key server 1630 may transmit the key to decrypt the ticket to the secure session server 1620. Accordingly, upon receiving a request to resume a session from the client device 1610 that includes a session resumption ticket, the secure session server 1620 may decrypt the ticket with the key received from the key server 1630, retrieve the session state from the contents of the ticket, and generate the session keys using the retrieved session state.

As another example, the key server 1630 may transmit the master secret to the secure session server 1620 such that secure session server 1620 may use either stateful session resumption or stateless session resumption without requiring further interaction with the key server 1630. For example in the case of stateful session resumption, the secure session server 1620 may receive the master secret from the key server 1630 and store it in association with other session state parameters in its session cache (e.g., the cipher suite). Upon receiving a request to resume a session from a client that includes a session identifier of the session to be resumed, the secure session server 1620 checks its session cache for a matching identifier and if found and the secure session server 1620 is willing to re-establish the connection (the secure session server 1620 may deny the request to resume a session for a variety of reasons including if a lifetime of the session identifier has been reached), the secure session server 1620 will use that stored session state to generate new session keys for the resumed session. In the case of stateless session resumption, the secure session server 1620 may receive the master secret from the key server 1630 and generate and encrypt the ticket that includes the session state information (encrypted with a ticket that may be only known to the secure session server 1620). The secure session server 1620 will provide the ticket to the client device 1310 (e.g., before the Change Cipher Spec message of operation 16.16 and after the Finished message of the client device 1610 has been verified). Upon receiving a request to resume a session from the client device 1610 that includes a session resumption ticket, the secure session server 1620 may decrypt the ticket, retrieve the session state from the contents of the ticket, and generate the session keys using the retrieved session state.

Figure 17:
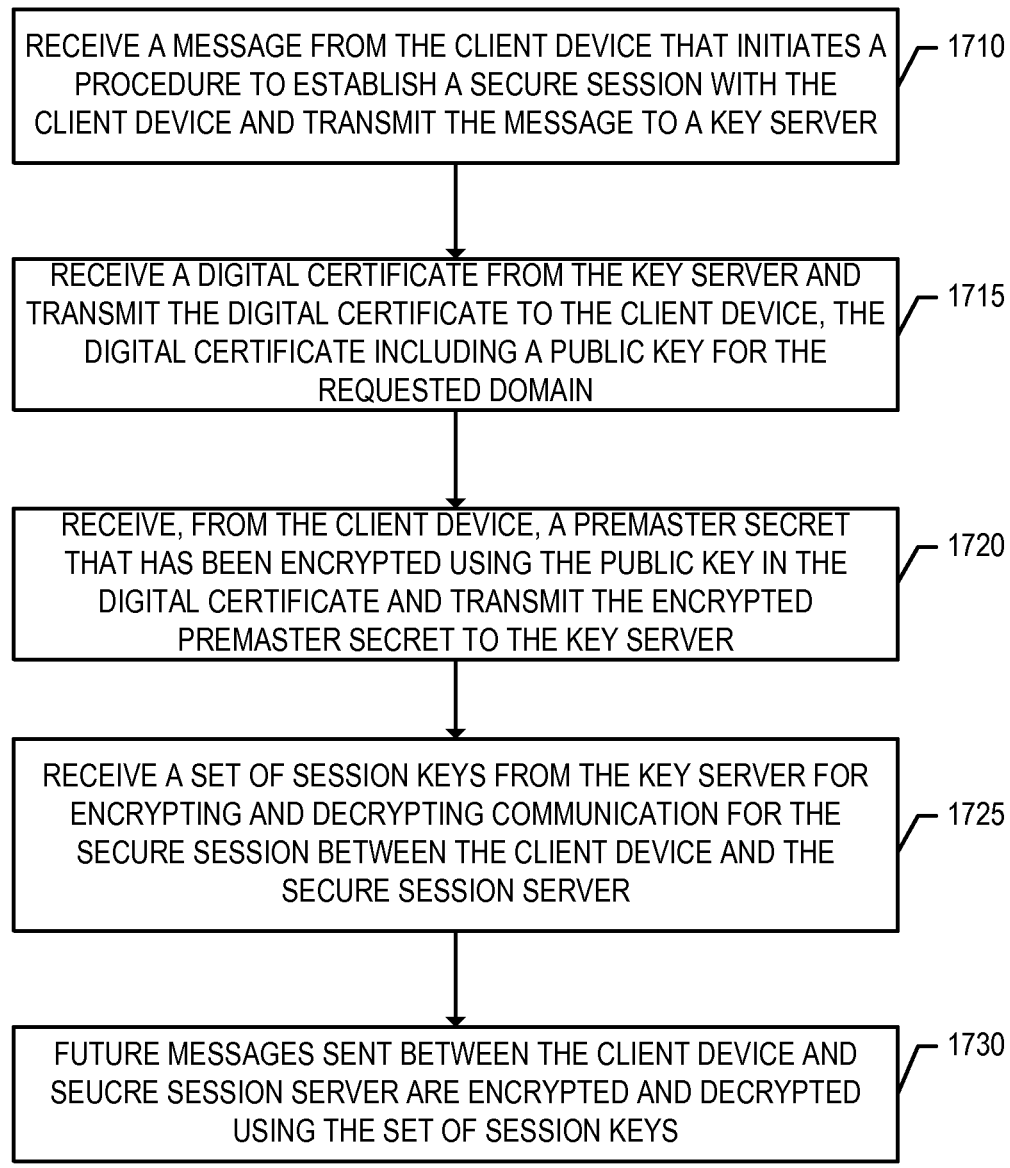
FIG. 17 is a flow diagram that illustrates exemplary operations performed by a secure session server for establishing a secure session implemented with public-key cryptography between a client device and the secure session server where the secure session server does not have access to a private key for the requested domain according to one embodiment.

FIG. 17 is a flow diagram that illustrates exemplary operations performed by the secure session server for establishing a secure session implemented with public-key cryptography between a client device and a secure session server where the secure session server does not have access to a private key for the requested domain according to another embodiment. The private key is stored remotely from the secure session server (e.g., on a key server). For example, in the embodiment described with reference to FIG. 17, the secure session server proxies the messages of the handshake between the client device and the key server where the key server generates and transmits to the secure session server the set of session keys to be used during the secure session between the client device and the secure session server.

At operation 1710, the secure session server receives a message from the client device that initiates a procedure to establish a secure session with the client device and transmits the message to a key server. For example, the secure session server may receive a Client Hello message from the client device (e.g., an SSL or TLS Client Hello message). Depending on the protocol and capabilities of the client device, the message may indicate the destination host name in which the client device wishes to establish a secure session (e.g., the Client Hello message may include the Server Name Indication (SNI) extension and specify the destination host name). The message may also include random data used for cryptographic purposes (sometimes referred to as ClientHello.random), and may indicate whether and what type of extensions (defined by the protocol) the client supports.

The secure session server may be terminating secure session connections for multiple domains that are owned by different entities and the respective private keys for those domains may be stored on different key servers. If the secure session server is supporting multiple domains whose respective private keys are stored on different key servers, the secure session server determines which key server it will transmit the message received from the client device. For example, if the client device specifies the destination domain using the SNI extension in the Client Hello message, the secure session server uses the destination domain to determine which key server the Client Hello message should be transmitted to. If the client device does not specify the destination domain using the SNI extension, then the secure session server matches the destination IP address of the message received from the client device with the corresponding hostname to determine which key server to determine which key server the message should be transmitted to (e.g., the secure session server may include a mapping of IP addresses and hostnames). The secure session server may also transmit the destination hostname to the key server (e.g., if the SNI extension is not used by the client device).

Flow then moves to operation 1715 where the secure session server receives a digital certificate from the key server and transmits the digital certificate to the client device. The digital certificate includes a public key for the requested domain. It should be understood that the private key that corresponds to the public key is not stored on the secure session server (e.g., it is stored remotely on a key server). The digital certificate may be transmitted in an SSL or TLS Certificate message. Prior to receiving the digital certificate from the key server, the secure session server may receive a Server Hello message from the key server and transmit the Server Hello message to the client device. After receiving the digital certificate from the key server, the secure session server may receive a Server Hello Done message from the key server and transmit the Server Hello Done message to the client device. Flow then moves to operation 1720.

At operation 1720, the secure session server receives from the client device a premaster secret that has been encrypted using the public key in the digital certificate transmitted in operation 1715 and transmits the encrypted premaster secret to the key server. The encrypted premaster secret may be sent by the client device in a SSL or TLS Client Key Exchange message. Flow moves from operation 1720 to operation 1725.

In response to receiving the encrypted premaster secret, the key server decrypts the encrypted premaster secret to obtain the premaster secret using the appropriate private key. Using the premaster secret along with other values (e.g., the ClientHello.random value and the ServerHello.random value), the key server generates the master secret. The client device will also generate the same master secret. The key server will also generate the session keys that will be used to encrypt and decrypt information during the secure session between the client device and the secure session server. By way of a specific example, the master secret is used along with other information to generate a client write MAC key, a server write MAC key, a client write encryption key, and a server write encryption key. A client write IV and a server write IV may also be generated depending on the cipher used.

The secure session server may also receive from the client device and transmit to the key server a message that indicates that future messages transmitted by the client device will be encrypted (e.g., a Change Cipher Spec message). In addition, the secure session server may also receive from the client device and transmit to the key server a message that has been encrypted using the session keys (e.g., a Finished message).

At operation 1725, the secure session server receives a set of session keys from the key server for encrypting and decrypting communication for the secure session between the client device and the secure session server. The secure session server may also receive from the key server and transmit to the client device a message that indicates that future messages transmitted by the secure session server will be encrypted (e.g., a Change Cipher Spec message). In addition, the secure session server may also receive from the key server and transmit to the client device a message that has been encrypted using the session keys (e.g., a Finished message). The secure session server may also receive the master secret from the key server, which may be used for resuming the secure session.

Flow then moves to operation 1730 where future messages sent between the client device and the secure session server over the secure session will be encrypted and decrypted using the set of session keys received from the key server. For example, the client write key is used by the client device to encrypt data and used by the secure session server to decrypt data received from the client device, the client write MAC key is used to authenticate data written by the client device, the server write key is used by the secure session server to encrypt data and used by the client device to decrypt data received from the secure session server, and the server write MAC key is used to authenticate data written by the secure session server.

Figure 18:
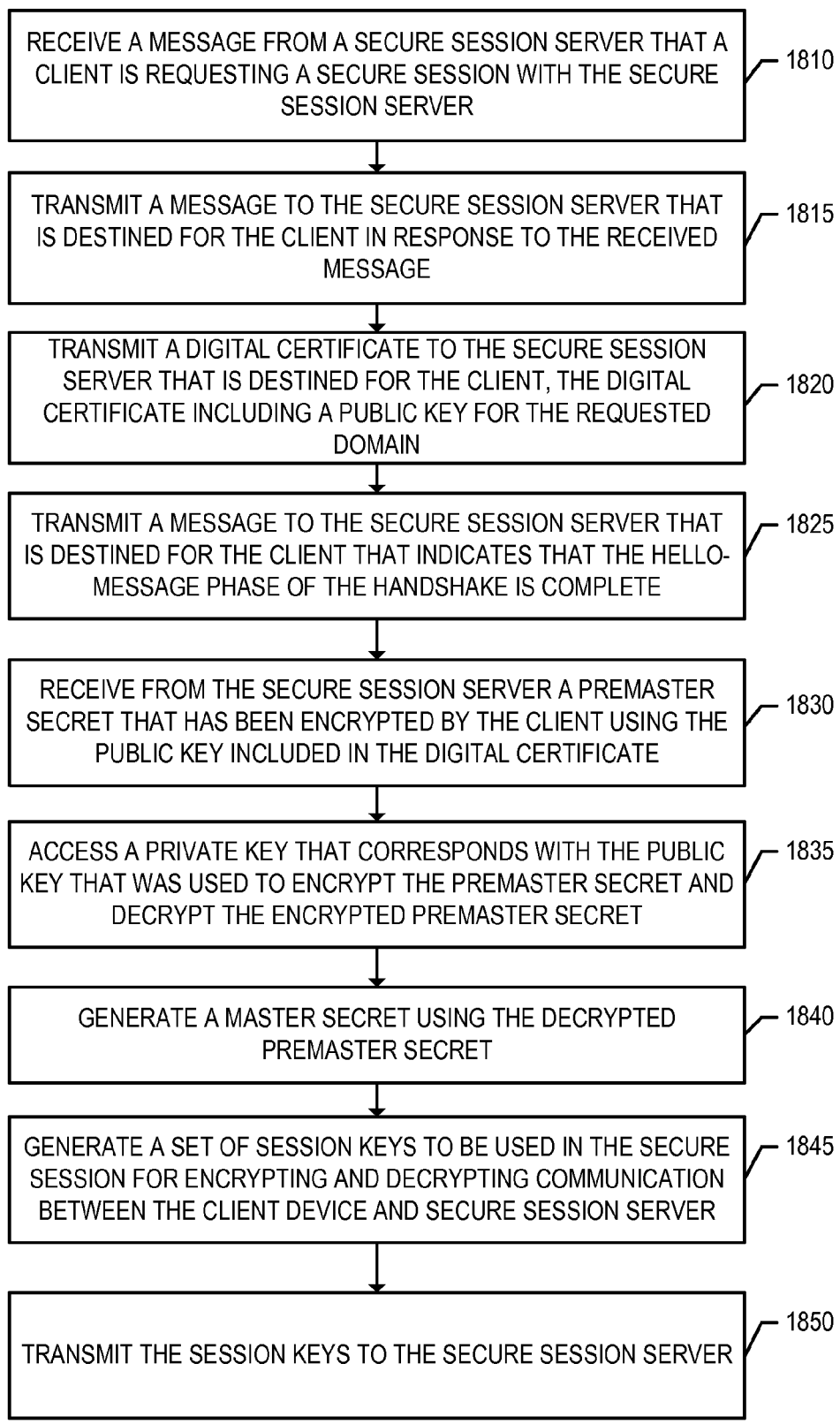
FIG. 18 is a flow diagram that illustrates exemplary operations performed by a key server for establishing a secure session connection between a client device and a secure session server that will terminate the secure session connection according to one embodiment.

FIG. 18 is a flow diagram that illustrates exemplary operations performed by a key server for establishing a secure session connection between a client device and a secure session server that will terminate the secure session connection according to one embodiment. At operation 1810, the key server receives a message from a secure session server that a client is requesting a secure session with the secure session server. For example, the message may be a Client Hello message that originated from a client device. The secure session server may also transmit an indication of the destination host name in which the client devices wishes to establish a secure session. For example, the Client Hello message may include the SNI extension that specifies the destination host name. As another example, the secure session server may otherwise indicate to the key server the destination host name if the Client Hello message does not include the SNI extension. The message may also include random data used for cryptographic purposes (sometimes referred to as ClientHello.random), and may indicate whether and what type of extensions (defined by the protocol) the client supports. Flow moves from operation 1810 to operation 1815.

At operation 1815, the key server transmits a message to the secure session server that is destined for the client in response to the message received at operation 1810. For example, the message may be a Server Hello message. This message may include the version of the SSL or TLS protocol supported, a session identifier that will be used to identify the session, the selected cipher suite (selected from the list of cipher suites included in the message received in operation 1810), random data used for cryptographic purposes that is different than the random data included in the ClientHello message (sometimes referred to as ServerHello.random), and may also include a list of the extensions that the server supports. Flow then moves to operation 1820.

At operation 1820, the key server transmits a digital certificate to the secure session server that is destined for the client for the requested domain. The digital certificate may be included in a Certificate message. The digital certificate includes a public key for the requested domain. Flow then moves to operation 1825 where the key server transmits a message to the secure session server that is destined for the client that indicates that the hello-message phase of the handshake is complete and the client can proceed with its phase of the key exchange. For example, this message may be a Server Hello Done message.

Flow then moves to operation 1830 where the key server receives from the secure session server a message that includes an encrypted premaster secret set by the client (encrypted with the public key included in the certificate sent to the client). For example, the message may be a Client Key Exchange message.

Flow then moves to operation 1835 where the key server accesses the corresponding private key and decrypts the encrypted premaster secret. Flow then moves to operation 1840 where the key server generates a master secret using at least the decrypted premaster secret. By way of a specific example, the key server may generate the master secret using a pseudorandom function that takes as input at least the premaster secret, the ClientHello.random value, and the ServerHello.random value. The client device will use the same pseudorandom function over the same input to compute the same master secret. Flow then moves to operation 1845.

At operation 1845, the key server generates a set of session keys to be used in the secure session between the client device and the secure session server for encrypting and decrypting communication between the client device and the secure session server. Generating the session keys includes at least the use of the master secret and may include other security parameters that have been negotiated between the client and the key server. For example, the other security parameters may include the ClientHello.random value, the ServerHello.random value, and an indication of the negotiated cipher suite (e.g., the information may specify the negotiated cipher suite that defines the cipher specification (the key server may look up the parameters of the cipher specification) or may specify parameters of the negotiated cipher suite for generating the session keys including information identifying the pseudorandom function (PRF) algorithm, encrypted key length, fixed IV length, and MAC key length). The session keys may include a client write MAC key, a server write MAC key, a client write encryption key, and a server write encryption key. A client write Initialization Vector (IV) and a server write IV may also be generated depending on the cipher used. Flow moves from operation 1845 to operation 1850.

The key server may also receive from the secure session server a message that indicates that future messages transmitted by the client will be encrypted (e.g., a Change Cipher Spec message). The key server may also receive from the secure session server a message that originates from the client that is encrypted using the generated session keys and is used to verify that the key exchange and authentication processes were successful (e.g., a Finished message).

At operation 1850, the key server transmits the set of session keys to the secure session server for use in the secure session between the client and the secure session server. The key server may also transmit to the secure session server that is destined for the client a message that indicates that future messages transmitted by the server will be encrypted (e.g., a Change Cipher Spec message) and/or a message that is encrypted using the generated session keys and is used by the client to verify that the key exchange and authentication processes were successful (e.g., a Finished message).

In addition to transmitting the session keys to the secure session server, the key server may also transmit the generated master secret to the secure session server. The generated master secret may be used when verifying the information included in the Finished message received from the client and when generating the Finished message to transmit to the client. In addition, the master secret may be used when resuming a session between the client device and the secure session server. For example, when a connection is established by resuming a session (e.g., the client transmits a ClientHello message with a session ID of a session that is capable of being resumed), new ClientHello.random and ServerHello.random values are generated and hashed with the master secret of the established session. If the master secret is not transmitted to the secure session server, the secure session server may request the key server to hash the new ClientHello.random and ServerHello.random values with the master secret and provide the result to the secure session server to support resumption of sessions.

If the master secret is not transmitted to the secure session server, the secure session server may transmit the value included in the Finished message received from the client device or the entire Finished message to the key server to verify that the key exchange was successful. The secure session server may generate the hash value and transmit it to the key server for use in the verification. In such an embodiment, the key server responds to the secure session server whether the key exchange was verified as successful. It should be understood that if the key exchange is not verified, the handshake will not continue.

In an alternative embodiment, instead of generating the Finished message (e.g., if the secure session server does not have access to the master secret), the secure session server transmits a request to the key server to generate the value to be included in the Finished message or to generate the entire Finished message that will be transmitted to the client device. The secure session server may also generate the hash value and transmit it to the key server for use in generating the value included in the Finished message. In such an embodiment, the key server responds to the secure session server with either the generated value to be included in the Finished message or the generated Finished message that includes the generated value.

As described above, the messages transmitted between the secure session server and the key server may be over a secure session. As part of establishing the secure session between the key server and the secure session server, the key server may request a client certificate from the secure session server in order to authenticate the identity of the secure session server. In some embodiments, the key server may use IP address based blocking to verify that the key server is communicating with a legitimate secure session server (e.g., by verifying that the secure session server is communicating with an IP address having a value that is expected by the key server). In some embodiments, the connection between the key server and the secure session server is a VPN connection. In some embodiments, the messages transmitted by the secure session server to the key server are signed with a private key that is known only to the secure session server. In such embodiments, the key server verifies the validity of the signature of a message prior to acting on that message. In some embodiments, any combination of these security techniques may be used.

Figure 19A:
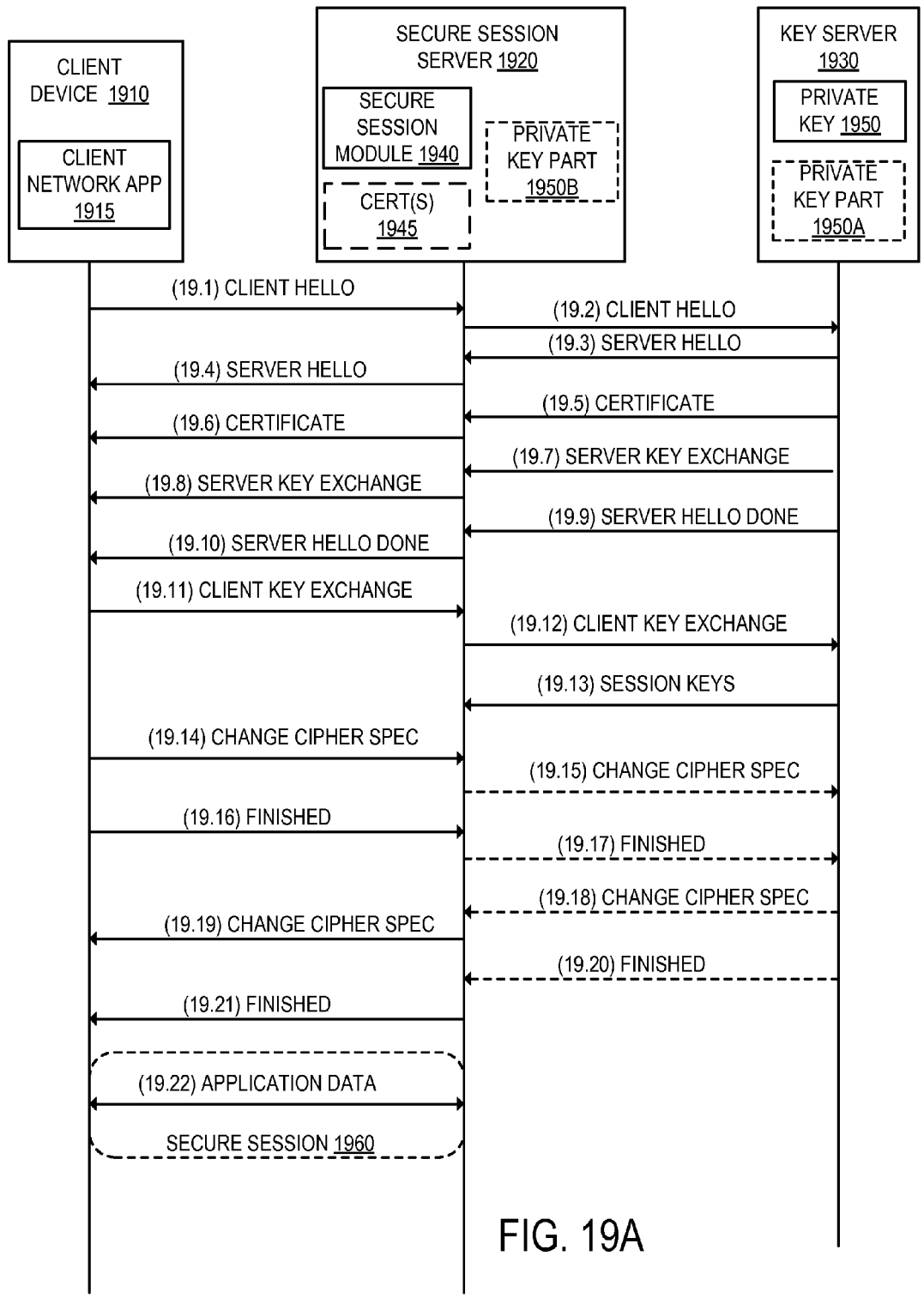
FIG. 19A illustrates another embodiment for establishing a secure session between a client device and a secure session server where the secure session server does not have access to the private key used during the secure session handshake.

FIG. 19A illustrates another embodiment for establishing a secure session between a client device and a secure session server where the secure session server does not have access to the private key used during the secure session handshake. Similar to the embodiment described in FIG. 7, the embodiment described in FIG. 19A describes the messages where the cipher suite chosen requires the use of a Server Key Exchange message (e.g., a Diffie-Hellman cipher suite is used such as DHE_RSA, DHE_DSS, ECDHE_RSA, or ECDHE_ECDSA). The client device 1910 (including the client network application 1915) is similar to the client device 110 of FIG. 1. The secure session server 1920, including the secure session module 1940 and the optional certificate(s) 1945, are similar to the secure session server 120 (including the secure session module 140 and the certificate(s) 145), but perform different operations as will be described below. The key server 1930 is similar to the key server 130 of FIG. 1, but performs different operations as will be described below.

At operation 19.1, the client device 1910 transmits a Client Hello message to the secure session server 1920. This Client Hello message is similar to the Client Hello message described in operation 1.1 of FIG. 1. At operation 19.2, the secure session server 1920 transmits the Client Hello message to the key server 1930.

In response to the Client Hello message, at operation 19.3 the key server 1930 transmits a Server Hello message to the secure session server 1920. This Server Hello message is similar to the Server Hello message described in operation 1.2 of FIG. 1. At operation 19.4, the secure session server 1920 transmits the Server Hello message to the client device 1910.

The key server 1930 also transmits a Certificate message to the secure session server 1920 at operation 19.5. This Certificate message is similar to the Certificate message described in operation 1.3 of FIG. 1. At operation 19.6, the secure session server 1920 transmits the Certificate message to the client device 1910.

With reference to the embodiment illustrated in FIG. 19A, the cipher suite that is used has a key exchange in which the certificate message transmitted in operation 19.6 does not include enough data to allow the client device 1910 to generate a premaster secret. For example, the selected cipher suite may use Diffie-Hellman as the key exchange mechanism (e.g., DHE_RSA, DHE_DSS, ECDHE_ECDSA, or ECDHE_RSA). Because of this, a message is transmitted to the client device 1910 that conveys cryptographic information to allow the client device 1910 to generate the premaster secret. By way of a specific example where the key exchange mechanism is Diffie-Hellman such as DHE_DSS or DHE_RSA, the cryptographic information includes a set of cryptographic parameters that may include the following: the prime modulus used for the Diffie-Hellman operation (p), the generator used for the Diffie-Hellman operation (g), and a Diffie-Hellman public value of the server (g^X mod p, where X is the Diffie-Hellman private value of the server). As another specific example where the key exchange mechanism is ECDHE such as ECDHE_ECDSA or ECDHE_RSA, the cryptographic parameters include the Ephemeral ECDH public key and a specification of the corresponding curve (the corresponding elliptic curve domain parameters) (e.g., as defined in RFC 4492). The message that conveys the cryptographic information is referred to as a Server Key Exchange message. The cryptographic information of the Server Key Exchange message may need to be signed with the private key 1950 corresponding to the public key that the server transmitted in the Certificate message transmitted in operation 19.6 (e.g., if the key exchange mechanism is DHE_RSA, DHE_DSS, ECDHE_ECDSA, or ECDHE_RSA). For example, private key 1950 may be used to sign the set of cryptographic parameters, the ClientHello.random value, and the ServerHello.random value. As similarly described with respect to the embodiment discussed in FIG. 1, the secure session server 1920 does not have local access to this private key 1950. As a result, the secure session server 1920 cannot sign the Server Key Exchange message with this private key 1950.

At operation 19.7, the key server 1930 transmits the Server Key Exchange message to the secure session server 1920. Since the key server 1930 has access to the private key 1950, the key server 1930 generates the cryptographic parameters and signs them using the private key 1950. In this embodiment, the private key 1950 is typically an RSA key if the key exchange mechanism is DHE_RSA or ECDHE_RSA, and is typically a Digital Signature Algorithm (DSA) key if the key exchange mechanism is DHE_DSS or an ECDSA key if the key exchange mechanism is ECDHE_ECDSA. Thus the Server Key Exchange message includes the signed cryptographic parameters. At operation 19.8, the secure session server 1920 transmits the Server Key Exchange message to the client device 1910.

At operation 19.9, the key server 1930 transmits a Server Hello Done message to the secure session server 1920 that the secure session server 1920 transmits to the client device 1910 at operation 19.10. The Server Hello done message indicates that the hello-message phase of the handshake is complete.

At operation 19.11, the secure session server 1920 receives a Client Key Exchange message from the client device 1910. The Client Key Exchange message transmitted in operation 19.11 does not include the encrypted premaster secret. Rather, this Client Key Exchange message includes information necessary to generate the same premaster secret as the client generated (e.g., it includes the client's Diffie-Hellman public value). At operation 19.12, the secure session server 1920 transmits the Client Key Exchange message to the key server 1930.

The key server 1930 generates the premaster secret using the client's Diffie-Hellman public value (received in the Client Key Exchange message) and its Diffie-Hellman private value. The key server 1930 uses the premaster secret to calculate the master secret. The client device 1910 and the key server 1930 use the same algorithm and data to calculate the same master secret. By way of example, the master secret is calculated using a pseudorandom function that takes as input the premaster secret, the ClientHello.random value, and the ServerHello.random value.

The master secret is used by the client device 1910 and the key server 1930 to generate session keys that are used to encrypt and decrypt information during the secure session. By way of example, generating the session keys includes at least the use of the master secret and may include other security parameters that have been negotiated between the client and the key server including the ClientHello.random value, the ServerHello.random value, and an indication of the negotiated cipher suite (e.g., the information may specify the negotiated cipher suite that defines the cipher specification (the key server may look up the parameters of the cipher specification) or may specify parameters of the negotiated cipher suite for generating the session keys including information identifying the pseudorandom function (PRF) algorithm, encrypted key length, fixed IV length, and MAC key length. By way of a specific example, the master secret is used to generate a client write MAC key, a server write MAC key, a client write encryption key, and a server write encryption key. A client write Initialization Vector (IV) and a server write IV may also be generated depending on the cipher used.

At operation 19.13, the key server 1930 transmits the set of session keys to the secure session server 1920 which will be used by the secure session server 1920 to encrypt and decrypt messages during the secure session between the client device 1910 and the secure session server 1920.

At operation 19.14, the secure session server 1920 receives a Change Cipher Spec message from the client device 1910 which indicates that future messages transmitted by the client device 1910 will be encrypted using the set of session keys. The secure session server 1920 transmits the Change Cipher Spec message to the key server 1930 at operation 19.15.

At operation 19.16, the secure session server 1920 receives a Finished message from the client device 1910 that is encrypted using the generated session keys and includes an encrypted hash of all of the messages in the handshake previously sent and received (previously sent and received to the client device 1910). The Finished message is used to verify that the key exchange and authentication processes were successful. By way of example, the message may include a value calculated using a pseudorandom function that takes as input the master secret, a finished label (e.g., a client finished label), and a hash of all of the message in the handshake previously sent by and to the client device 1910. The secure session server 1920 transmits the Finished message to the key server 1930 at operation 19.17. The key server 1930 will verify whether key exchange process was successful with techniques as previously described herein.

At operation 19.18, the secure session server 1920 receives a Change Cipher Spec message from the key server 1930 and transmits the Change Cipher Spec message to the client device 1910 at operation 19.19. The Change Cipher Spec indicates to the client device 1910 that future messages transmitted by the secure session server 1920 will be encrypted using the generated session keys.

At operation 19.20, the secure session server 1920 receives a Finished message from the key server 1930. The Finished message may include an encrypted hash of all of the messages in the handshake previously sent and received between the client device 1910 and the secure session server 1920. For example, the message may include a value calculated using a pseudorandom function that takes as input the master secret, a finished label (e.g., a server finished label), and a hash of all of the messages in the handshake previously sent and received. The secure session server 1920 transmits the Finished message to the client device 1910 at operation 19.21.

Thereafter, at operation 19.22, future messages of the secure session between the client device 1910 and secure session server 1920 are encrypted over the secure session 1960, which carry the application data of the connection.

In one embodiment, the messages transmitted between the secure session server 1910 and the key server 1920 may be transmitted over a secure connection (e.g., encrypted using SSL or TLS). The session keys transmitted to the secure session server 1910 in operation 19.13 may be encrypted in such a way that the secure session server may decrypt them.

In one embodiment, the operations of 19.15, 19.17, 19.18, and/or 19.20 optional. For example, the secure session server 1920 may not forward the Change Cipher Spec message to the key server 1930. In one embodiment, instead of transmitting the Change Cipher Spec of operation 19.15 and the Finished message of operation 19.17 and instead of receiving the Change Cipher Spec of operation 19.18 and the Finished message of operation 19.20, the secure session server 1920 performs the key exchange verification of the value in the Finished message 19.16 and generates and transmits the Change Cipher Spec and Finish message to the client device 1910.

In order to perform the key exchange verification using the information included in the Finished message of operation 19.16, the secure session server 1920 may receive the master secret from the key server 1930 in addition to the session keys. In one embodiment, verifying that the key exchange was successful includes using a pseudorandom function that includes as its input the master secret. For example, verifying that the key exchange was successful may include the secure session server 1920 calculating a value using the same pseudorandom function that takes as input the master secret, a finished label (e.g., a client finished label), and a hash of all of the messages in the handshake previously sent to the client device 1910 and received from the client device 1910 (e.g., the Client Hello message of operation 19.1, the Server Hello message of operation 19.4, the Certificate message of operation 19.6, the Server Key Exchange message of operation 19.8, the Server Hello Done message of operation 19.10, the Client Key Exchange message of operation 19.11, and the Change Cipher Spec message of operation 19.14). That calculated value is compared with the value received in the Finished message (the values should be the same if the key exchange was successful). It should be understood that if the verification fails, the handshake does not continue. In order to generate the hash of the messages in the handshake, the secure session server 1920 may cache the messages that it receives from the client device 1910 and transmits to the client device 1910 such that it may generate the hash for the comparison. Alternatively the secure session server 1920 may use incremental hashing and update the hash value upon receiving each message from the client device 1910 and transmitting each message to the client device 1910 for generating the hash.

The secure session server 1920 may generate and transmit a Change Cipher Spec message to the client device 1910 and generate and transmit a Finished message to the to the client device 1910. If generating the Finished message, the secure session server 1920 may cache the messages that it receives from the client device 1910 and transmits to the client device 1910 such that it may generate the encrypted hash in the message. Alternatively the secure session server 1920 may use incremental hashing and update the hash value upon receiving each message from the client device 1910 and transmitting each message to the client device 1910 to generate the hash in the Finished message. Generating the Finished message may include calculating a value using a pseudorandom function that takes as input the master secret (which is received from the key server 1930), a finished label (e.g., a server finished label), and a hash of all of the messages in the handshake previously sent to the client device 1910 and received from the client device 1910 (e.g., the Client Hello message of operation 19.1, the Server Hello message of operation 19.4, the Certificate message of operation 19.6, the Server Key Exchange message of operation 19.8, the Server Hello Done message of operation 19.10, the Client Key Exchange message of operation 19.11, the Change Cipher Spec message of operation 19.14, the Finished message of operation 19.16, and the Change Cipher Spec message of operation 19.19).

In addition to receiving the session keys from the key server 1930, the secure session server 1920 may also receive the generated master secret from the key server 1930. The generated master secret may be used when verifying the information included in the Finished message received from the client device 1910 and when generating the Finished message to transmit to the client device 1910 as previously described herein. In addition, the master secret may be used when resuming a session between the client device 1910 and the secure session server 1920. For example, when a connection is established by resuming a session (e.g., the client transmits a ClientHello message with a session ID of a session that is capable of being resumed), new ClientHello.random and ServerHello.random values are generated and hashed with the master secret of the established session. If the master secret is not transmitted to the secure session server 1920, the secure session server 1920 may request the key server 1930 to hash the new ClientHello.random and ServerHello.random values with the master secret and provide the result to the secure session server 1920 to support resumption of sessions.

Figure 19B:
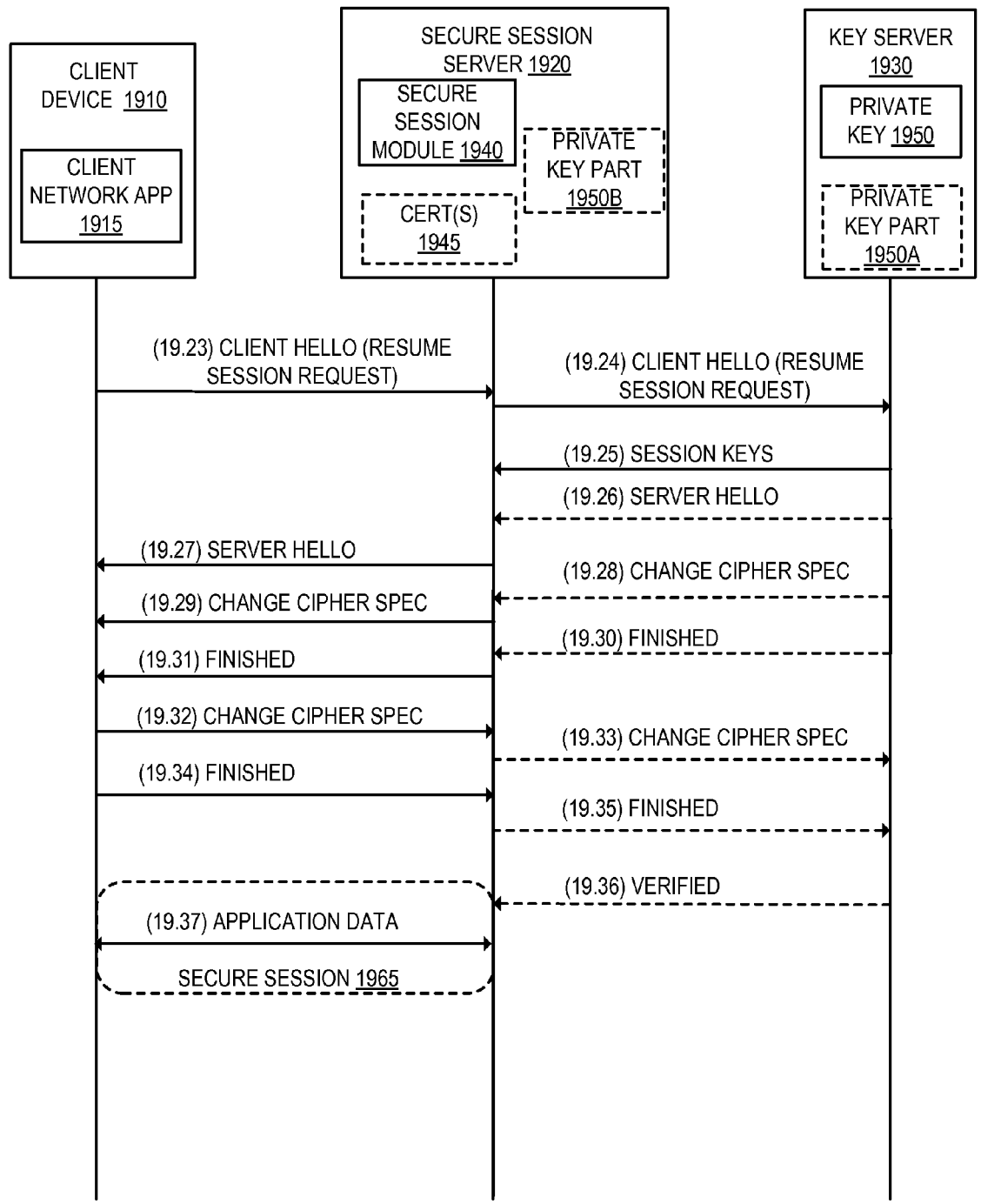
FIG. 19B illustrates exemplary operations for resuming a session according to the embodiment of FIG. 19A.

FIG. 19B illustrates exemplary operations for resuming a session according to the embodiment of FIG. 19A. Although not illustrated in FIG. 19B, prior to the operation 19.23, the secure session 1960 between the client device 1910 and the secure session server 1920 has been closed. At some point later, at operation 19.23, the secure session server 1920 receives a Client Hello message from the client device 1910. This Client Hello message differs from the Client Hello message of operation 19.1 in that it effectively includes a request to resume the session. This Client Hello message may include a session ID that was set for a previously established secure session (e.g., the secure session 1960). The Client Hello message of operation 19.23 includes a different random value than the Client Hello message of operation 19.1 (a different ClientHello.random value).

Embodiments may support the use of stateful session resumption and/or stateless session resumption. In the case of stateless session resumption, encrypted session state information is transmitted to the client device 1910 in the form of a ticket that the client may present back to the secure session server 1920 when requesting resumption of a session. The ticket includes session state (e.g., the cipher suite and the master secret) and is encrypted with a key that is not known by the client device 1910 (e.g., it may be encrypted with a key that is known only to the key server 1930 and/or to the secure session server 1920). The client device 1910 can request a session be resumed using the ticket. In some embodiments the ticket is generated by the key server 1930 whereas in other embodiments the ticket is generated by the secure session server 1920. An exemplary format of the ticket may be defined in accordance with RFC 5077. If the secure session server 1920 is generating the ticket, then the key server 1930 transmits the master secret to the secure session server 1920. If the key server 1930 is generating the ticket, the secure session server 1920 may transmit a request to the key server 1930 to generate the ticket only when the client device 1910 indicates that it supports this extension, where this request may be transmitted to the key server 1930 after the Finished message transmitted by the client device 1910 has been successfully verified. The key server 1930 receives the request to generate the ticket, generates the ticket (encrypting it with a key that is known only to the key server 1930 for example), and transmits the ticket to the secure session server 1920. The secure session server 1920 transmits the ticket to the client device 1910 before the Change Cipher Spec message of operation 19.19 and after the Finished message of the client device 1910 has been verified. In such embodiments, the Client Hello message of operation 19.23 includes the ticket (e.g., in a SessionTicket extension as defined in RFC 5077).

At operation 19.24, the secure session server 1920 transmits the Client Hello message to the key server 1930. This Client Hello message is the same or substantially the same as the Client Hello message of operation 19.23 and includes the request to resume the session.

Assuming that the session can be resumed (e.g., a valid ticket was included in the Client Hello message of operation 19.23 or the session identifier included in the Client Hello message of operation 19.23 matches session information in the key server 1930 and the key server 1930 is willing to re-establish the connection under the specified session state), the key server 1930 generates the session keys for the resumed session (which will be different than the session keys used for the secure session 1960) using the existing master secret generated for the secure session 1960, the new ClientHello.random value (included in the Client Hello message of operation 19.23), a new ServerHello.random value chosen by the key server 1930, and other security parameters that have been previously negotiated. The key server 1930 may retrieve the session state (e.g., the master secret and cipher suite) from the contents of the ticket (if included in the Client Hello message of operation 19.23) or through its session cache if resuming under stateful session resumption. The session keys may include a client write MAC key, a server write MAC key, a client write encryption key, and a server write encryption key. A client write IV and a server write IV may also be generated depending on the cipher used. The key server 1930 transmits the session keys to the secure session server 1920 at operation 19.25.

At operation 19.26, the key server transmits a Server Hello message to the secure session server 1920 that is destined for the client device 1910. This Server Hello message includes the new ServerHello.random value selected by the key server 1930. At operation 19.27, the secure session server 1920 forwards the Server Hello message to the client device 1910.

At operation 19.28, the key server 1930 transmits a Change Cipher Spec message to the secure session server 1920 which is transmitted by the secure session server 1920 to the client device 1910 at operation 19.29. The Change Cipher Spec message indicates that future messages transmitted by the secure session server 1920 will be encrypted using the newly negotiated keys.

At operation 19.30, the key server 1930 transmits a Finished message to the secure session server 1920 which is then transmitted by the secure session server 1920 to the client device 1910 at operation 19.31. The Finished message may include an encrypted hash of all the messages in the handshake to resume the session previously sent and received by the client device 1910 to verify that the key exchange was successful. In one embodiment the Finished message includes a value calculated using a pseudorandom function that takes as input the master secret, a finished label (e.g., a server finished label), and a hash of all of the messages in the handshake previously received from the client device 1910 and sent to the client device 1910 for this handshake (e.g., the Client Hello message of operation 19.23, the Server Hello message of operation 19.27, and the Change Cipher Spec message of operation 19.29).

At operation 19.32, the secure session server 1920 receives a Change Cipher Spec message from the client device 1910. The Change Cipher Spec message from the client device 1910 indicates that future messages transmitted by the client device 1910 will be encrypted using the newly negotiated keys. In one embodiment, at operation 19.33, the secure session server 1920 transmits the Change Cipher Spec message to the key server 1930. In another embodiment, the secure session server 1920 does not transmit the Change Cipher Spec message to the key server 1930.

At operation 19.34, the client device 1910 transmits a Finished message to the secure session server 1920. The Finished message is encrypted using the generated session keys. By way of example, the Finished message includes an encrypted hash of all of the messages in this handshake previously sent by and received by the client device 1910. The Finished message is used to verify that the key exchange and authentication processes were successful. For example, the message may include a value calculated using a pseudorandom function that takes as input the master secret, a finished label (e.g., a client finished label), and a hash of all of the messages in the handshake previously sent by the client device 1910 and received at the client device 1910. In one embodiment, the secure session server 1920 transmits the Finished message to the key server 1930 at operation 19.35.

In another embodiment, the secure session server 1920 does not transmit the Finished message to the key server 1930. If the secure session server 1920 does not transmit the Finished message to the key server 1930, the secure session server 1920 will verify whether the key exchange was successful. In one embodiment, verifying that the key exchange was successful includes using a pseudorandom function that includes as its input the master secret. In such an embodiment, the secure session server 1920 may receive the master secret from the key server 1930. For example, verifying that the key exchange was successful may include the secure session server 1920 calculating a value using the same pseudorandom function that takes as input the master secret, a finished label (e.g., a client finished label), and a hash of all of the messages in the handshake for this session that were previously sent to the client device 1910 and received from the client device 1910 (e.g., the Client Hello message of operation 19.23, the Server Hello message of operation 19.27, the Change Cipher Spec message of operation 19.29, the Finished message of operation 19.31, and the Change Cipher Spec message of operation 19.32). That calculated value is compared with the value received in the Finished message (the values should be the same if the key exchange was successful). It should be understood that if the verification fails, the handshake does not continue. In order to generate the hash of the messages in the handshake, the secure session server 1920 may cache the messages that it receives from the client device 1910 and transmits to the client device 1910 such that it may generate the hash for the comparison. Alternatively the secure session server 1920 may use incremental hashing and update the hash value upon receiving each message from the client device 1910 and transmitting each message to the client device 1910 for generating the hash.

At operation 19.36, the key server 1930 transmits a message indicating whether the key exchange and authentication processes were verified as being successful. Assuming that the key exchange and authentication processes are verified as being successful, thereafter at operation 19.37 future messages between the client device 1910 and the secure session server 1920 are encrypted over the secure session 1965, which carry the application data of the connection.

In one embodiment, the messages transmitted between the secure session server 1920 and the key server 1930 may be transmitted over a secure connection (e.g., encrypted using SSL or TLS). The session keys transmitted to the secure session server 1920 may be encrypted in such a way that the secure session server 1920 may decrypt them.

In one embodiment, the operations of 19.26, 19.28, 19.30, 19.33, 19.35, and/or 19.36 are optional. For example, in some embodiments the secure session server 1920 generates the Server Hello message instead of receiving it from the key server 1930. In such an embodiment, the secure session server 1920 may select a ServerHello.random value and transmit that value to the key server 1930 prior to the key server 1930 generating the session keys. As another example, in some embodiments the secure session server 1920 generates the Change Cipher Spec message to transmit to the client device 1910 instead of it being received from the key server 1930.

As another example, in some embodiments the secure session server 1920 generates the Finished message to transmit to the client device 1910 instead of it being received from the key server 1930. Generating the Finished message may include calculating a value using a pseudorandom function that takes as input the master secret, a finished label (e.g., a server finished label), and a hash of all of the messages in the handshake previously sent to the client device 1910 and received from the client device 1910 (e.g., the Client Hello message of operation 19.23, the Server Hello message of operation 19.27, and the Change Cipher Spec message of operation 19.29). For generating the hash, the secure session server 1920 may cache the messages that it receives from the client device 1910 and transmits to the client device 1910 such that it may generate the hash in the message. Alternatively the secure session server 1920 may use incremental hashing and update the hash value upon receiving each message from the client device 1910 and transmitting each message to the client device 1910 for generating the hash in the Finished message. In order to generate the Finished message, the secure session server 1920 receives the master secret from the key server 1930.

As another example, in some embodiments the secure session server 1920 may not transmit the Change Cipher Spec received from the client device 1910 in operation 19.32 to the key server 1930 and may not transmit the Finished message received from the client device 1910 in operation 19.35 to the key server 1930. In an embodiment where the Finished message is not transmitted to the key server 1930, the secure session server 1920 may perform the verification if it has access to the master secret from the key server 1930. For example, verifying that the key exchange was successful may include the secure session server 1920 calculating a value using a pseudorandom function that takes as input the master secret, a finished label (e.g., a client finished label), and a hash of all of the messages in the handshake previously sent to the client device 1910 and received from the client device 1910 (e.g., the Client Hello message of operation 19.23, the Server Hello message of operation 19.27, the Change Cipher Spec message of operation 19.29, the Finished message of operation 19.31, and the Change Cipher Spec message of operation 19.32). That calculated value is compared with the value received in the Finished message of operation 19.34 (the values should be the same if the key exchange was successful). It should be understood that if the verification fails, the handshake does not continue. In order to generate the hash of the messages in the handshake, the secure session server 1920 may cache the messages that it receives from the client device 1910 and sends to the client device 1910 such that it may generate the hash for the comparison. Alternatively the secure session server 1920 may use incremental hashing and update the hash value upon receiving each message from the client device 1910 and transmitting each message to the client device 1910.

As described above, the messages transmitted between the secure session server 1920 and the key server 1930 may be transmitted over a secure connection (e.g., encrypted using SSL or TLS). As part of establishing the secure session, the key server 1930 may request a client certificate from the secure session server 1920 and the secure session server 1920 may transmit a client Certificate message that includes its certificate to the key server 1930. The data in the client Certificate message is used by the key server 1930 to authenticate the identity of the secure session server 1920.

In some embodiments, the key server 1930 may use IP address blocking to accept connections (such as from the secure session server 1920) from only certain IP addresses. For example, the key server 1930 may have a whitelist of IP address(es) and/or IP address range(s) that are allowed to connect to the key server 1930 or have a blacklist of IP address(es) and/or IP address range(s) that are not allowed to connect to the key server 1930. IP address blocking may also be used at one or more intermediary network devices between the secure session server 1920 and the key server 1930.

Although a secure session has been described between the secure session server 1920 and the key server 1930 that is initiated by the secure session server 1920, in other embodiments the secure session can be initiated by the key server 1930.

In some embodiments, the messages transmitted by the secure session server 1920 to the key server 1930 are signed with a private key that is known only to the secure session server 1920. In such embodiments, the key server 1930 verifies the validity of the signature of a message prior to acting on that message. The key server 1930 verifies whether the signature is valid using the corresponding public key and will only continue with the operations if the signature is valid.

A combination of the security techniques described may be used to provide security for the connection between the secure session server 1920 and the key server 1930. For example, a combination of requiring a client Certificate, IP address blocking, and signing the messages transmitted by the secure session server with a private key known only to the secure session server may be used to provide security for the connection between the secure session server 1920 and the key server 1930.

In one embodiment, the key server 1930 stores or has access to private keys for multiple domains and/or zones, which may be owned or controlled by different entities. For example, the key server 1930 may store or have access to the private key for example.com and example2.com, which may be owned or controlled by different entities. In such an embodiment, the secure session server 1920 indicates the domain or zone in which the client device 1910 is requesting a connection. For example, if the client device 1910 is requesting a secure session with example.com, then the secure session server 1920 indicates to the key server 1930 that example.com is the requested domain. The client device 1910 may specify the destination domain using the SNI extension in the Client Hello message. If the destination is not specified by the client device 1910 (e.g., the client device 1910 does not support SNI), then the secure session server 1920 matches the destination IP address of the client-hello message sent by the client device 1910 with the corresponding hostname (e.g., the secure session server 1920 may include a mapping of IP addresses and hostnames). The secure session server 1920 may transmit the indication of the domain or zone name to the key server 1930 in a number of different ways including in a header, a custom binary structure, or a serialization format (e.g., protobuf, JavaScript Object Notation (JSON), etc.). After receiving the indication of the domain or zone name in which the client is attempting to connect, the key server 1330 accesses the corresponding private key. In another embodiment, a certificate fingerprint or a hash of the modulus (for RSA) may be used to identify the corresponding private key. For example, the secure session server 1920 may generate a fingerprint over the certificate included in the Certificate message of operation 19.6 (e.g., a hash may be generated over the certificate) and transmit that fingerprint value to the key server 1930. The key server 1930 uses the same fingerprint algorithm to generate a fingerprint over its digital certificates and matches each to the corresponding private key. Upon receiving the fingerprint value from the secure session server 1920, the key server 1930 matches that fingerprint value with one of the fingerprint values it generated over the public certificate (the same public certificate included in the Certificate message of operation 19.6) to lookup the corresponding private key. As another example, the secure session server 1920 may hash the modulus of the public key included in the certificate of the Certificate message of operation 19.6 and transmit that hash value to the key server 1930. The key server 1930 uses the same hash algorithm to generate a hash value over the modulus over its stored public keys and matches each to the corresponding private key. Upon receiving the hash value from the secure session server 1920, the key server 1930 matches that hash value with one of the hash values it generated to lookup the corresponding private key.

In embodiments where a ticket is used for resuming a session as previously described, the key server 1930 may also renew the ticket by transmitting a message (e.g., a NewSessionTicket message) to the secure session server 1920 which may transmit the message to the client device 1910 after the Server Hello message of operation 19.27.

Although FIG. 19 illustrates the key server 1930 generating the session keys after receiving a request to resume the session, in one embodiment the secure session server 1920 generates the session keys after receiving a request to resume the session. For example, in an embodiment where the key server 1930 generates a ticket that includes the session state (e.g., the master key and the cipher suite) that is encrypted with a key that is not known or shared with the client device 1910, the key server 1930 may transmit the key to decrypt the ticket to the secure session server 1920. Accordingly, upon receiving a request to resume a session from the client device 1910 that includes a session resumption ticket, the secure session server 1920 may decrypt the ticket with the key received from the key server 1930, retrieve the session state from the contents of the ticket, and generate the session keys using the retrieved session state.

As another example, the key server 1930 may transmit the master secret to the secure session server 1920 such that secure session server 1920 may use either stateful session resumption or stateless session resumption without requiring further interaction with the key server 1930. For example in the case of stateful session resumption, the secure session server 1920 may receive the master secret from the key server 1930 and store it in association with other session state parameters in its session cache (e.g., the cipher suite). Upon receiving a request to resume a session from a client that includes a session identifier of the session to be resumed, the secure session server 1920 checks its session cache for a matching identifier and if found and the secure session server 1920 is willing to re-establish the connection (the secure session server 1920 may deny the request to resume a session for a variety of reasons including if a lifetime of the session identifier has been reached), the secure session server 1920 will use that stored session state to generate new session keys for the resumed session. In the case of stateless session resumption, the secure session server 1920 may receive the master secret from the key server 1930 and generate and encrypt the ticket that includes the session state information (encrypted with a ticket that may be only known to the secure session server 1920). The secure session server 1920 will provide the ticket to the client device 1910 (e.g., before the Change Cipher Spec message of operation 19.19 and after the Finished message of the client device 1910 has been verified). Upon receiving a request to resume a session from the client device 1910 that includes a session resumption ticket, the secure session server 1920 may decrypt the ticket, retrieve the session state from the contents of the ticket, and generate the session keys using the retrieved session state.

Figure 20:
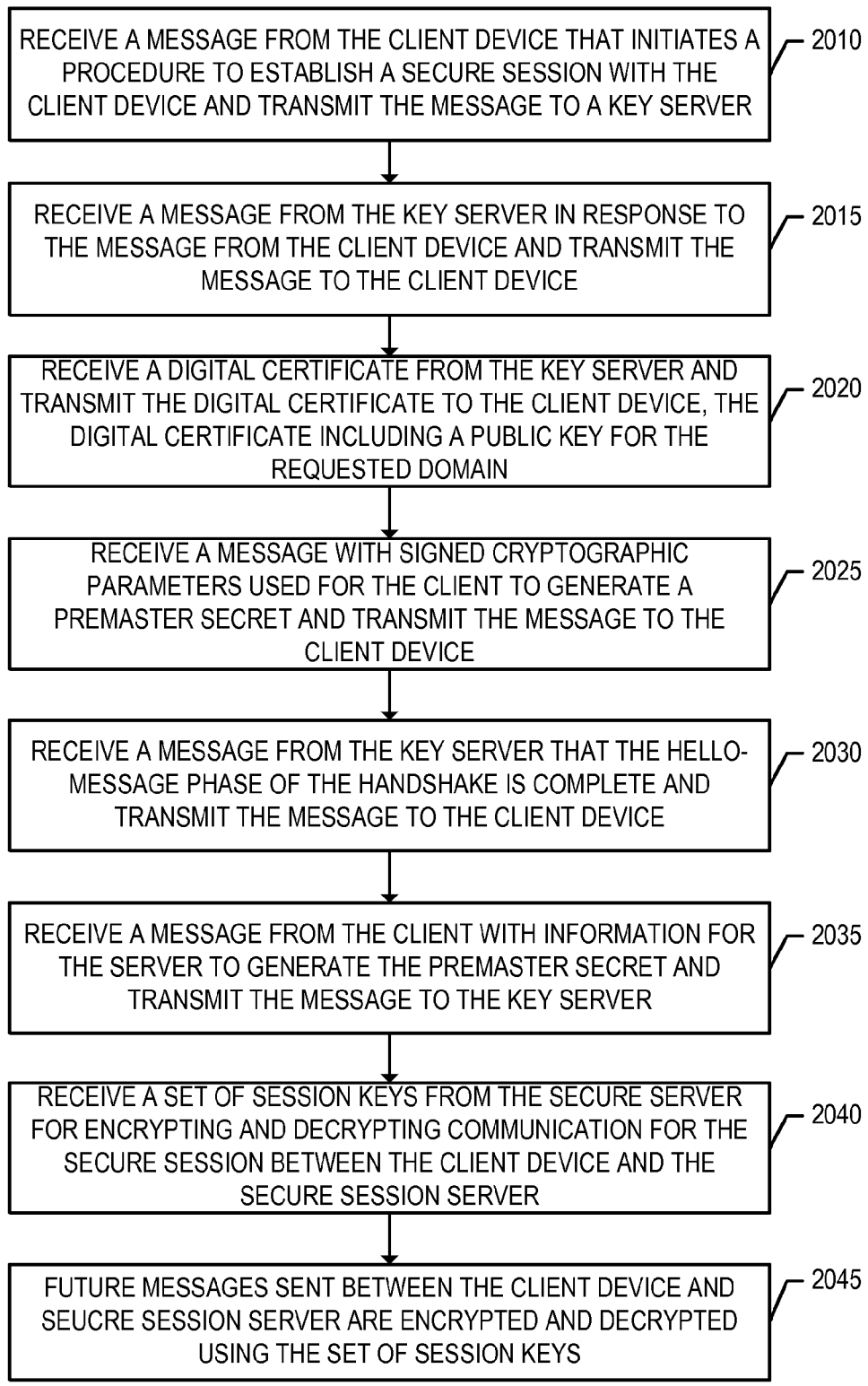
FIG. 20 is a flow diagram that illustrates exemplary operations performed by a secure session server for establishing a secure session implemented with public-key cryptography between a client device and a secure session server where the secure session server does not have access to a private key for the requested domain according to one embodiment.

FIG. 20 is a flow diagram that illustrates exemplary operations performed by a secure session server for establishing a secure session implemented with public-key cryptography between a client device and a secure session server where the secure session server does not have access to a private key for the requested domain according to another embodiment. The private key is stored remotely from the secure session server (e.g., on a key server). For example, in the embodiment described with reference to FIG. 20, the secure session server proxies the messages of the handshake between the client device and the key server where the key server generates and transmits to the secure session server the set of session keys to be used during the secure session between the client device and the secure session server.

At operation 2010, the secure session server receives a message from the client device that initiates a procedure to establish a secure session with the client device and transmits the message to a key server. For example, the secure session server may receive a Client Hello message from the client device (e.g., an SSL or TLS Client Hello message). Depending on the protocol and capabilities of the client device, the message may indicate the destination host name in which the client device wishes to establish a secure session (e.g., the Client Hello message may include the Server Name Indication (SNI) extension and specify the destination host name). The message may also include random data used for cryptographic purposes (sometimes referred to as ClientHello.random), and may indicate whether and what type of extensions (defined by the protocol) the client supports.

The secure session server may be terminating secure session connections for multiple domains that are owned by different entities and the respective private keys for those domains may be stored on different key servers. If the secure session server is supporting multiple domains whose respective private keys are stored on different key servers, the secure session server determines which key server it will transmit the message received from the client device. For example, if the client device specifies the destination domain using the SNI extension in the Client Hello message, the secure session server uses the destination domain to determine which key server the Client Hello message should be transmitted to. If the client device does not specify the destination domain using the SNI extension, then the secure session server matches the destination IP address of the message received from the client device with the corresponding hostname to determine which key server to determine which key server the message should be transmitted to (e.g., the secure session server may include a mapping of IP addresses and hostnames). The secure session server may also transmit the destination hostname to the key server (e.g., if the SNI extension is not used by the client device).

Flow then moves to operation 2015 where the secure session server receives a message from the key server in response to the message transmitted in operation 2010 and transmits the message to the client device. For example, this message may be a Server Hello message. This message may include the version of the SSL or TLS protocol supported, a session identifier that will be used to identify the session, the selected cipher suite (selected from the list of cipher suites included in the message received in operation 2010), random data used for cryptographic purposes that is different than the random data included in the ClientHello message (sometimes referred to as ServerHello.random), and may also include a list of the extensions that the server supports. Flow then moves to operation 2020.

At operation 2020, the secure session server receives a digital certificate from the key server and transmits the digital certificate to the client device. The digital certificate includes a public key for the requested domain. It should be understood that the private key that corresponds to the public key is not stored on the secure session server (e.g., it is stored remotely on a key server). The digital certificate may be transmitted in an SSL or TLS Certificate message. In the embodiment of FIG. 20, the key server has selected a cipher suite that has a key exchange in which the certificate message transmitted by the secure session server does not include enough data to allow the client device to generate a premaster secret. For example, the selected cipher suite may use Diffie-Hellman as the key exchange mechanism (e.g., DHE_RSA, DHE_DSS, ECDHE, ECDSA, or ECDHE_RSA).

Flow moves from operation 2020 to operation 2025 where the secure session server receives a message from the key server that includes a signed set of cryptographic parameters used for generating a premaster secret and the secure session server transmits the message to the client device. In one embodiment this message is a Server Key Exchange message. By way of example if the key exchange mechanism is DHE_DSS or DHE_RSA, the cryptographic parameters may include the following: the prime modulus used for the Diffie-Hellman operation (p), the generator used for the Diffie-Hellman operation (g), and a Diffie-Hellman public value of the key server (g^X mod p, where X is the Diffie-Hellman private value selected by the key server). As another specific example where the key exchange mechanism is Ephemeral Elliptic Curve Diffie-Hellman (ECDHE) such as ECDHE_ECDSA or ECDHE_RSA, the cryptographic parameters include the Ephemeral ECDH public key and a specification of the corresponding curve (the corresponding elliptic curve domain parameters) (e.g., as defined in RFC 4492). The cryptographic parameters are signed using a private key on the key server. The message may also include one or more random values (e.g., the ClientHello.random and the ServerHello.random values) that may also be part of the signed data. Flow then moves to operation 2030.

At operation 2030, the secure session server receives from the key server a message that indicates that the hello-message phase of the handshake is complete and the secure session server transmits this message to the client device. For example this message may be a Server Hello Done message. Flow then moves to operation 2035.

At operation 2035, the secure session server receives from the client device a message with information necessary to generate a premaster secret (e.g., it includes the client's Diffie-Hellman public value) and transmits the message to the key server. For example this information may be included in a Client Key Exchange message. Using this information, the key server generates a premaster secret. For example, the key server generates the premaster secret using the client's Diffie-Hellman public value and its Diffie-Hellman private value. Using the premaster secret, the key server calculates the master secret. By way of example, the master secret is calculated using a pseudorandom function that takes as input the premaster secret, the ClientHello.random value, and the ServerHello.random value. After calculating the master secret, the key server generates session keys that will be used to encrypt and decrypt information during the secure session between the client device and the secure session server. By way of a specific example, the master secret is used when generating a client write Message Authentication Code (MAC) key, a server write MAC key, a client write encryption key, and a server write encryption key. A client write Initialization Vector (IV) and a server write IV may also be generated depending on the cipher used.

Flow then moves to operation 2040 where the secure session server receives from the key server the set of session keys that will be used to encrypt and decrypt information during the secure session between the client device and the secure session server. The set of session keys may be encrypted prior to transmission to the secure session server.

Although not illustrated in FIG. 20, in some embodiments the secure session server may also receive from the client device and transmit to the key server a message that indicates that future messages transmitted by the client device will be encrypted (e.g., a Change Cipher Spec message). In addition, the secure session server may also receive from the client device and transmit to the key server a message that has been encrypted using the session keys (e.g., a Finished message).

Although not illustrated in FIG. 20, in some embodiments the secure session server may also receive from the key server and transmit to the client device a message that indicates that future messages transmitted by the secure session server will be encrypted (e.g., a Change Cipher Spec message). In addition, the secure session server may also receive from the key server and transmit to the client device a message that has been encrypted using the session keys (e.g., a Finished message).

The secure session server may also receive the master secret from the key server, which may be used for resuming the secure session among other actions.

Flow then moves to operation 2045 where future messages sent between the client device and the secure session server over the secure session will be encrypted and decrypted using the set of session keys received from the key server. For example, the client write key is used by the client device to encrypt data and used by the secure session server to decrypt data received from the client device, the client write MAC key is used to authenticate data written by the client device, the server write key is used by the secure session server to encrypt data and used by the client device to decrypt data received from the secure session server, and the server write MAC key is used to authenticate data written by the secure session server.

The messages transmitted between the secure session server and the key server described in FIG. 20 can be transmitted over a secure connection and/or can otherwise be encrypted.

Although not illustrated in FIG. 20, in some embodiments the secure session server may also receive from the client device a message that indicates that future messages transmitted by the client device will be encrypted (e.g., a Change Cipher Spec message) and a first message that has been encrypted using the session keys (e.g., a Finished message). This first encrypted message may be used by the secure session server to verify that the key exchange and authentication processes were successful. This message may include a value calculated using a pseudorandom function that takes as input the master secret, a finished label (e.g., a client finished label), and a hash of all of the messages in the handshake previously received from and sent to the client device. Instead of transmitting these messages to the key server, in one embodiment the secure session server performs the key exchange verification using the value in the first encrypted message using the negotiated session keys (the Finished message). For example, verifying that the key exchange was successful may include the secure session server calculating a value using the same pseudorandom function that takes as input the master secret, the finished label (e.g., the client finished label), and the hash of all of the messages in the handshake previously received from and sent to the client device; and comparing that value with the value received in the Finished message (the values should be the same if the key exchange was successful). In such an embodiment, the key server transmits the master secret to the secure session server which uses the master secret in the verification. In order to generate the hash of the messages in the handshake for use in the verification, the secure session server may cache the messages that it receives from the client device and sends to the client device such that it may generate the hash for the comparison. Alternatively the secure session server 1320 may use incremental hashing and update the hash value upon receiving each message from the client device 1310 and transmitting each message to the client device 1310.

The secure session server may also generate and transmit to the client a message that indicates that future messages transmitted by the secure session server will be encrypted (e.g., a Change Cipher Spec message) and generate and transmit to the client a first message that has been encrypted using the session keys (e.g., a Finished message). This first message (the Finished message) may be used by the client device to verify that the key exchange and authentication processes were successful and may include a value calculated using a pseudorandom function that takes as input the master secret, a finished label (e.g., a server finished label), and a hash of all of the messages in the handshake previously received from the client device and sent to the client device. If generating the Finished message, the secure session server may cache the messages that it receives from the client device and transmits to the client device such that it may generate the encrypted hash in the message. Alternatively the secure session server may use incremental hashing and update the hash value upon receiving each message from the client device and transmitting each message to the client device for generating the hash in the Finished message.

Figure 21:
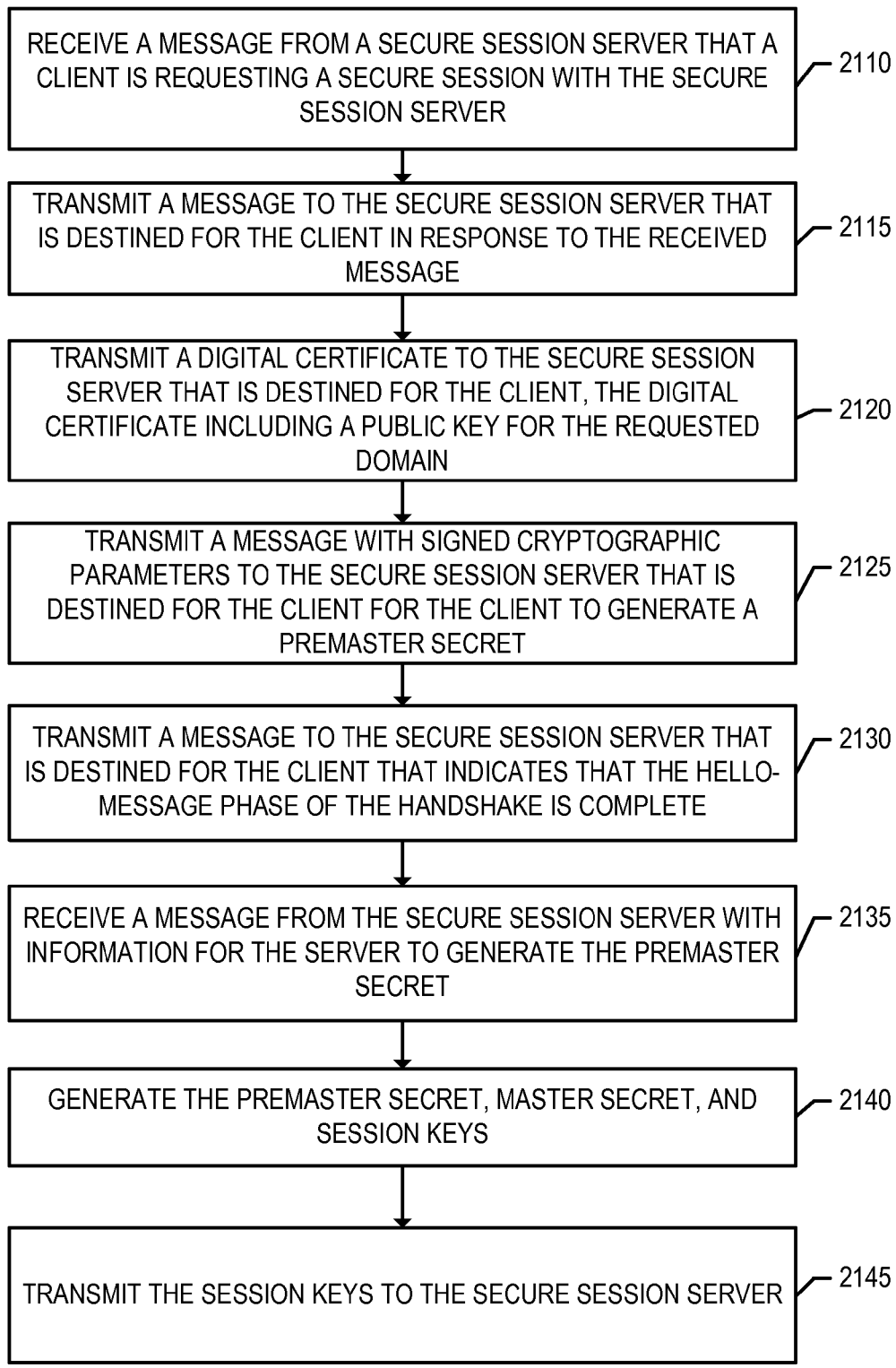
FIG. 21 is a flow diagram that illustrates exemplary operations performed on a key server for establishing a secure session implemented with public-key cryptography between a client device and a secure session server where the secure session server does not have access to a private key for the requested domain according to one embodiment.

FIG. 21 is a flow diagram that illustrates exemplary operations performed on a key server for establishing a secure session implemented with public-key cryptography between a client device and a secure session server where the secure session server does not have access to a private key for the requested domain according to another embodiment. At operation 2110, the key server receives a message from a secure session server that a client is requesting a secure session with the secure session server. For example, the message may be a Client Hello message that originated from a client device. The secure session server may also transmit an indication of the destination host name in which the client devices wishes to establish a secure session. For example, the Client Hello message may include the SNI extension that specifies the destination host name. As another example, the secure session server may otherwise indicate to the key server the destination host name if the Client Hello message does not include the SNI extension. The message may also include random data used for cryptographic purposes (sometimes referred to as ClientHello.random), and may indicate whether and what type of extensions (defined by the protocol) the client supports. Flow moves from operation 2110 to operation 2115.

At operation 2115, the key server transmits a message to the secure session server that is destined for the client in response to the message received at operation 2110. For example, the message may be a Server Hello message. This message may include the version of the SSL or TLS protocol supported, a session identifier that will be used to identify the session, the selected cipher suite (selected from the list of cipher suites included in the message received in operation 2110), random data used for cryptographic purposes that is different than the random data included in the ClientHello message (sometimes referred to as ServerHello.random), and may also include a list of the extensions that the server supports. Flow then moves to operation 2120.

At operation 2120, the key server transmits a digital certificate to the secure session server that is destined for the client for the requested domain. The digital certificate may be included in a Certificate message. The digital certificate includes a public key for the requested domain. Flow moves from operation 2120 to operation 2125.

In the example of FIG. 21, the key server has selected a cipher suite that has a key exchange in which the certificate message transmitted by the key server does not include enough data to allow the client device to generate a premaster secret. For example, the selected cipher suite may use Diffie-Hellman as the key exchange mechanism (e.g., DHE_RSA, DHE_DSS, ECDHE, ECDSA, or ECDHE_RSA).

At operation 2125, the key server transmits a message to the secure session server that is destined for the client, the message having signed cryptographic parameters for the client to generate a premaster secret. In one embodiment this message is a Server Key Exchange message. By way of example if the key exchange mechanism is DHE_DSS or DHE_RSA, the cryptographic parameters may include the following: the prime modulus used for the Diffie-Hellman operation (p), the generator used for the Diffie-Hellman operation (g), and a Diffie-Hellman public value of the key server ($g^X \mod p$, where X is the Diffie-Hellman private value selected by the key server). As another specific example where the key exchange mechanism is ECDHE such as ECDHE_ECDSA or ECDHE_RSA, the cryptographic parameters include the Ephemeral ECDH public key and a specification of the corresponding curve (the corresponding elliptic curve domain parameters) (e.g., as defined in RFC 4492). The cryptographic parameters are signed using a private key on the key server. The message may also include one or more random values (e.g., the ClientHello.random and the ServerHello.random values) that may also be part of the signed data. Flow then moves to operation 2130.

At operation 2130 the key server transmits a message to the secure session server that is destined for the client that indicates that the hello-message phase of the handshake is complete and the client can proceed with its phase of the key exchange. For example, this message may be a Server Hello Done message.

Flow then moves to operation 2135 where the key server receives a message from the secure session server with information for the key server to generate the same premaster. For example, the message may include the client's Diffie-Hellman public value. In one embodiment, this message is a Client Key Exchange message. Flow moves from operation 2135 to operation 2140.

At operation 2140, the key server generates premaster secret, the master secret, and the session keys that will be used for encrypting and decrypting communication for the secure session between the client and the secure session server. The key server generates the premaster secret using the client's Diffie-Hellman public value (received in the message of operation 2135) and its Diffie-Hellman private value. The key server uses the premaster secret to calculate the master secret.

The client requesting the secure session and the key server use the same algorithm and data to calculate the same master secret. By way of example, the master secret is calculated using a pseudorandom function that takes as input the premaster secret, the ClientHello.random value, and the ServerHello.random value. The master secret is used by the key server when generating the session keys that are used to encrypt and decrypt information during the secure session. By way of a specific example, the session keys may include a client write Message Authentication Code (MAC) key, a server write MAC key, a client write encryption key, and a server write encryption key. A client write Initialization Vector (IV) and a server write IV may also be generated depending on the cipher used. Flow moves from operation 2140 to operation 2145.

At operation 2145, the key server transmits the set of session keys to the secure session server for use in the secure session between the client device and the secure session server.

Although not illustrated in FIG. 21, in some embodiments the key server may receive from the secure session a message that indicates that future messages transmitted by the client device will be encrypted (e.g., a Change Cipher Spec message). The key server may also receive from the secure session server a first message that has been encrypted using the session keys (e.g., a Finished message). In such an embodiment where the key server receives a Finished message, the key server may verify that the key exchange and authentication processes were successful. The key server may also transmit to the secure session server a message that is destined for the client that indicates that future messages transmitted will be encrypted (e.g., a Change Cipher Spec message). The key server may also transmit to the secure session server a first message that is destined for the client and that has been encrypted using the session keys (e.g., a Finished message).

Although not illustrated in FIG. 21, in some embodiments the key server transmits the master secret it generated to the secure session server. The secure session server may use the master secret when responding to a request to resume the secure session using techniques as previously described herein. The secure session server may use the master secret when verifying that the key exchange was successful (e.g., verifying the value included in a Finished message received from the client device) or when generating the Finished message to transmit to the client.

The messages transmitted between the secure session server and the key server described in FIG. 21 can be transmitted over a secure connection between the secure session server and the key server and/or can otherwise be encrypted. If a secure connection is used, as part of establishing that secure connection the key server may request a client certificate from the secure session server in order to authenticate the identity of the secure session server. In some embodiments, the key server may use IP address based blocking to verify that the key server is communicating with a legitimate secure session server (e.g., by verifying that the secure session server is communicating with an IP address having a value that is expected by the key server). In some embodiments, the connection between the key server and the secure session server is a VPN connection. In some embodiments, the messages transmitted by the secure session server to the key server are signed with a private key that is known only to the secure session server. In such embodiments, the key server verifies the validity of the signature of a message prior to acting on that message. In some embodiments, any combination of these security techniques may be used.

Unlike traditional secure session implementations where the secure session server has local access to the private key during the handshake, in embodiments of the invention the private key is not locally accessible to the secure session server. This provides increased security during the secure session handshake. For example, although the secure session server may deliver web content on behalf of a website, the secure session server may not be at the physical premises of the website owner and/or be controlled by the website owner. This may cause the website owner to not trust the security of the secure session server and/or the operators of the secure session server. However, because the private key is stored remotely (not on the secure session server) and is instead stored on a key server in embodiments of the invention, the website owner does not lose control of the private key while still allowing for a secure session server that it does not control to provide secure session capability.

While embodiments described herein can be used for securing web traffic, the embodiments described herein can also be used to secure any network traffic that relies on key-based cryptography for security.

In one embodiment, the secure session server and the key server are owned by different entities. For example, the secure session server may be a proxy server in a cloud-based proxy service that provides one or more services for one or more domain owners. By way of example, the cloud-based proxy service may provide services including protecting against Internet-based threats (e.g., proactively stopping botnets, cleaning viruses, trojans, and worms, etc.), providing performance services for customers (e.g., acting as a node in a content delivery network (CDN) and dynamically caching customer's files closer to visitors, page acceleration, content optimization services, etc.), image loading optimization (e.g., deferred image loading and/or auto-resizing), and/or other services. The key server may be owned or operated by a domain owner that is a customer of the cloud-based proxy service. By way of a specific example, the domain owner of example.com may be a customer of the cloud-based proxy service. The key server may be operated or under control of the domain owner, while the secure session server receives and transmits network traffic over a secure session between client devices and the secure session server for example.com, where the secure session was established using embodiments described herein where the private key is stored remotely from the secure session server. As a specific example, the key server may be an origin server of the website owner.

By way of a specific example, after establishing the secure session between a client device and the secure session server, the secure session server may receive an encrypted request for a resource (the resource may be hosted on the secure session server, the key server, or on a different server). The secure session server decrypts the encrypted request to determine the resource the client device is requesting. The secure session server then retrieves the requested resource. The resource may be retrieved locally by the secure session server (e.g., if the resource is locally available) or may be requested from an origin server that hosts the resource. In one embodiment, the secure session server may be a node in a CDN. In one embodiment, the secure session server and the key server are operated with different levels of security. For example, the key server may be operating in a high-security zone and the secure session zone may be operating in a lower-security zone.

In one embodiment, embodiments described herein may be used in a CDN where there may be one or more trusted nodes that store the private keys and perform the operations of the key server described herein and one or more untrusted nodes that perform the operations of the secure session server described herein. The untrusted and trusted nodes may be separated across a Wide Area Network. In some embodiments the untrusted nodes request the trusted nodes to sign the secure sessions and the secure sessions stay active for a configurable amount of time on the untrusted node without having to query the trusted nodes.

Embodiments described herein have described the secure session server and key server communicating over a connection (which may be a secure connection). In some embodiments this connection is a persistent connection (also referred to as a keep-alive connection) while in other embodiments this connection is established on demand each time a secure session is established.

In some embodiments, there may be multiple key servers that have the same private key(s) for which a secure session server may access. In such an embodiment, the traffic between the secure session server(s) and the key servers may be load balanced to distribute the load among the key servers. A secure session server may take a round-robin approach when selecting a particular one of the key servers. Alternatively, when selecting a particular one of the key servers, a secure session server may select the key server that has the fastest response, the shortest distance, the least load, or a combination thereof.

Embodiments have described a key server remote from the server that is terminating the secure session (the secure session server) storing private key(s) and using those private key(s) when establishing and/or resuming a secure session between a client device and the secure session server. In some embodiments, the key server may offload the private key operation (whether the private key operation is decrypting an encrypted premaster secret or signing cryptographic parameters as previously described herein) to a trusted platform module (TPM) or a hardware security module (HSM). The TPM or HSM could be part of the same physical device of the key server or may be connected to the key server through a network.

Splitting the Private Key

Embodiments have been described herein where the private key is stored on a server that is remote from the termination point of the secure connection. In some embodiments these private keys are stored in hardware security module(s) or trusted platform module(s). In other embodiments a private key is split into multiple parts that are stored in different entities (each of which may or may not also be stored in a hardware security module or trusted platform module). By way of a specific example, a private key may be split into at least two parts where at least one part is stored at the secure session server and at least one part is stored at a remote key server. By way of another example, a private key may be split into at least two parts where at least one part is stored at a first key server and another part is stored at a second key server.

In an embodiment where the private key is split into multiple parts where at least a first part is stored at a secure session server and a second part is stored at a key server, when a private key operation is needed in the secure session handshake, the secure session server transmits the part of the key that it is storing to the key server and the key server combines the parts to reconstruct the private key and uses the private key accordingly. The private key is split such that it is infeasible to derive the private key from a single part. By way of example, the private key may be split using Shamir's Secret Sharing or through other suitable ways of splitting the key. The whole private key may be removed from the key server after splitting the key into multiple parts. Prior to removing the key, the key server may generate an identifier of the private key and associate it with the private key part. For example, the identifier may be hash value generated as a result of a hash function over the private key. Other identifiers could also be used. Splitting the private key and not storing the whole private key in a single entity helps protect against a situation where either the secure session server or the key server is compromised since only a part of the private key cannot be used.

For example, with respect to FIG. 1, instead of the key server 130 storing the entire private key 150, the private key 150 may be split into multiple parts where a first part is stored at the secure session server 120 and a second part is stored at the key server 130. This is illustrated in FIG. 1 with the dashed box of the private key part 150A and the private key part 150B. The private key part 150B can be transmitted by the key server 130 to the secure session server 120 or otherwise installed at the secure session server 120. In addition, the private key part 150B may be associated with an identifier (e.g., a hash of the private key 150) that can be transmitted by the key server 130 or otherwise installed at the secure session server 120. At operation 1.6, or in another message, the secure session server 120 transmits the private key part 150B to the key server 130. The key server 130 receives the private key part 150B and reconstructs the private key 150 using the private key part 150A and the private key part 150B and the operations proceed as described with respect to FIG. 1. In addition to transmitting the private key part 150B, the secure session server 120 may also transmit an identifier that is associated with the private key part 150B (e.g., a hash of the private key 150). The key server 130 may use this identifier when accessing the private key part 150A.

A split key approach may also be used with respect to the embodiment described in FIG. 4. For example, instead of the key server 430 storing the entire private key 450, the private key 450 may be split into multiple parts where a first part is stored at the secure session server 420 and a second part is stored at the key server 430. This is illustrated in FIG. 4 with the dashed box of the private key part 450A and the private key part 450B. The private key part 450B can be transmitted by the key server 430 to the secure session server 420 or otherwise installed at the secure session server 420. In addition, the private key part 450B may be associated with an identifier (e.g., a hash of the private key 450) that can be transmitted by the key server 430 or otherwise installed at the secure session server 420. At operation 4.4, or in another message, the secure session server 420 transmits the private key part 450B to the key server 430. The key server 430 receives the private key part 450B and reconstructs the private key 450 using the private key part 450A and the private key part 450B and the operations proceed as described with respect to FIG. 4. In addition to transmitting the private key part 450B, the secure session server 420 may also transmit an identifier that is associated with the private key part 450B (e.g., a hash of the private key 450). The key server 430 may use this identifier when accessing the private key part 450A.

In a similar way as described with respect to FIG. 4, a split key approach may also be used with respect to the embodiment described in FIG. 7. For example, instead of the key server 730 storing the entire private key 750, the private key 750 may be split into multiple parts where a first part is stored at the secure session server 720 and a second part is stored at the key server 730. This is illustrated in FIG. 7 with the dashed box of the private key part 750A and the private key part 750B. The private key part 750B can be transmitted by the key server 730 to the secure session server 720 or otherwise installed at the secure session server 720. In addition, the private key part 750B may be associated with an identifier (e.g., a hash of the private key 750) that can be transmitted by the key server 730 or otherwise installed at the secure session server 720. At operation 7.4, or in another message, the secure session server 720 transmits the private key part 750B to the key server 730. The key server 730 receives the private key part 750B and reconstructs the private key 750 using the private key part 750A and the private key part 750B and the operations proceed as described with respect to FIG. 7. In addition to transmitting the private key part 750B, the secure session server 720 may also transmit an identifier that is associated with the private key part 750B (e.g., a hash of the private key 750). The key server 730 may use this identifier when accessing the private key part 750A.

A split key approach may also be used with respect to the embodiment described in FIG. 10. For example, instead of the key server 1030 storing the entire private key 1050, the private key 1050 may be split into multiple parts where a first part is stored at the secure session server 1020 and a second part is stored at the key server 1030. This is illustrated in FIG. 10 with the dashed box of the private key part 1050A and the private key part 1050B. The private key part 1050B can be transmitted by the key server 1030 to the secure session server 1020 or otherwise installed at the secure session server 1020. In addition, the private key part 1050B may be associated with an identifier (e.g., a hash of the private key 1050) that can be transmitted by the key server 1030 or otherwise installed at the secure session server 1020. At operation 10.6, or in another message, the secure session server 1020 transmits the private key part 1050B to the key server 1030. The key server 1030 receives the private key part 1050B and reconstructs the private key 1050 using the private key part 1050A and the private key part 1050B and the operations proceed as described with respect to FIG. 10. In addition to transmitting the private key part 1050B, the secure session server 1020 may also transmit an identifier that is associated with the private key part 1050B (e.g., a hash of the private key 1050). The key server 1030 may use this identifier when accessing the private key part 1050A.

A split key approach may also be used with respect to the embodiment described in FIG. 13. For example, instead of the key server 1330 storing the entire private key 1350, the private key 1350 may be split into multiple parts where a first part is stored at the secure session server 1320 and a second part is stored at the key server 1330. This is illustrated in FIG. 13 with the dashed box of the private key part 1350A and the private key part 1350B. The private key part 1350B can be transmitted by the key server 1330 to the secure session server 1320 or otherwise installed at the secure session server 1320. In addition, the private key part 1350B may be associated with an identifier (e.g., a hash of the private key 1350) that can be transmitted by the key server 1330 or otherwise installed at the secure session server 1320. At operation 13.6, or in another message, the secure session server 1320 transmits the private key part 1350B to the key server 1330. The key server 1330 receives the private key part 1350B and reconstructs the private key 1350 using the private key part 1350A and the private key part 1350B and the operations proceed as described with respect to FIG. 13. In addition to transmitting the private key part 1350B, the secure session server 1320 may also transmit an identifier that is associated with the private key part 1350B (e.g., a hash of the private key 1350). The key server 1330 may use this identifier when accessing the private key part 1350A.

A split key approach may also be used with respect to the embodiment described in FIGS. 16A-B. For example, instead of the key server 1630 storing the entire private key 1650, the private key 1650 may be split into multiple parts where a first part is stored at the secure session server 1620 and a second part is stored at the key server 1630. This is illustrated in FIGS. 16A-B with the dashed box of the private key part 1650A and the private key part 1650B. The private key part 1650B can be transmitted by the key server 1630 to the secure session server 1620 or otherwise installed at the secure session server 1620. In addition, the private key part 1650B may be associated with an identifier (e.g., a hash of the private key 1650) that can be transmitted by the key server 1630 or otherwise installed at the secure session server 1620. At operation 16.10, or in another message, the secure session server 1620 transmits the private key part 1650B to the key server 1630. The key server 1630 receives the private key part 1650B and reconstructs the private key 1650 using the private key part 1650A and the private key part 1650B and the operations proceed as described with respect to FIG. 16A. As an example with respect to FIG. 16B, at operation 16.22 or in another message prior to the key server 1630 generating the session keys, the secure session server 1620 transmits the private key part 1650B to the key server 1630. The key server 1630 receives the private key part 1650B and reconstructs the private key 1650 using the private key part 1650A and the private key part 1650B and the operations proceed as described with respect to FIG. 16B. In addition to transmitting the private key part 1650B, the secure session server 1620 may also transmit an identifier that is associated with the private key part 1650B (e.g., a hash of the private key 1650). The key server 1630 may use this identifier when accessing the private key part 1650A. The key server 1630 may discard the private key part 1650B and the reconstructed private key shortly after using the reconstructed private key. For example, shortly after decrypting the encrypted premaster secret, the key server 1630 may remove the private key part 1650B and the reconstructed private key from memory. Thus, the key server 1630 does not permanently store the private key part 1650B or the reconstructed private key.

A split key approach may also be used with respect to the embodiment described in FIGS. 19A-B. For example, instead of the key server 1930 storing the entire private key 1950, the private key 1950 may be split into multiple parts where a first part is stored at the secure session server 1920 and a second part is stored at the key server 1930. This is illustrated in FIG. 19 with the dashed box of the private key part 1950A and the private key part 1950B. The private key part 1950B can be transmitted by the key server 1930 to the secure session server 1920 or otherwise installed at the secure session server 1920. In addition, the private key part 1950B may be associated with an identifier (e.g., a hash of the private key 1950) that can be transmitted by the key server 1930 or otherwise installed at the secure session server 1920. With respect to FIG. 19A, prior to operation 19.7, the secure session server 1920 transmits the private key part 1950B to the key server 1930. The key server 1930 receives the private key part 1950B and reconstructs the private key 1950 using the private key part 1950A and the private key part 1950B and the operations proceed as described with respect to FIG. 19A.

Embodiments have been described herein that describe a key server that is remote from the server that is terminating the secure session (the secure session server) storing private key(s) and using those private key(s) when establishing and/or resuming a secure session between a client device and the secure session server. In some embodiments the secure session server may request the private key from the key server when a private key operation is needed and store the private key in memory (typically volatile memory) for a limited amount of time (e.g., only until the private key operation is complete). In other words, the secure session server does not permanently store the private key but instead requests it on demand from the key server and it only resides in memory of the secure session server for a limited amount of time.

Figure 22:
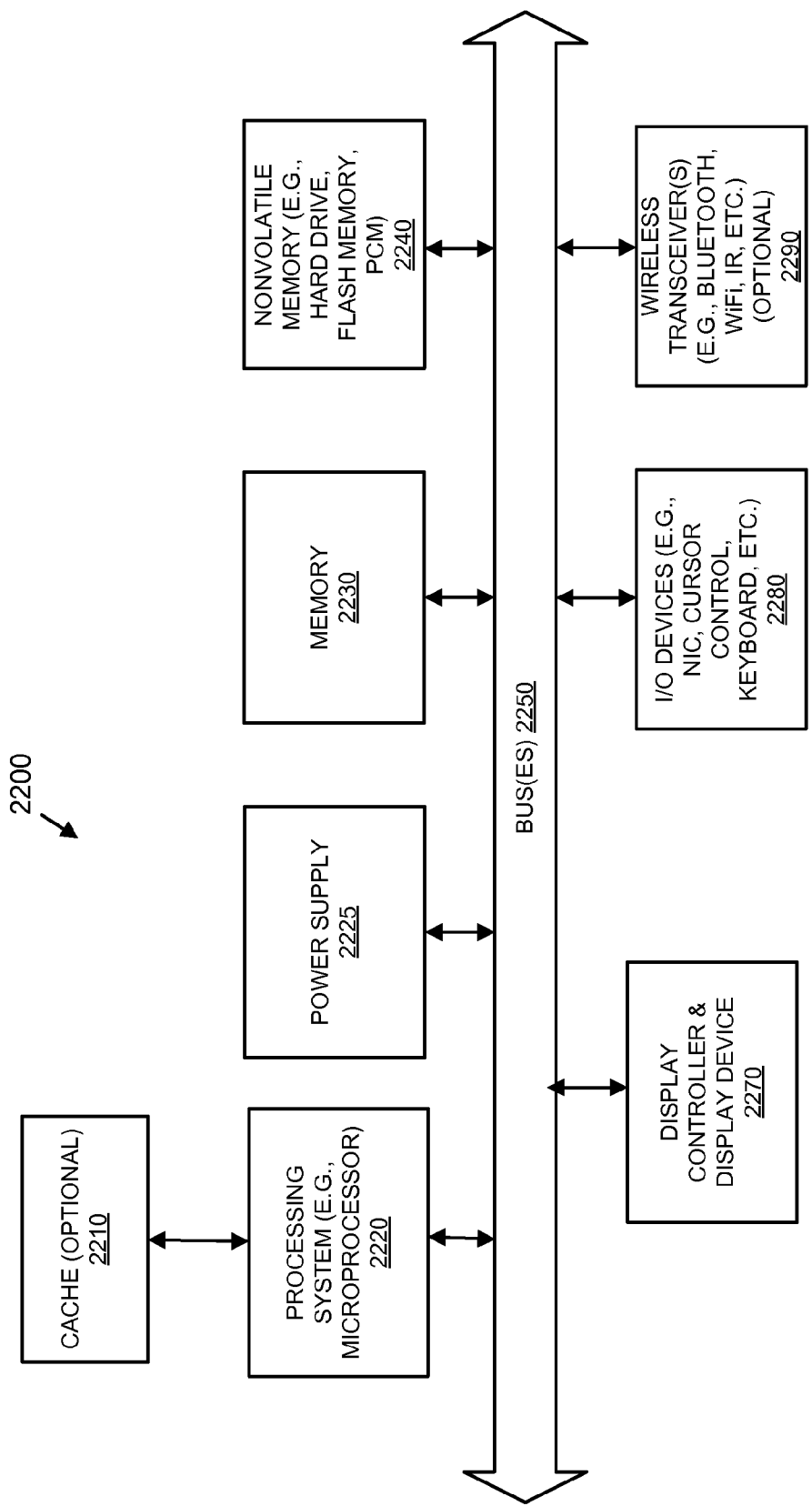
FIG. 22 is a block diagram illustrating an exemplary computing device that may be used in accordance with embodiments of the invention.

As illustrated in FIG. 22, the computing device 2200, which is a form of a data processing system, includes the bus(es) 2250 which is coupled with the processing system 2220, power supply 2225, memory 2230, and the nonvolatile memory 2240 (e.g., a hard drive, flash memory, Phase-Change Memory (PCM), etc.). The bus(es) 2250 may be connected to each other through various bridges, controllers, and/or adapters as is well known in the art. The processing system 2220 may retrieve instruction(s) from the memory 2230 and/or the nonvolatile memory 2240, and execute the instructions to perform operations described herein. The bus 2250 interconnects the above components together and also interconnects those components to the display controller & display device 2270, Input/Output devices 2280 (e.g., NIC (Network Interface Card), a cursor control (e.g., mouse, touchscreen, touchpad, etc.), a keyboard, etc.), and the wireless transceiver(s) 2290 (e.g., Bluetooth, WiFi, Infrared, etc.). One or more of the components of the computing device 2200 may be optional (e.g., the display controller and display device 2270, I/O devices 2280, the wireless transceiver(s) 2290, etc.). In one embodiment, the client devices 110, 410, 710, 1010, 1310, 1610, and 1910, the secure session servers 120, 420, 720, 1020, 1320, 1620, and 1920, and/or the key servers 130, 430, 730, 1030, 1330, 1630, and/or 1930 can take the form of the computing device 2200.

The techniques shown in the figures can be implemented using code and data stored and executed on one or more electronic devices (e.g., a client device, a proxy server, a key server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a first server for establishing a secure session with a client device, the method comprising:
receiving, from the client device, a Client Hello message that includes a first random value;
in response to the received Client Hello message, transmitting a Server Hello message to the client device that includes a second random value;
transmitting, to the client device, a Server Certificate message that includes one or more digital certificates;
transmitting, to the client device, a Server Hello Done message;
receiving, from the client device, a Client Key Exchange message that includes an encrypted premaster secret, wherein the first server does not include a private key that can decrypt the encrypted premaster secret;
transmitting, to a second server that has access to a private key that is capable of decrypting the encrypted premaster secret, the encrypted premaster secret, the first random value, the second random value, and an indication of a negotiated cipher suite between the client device and the first server;
receiving, from the second server, a set of or more session keys to be used in the secure session for encrypting and decrypting communication between the client device and the first server that were generated at least using a master secret that is generated using a premaster secret that is decrypted from the encrypted premaster secret, the first random value, the second random value, and the negotiated cipher suite between the client device and the first server;
receiving, from the client device, a first Change Cipher Spec message;
receiving, from the client device, a first Finished message;
transmitting to the client device, a second Change Cipher Spec message; and
transmitting, to the client device, a second Finished message.

2. The method of claim 1, further comprising:
wherein prior to transmitting the Server Hello message to the client device, performing the following:
transmitting, to the second server, the Client Hello message, and
receiving, from the second server, the Server Hello message
wherein prior to transmitting the Server Certificate message to the client device, receiving the Server Certificate message from the second server;
wherein prior to transmitting the Server Hello Done message to the client device, receiving the Server Hello Done message from the second server;
transmitting the Client Key Exchange message to the second server; and
wherein the encrypted premaster secret is transmitted in the Client Key Exchange message, the first random value is transmitted in the Client Hello message, the second random value is transmitted in the Server Hello message, and wherein the indication of the negotiated cipher suite between the client device and the first server is transmitted in the Server Hello message.

3. The method of claim 1, wherein the set of session keys is received over a secure session between the first server and the second server.

4. The method of claim 3, further comprising:
as part of establishing the secure session between the first server and the second server, transmitting, to the second server, a client Certificate message that includes a digital certificate of the first server.

5. The method of claim 1, further comprising:
after transmitting the second Finished message to the client device, receiving from the client device a request for a resource over the secure session, wherein the request is encrypted;
decrypting, using the set of session keys, the request for the resource;
transmitting the request for the resource to a third server;
receiving the resource from the third server in response to the request;
generating an encrypted response that includes the retrieved resource, wherein the encrypted response is encrypted with the set of session keys; and
transmitting the encrypted response to the client device.

6. The method of claim 5, wherein the second server and the third server are the same server.

7. The method of claim 1, further comprising:
transmitting, to the second server, an indication of a domain for which the client device is attempting to establish the secure session that is to be used by the second server to identify the private key.

8. The method of claim 1, further comprising:
receiving, from the second server, the master secret;
verifying information in the first Finished message including,
calculating a first value using a function that takes as input at least the master secret and a hash of the Client Hello message, Server Hello message, Server Certificate message, Server Hello Done message, Client Key Exchange message, and first Change Cipher Spec message, and
comparing the calculated first value with a second value included in the first Finished message, wherein a same first value and second value indicates a successful key exchange;
calculating a third value using a function that takes as input at least the master secret and a hash of the Client Hello message, Server Certificate message, Server Hello message, Server Hello Done message, Client Key Exchange message, first Change Cipher Spec message, first Finished message, and second Change Cipher Spec message; and
including the third value in the second Finished message.

9. The method of claim 1, further comprising:
transmitting, to the second server, at least,
a first value included in the first Finished message that is used to verify a successful key exchange, and
a hash of the Client Hello message, Server Certificate message, Server Hello message, Server Hello Done message, Client Key Exchange message, and first Change Cipher Spec message;
receiving, from the second server, an indication that the key exchange is successful;
transmitting, to the second server, a request to generate a second value to be included in the second Finished message that is calculated using a function that takes as input at least the master secret and a hash of the Client Hello message, Server Hello message, Server Certificate message, Server Hello Done message, Client Key Exchange message, first Change Cipher Spec message, first Finished message, and second Change Cipher Spec message; and
receiving, from the second server, the second value and including the second value in the second Finished message.

10. A method in a first server for establishing a secure session with a client device, the method comprising:
- receiving a message from the client device that initiates a handshake procedure to establish a secure session between the client device and the first server;
- negotiating a set of cryptographic parameters between the client device and the first server for the secure session, wherein negotiating the set of cryptographic parameters includes the first server receiving an encrypted premaster secret from the client device, wherein the first server does not have access to a key to decrypt the encrypted premaster secret;
- transmitting at least some of the negotiated set of cryptographic parameters to a second server to create a set of one or more session keys to be used in the secure session, wherein the transmitted at least some of the negotiated set of cryptographic parameters includes the encrypted premaster secret;
- receiving, from the second server, the set of session keys; and
- completing the handshake procedure with the client device including installing the set of session keys to be used during the secure session with the client device.

11. The method of claim 10, wherein the transmitted at least some of the negotiated set of cryptographic parameters further includes a first random value selected by the client device, a second random value selected by the first server, and an indication of a cipher suite negotiated between the client device and first server.

12. The method of claim 10, wherein the set of session keys is received over a secure session between the first server and the second server.

13. The method of claim 10, further comprising:
- after completing the handshake procedure, receiving from the client device over the secure session a request for a resource, wherein the request is encrypted;
- decrypting, using the set of session keys, the request for the resource;
- transmitting the request for the resource to a third server;
- receiving the resource from the third server in response to the request;
- generating an encrypted response that includes the retrieved resource, wherein the encrypted response is encrypted with the set of session keys; and
- transmitting the encrypted response to the client device.

14. The method of claim 13, wherein the second server and the third server are the same server.

15. The method of claim 10, further comprising:
- transmitting, to the second server, an indication of a domain for which the client device is attempting to establish the secure session that is to be used by the second server to identify the private key.

16. An apparatus comprising:
a first server including a set of one or more processors and a set of one or more non-transitory computer-readable storage mediums storing instructions, that when executed by the set of processors, cause the set of processors to perform the following operations:
- receive, from a client device, a Client Hello message that includes a first random value;
- in response to the received Client Hello message, transmit a Server Hello message to the client device that includes a second random value;
- transmit, to the client device, a Server Certificate message that includes one or more digital certificates;
- transmit, to the client device, a Server Hello Done message;
- receive, from the client device, a Client Key Exchange message that includes an encrypted premaster secret, wherein the first server does not include a private key that can decrypt the encrypted premaster secret;
- transmit, to a second server that has access to a private key that is capable of decrypting the encrypted premaster secret, the encrypted premaster secret, the first random value, the second random value, and an indication of a negotiated cipher suite between the client device and the first server;
- receive, from the second server, a set of or more session keys to be used in the secure session for encrypting and decrypting communication between the client device and the first server that were generated at least using a master secret that is generated using a premaster secret that is decrypted from the encrypted premaster secret, the first random value, the second random value, and the negotiated cipher suite between the client device and the first server;
- receive, from the client device, a first Change Cipher Spec message;
- receive, from the client device, a first Finished message;
- transmit to the client device, a second Change Cipher Spec message; and
- transmit, to the client device, a second Finished message.

17. The apparatus of claim 16, wherein the set of non-transitory computer-readable storage mediums further stores instructions, that when executed by the set of processors, cause the set of processors to perform the following operations:
- wherein prior to transmission of the Server Hello message to the client device, perform the following:
  - transmit, to the second server, the Client Hello message, and
  - receive, from the second server, the Server Hello message
- wherein prior to transmission of the Server Certificate message to the client device, receive the Server Certificate message from the second server;
- wherein prior to transmission of the Server Hello Done message to the client device, receive the Server Hello Done message from the second server;
- transmit the Client Key Exchange message to the second server; and
- wherein the encrypted premaster secret is to be transmitted in the Client Key Exchange message, the first random value is to be transmitted in the Client Hello message, the second random value is to be transmitted in the Server Hello message, and wherein the indication of the negotiated cipher suite between the client device and the first server is to be transmitted in the Server Hello message.

18. The apparatus of claim 16, wherein the set of session keys is received over a secure session between the first server and the second server.

19. The apparatus of claim 18, further comprising:
- as part of establishing the secure session between the first server and the second server, transmitting, to the second server, a client Certificate message that includes a digital certificate of the first server.

20. The apparatus of claim 16, wherein the set of non-transitory computer-readable storage mediums further stores instructions, that when executed by the set of processors, cause the set of processors to perform the following operations:

after transmission of the second Finished message to the client device, receive from the client device a request for a resource over the secure session, wherein the request is encrypted;
decrypt, using the set of session keys, the request for the resource;
transmit the request for the resource to a third server;
receive the resource from the third server in response to the request;
generate an encrypted response that includes the retrieved resource, wherein the encrypted response is encrypted with the set of session keys; and
transmit the encrypted response to the client device.

21. The apparatus of claim 20, wherein the second server and the third server are the same server.

22. The apparatus of claim 16, wherein the set of non-transitory computer-readable storage mediums further stores instructions, that when executed by the set of processors, cause the set of processors to perform the following operations:
transmit, to the second server, an indication of a domain for which the client device is attempting to establish the secure session that is to be used by the second server to identify the private key.

23. The apparatus of claim 16, wherein the set of non-transitory computer-readable storage mediums further stores instructions, that when executed by the set of processors, cause the set of processors to perform the following operations:
receive, from the second server, the master secret;
verify information in the first Finished message including,
calculate a first value using a function that takes as input at least the master secret and a hash of the Client Hello message, Server Certificate message, Server Hello Done message, Client Key Exchange message, and first Change Cipher Spec message, and
compare the calculated first value with a second value included in the first Finished message, wherein a same first value and second value indicates a successful key exchange;
calculate a third value using a function that takes as input at least the master secret and a hash of the Client Hello message, Server Certificate message, Server Hello Done message, Client Key Exchange message, first Change Cipher Spec message, first Finished message, and second Change Cipher Spec message; and
include the third value in the second Finished message.

24. The apparatus of claim 16, wherein the set of non-transitory computer-readable storage mediums further stores instructions, that when executed by the set of processors, cause the set of processors to perform the following operations:
transmit, to the second server, at least,
a first value included in the first Finished message that is used to verify a successful key exchange, and
a hash of the Client Hello message, Server Certificate message, Server Hello Done message, Client Key Exchange message, and first Change Cipher Spec message;
receive, from the second server, an indication that the key exchange is successful;
transmit, to the second server, a request to generate a second value to be included in the second Finished message that is calculated using a function that takes as input at least the master secret and a hash of the Client Hello message, Server Certificate message, Server Hello Done message, Client Key Exchange message, first Change Cipher Spec message, first Finished message, and second Change Cipher Spec message; and
receive, from the second server, the second value and including the second value in the second Finished message.

25. An apparatus comprising:
a first server including a set of one or more processors and a set of one or more non-transitory computer-readable storage mediums storing instructions, that when executed by the set of processors, cause the set of processors to perform the following operations:
receive a message from the client device that initiates a handshake procedure to establish a secure session between the client device and the first server;
negotiate a set of cryptographic parameters between the client device and the first server for the secure session, wherein negotiating the set of cryptographic parameters includes the first server receiving an encrypted premaster secret from the client device, wherein the first server does not have access to a key to decrypt the encrypted premaster secret;
transmit at least some of the negotiated set of cryptographic parameters to a second server to create a set of one or more session keys to be used in the secure session, wherein the transmitted at least some of the negotiated set of cryptographic parameters includes the encrypted premaster secret;
receive, from the second server, the set of session keys; and
complete the handshake procedure with the client device including installing the set of session keys to be used during the secure session with the client device.

26. The apparatus of claim 25, wherein the transmitted at least some of the negotiated set of cryptographic parameters further includes a first random value selected by the client device, a second random value selected by the first server, and an indication of a cipher suite negotiated between the client device and first server.

27. The apparatus of claim 25, wherein the set of session keys is received over a secure session between the first server and the second server.

28. The apparatus of claim 25, wherein the set of non-transitory computer-readable storage mediums further stores instructions, that when executed by the set of processors, cause the set of processors to perform the following operations:
after completion of the handshake procedure, receive from the client device over the secure session a request for a resource, wherein the request is encrypted;
decrypt, using the set of session keys, the request for the resource;
transmit the request for the resource to a third server;
receive the resource from the third server in response to the request;
generate an encrypted response that includes the retrieved resource, wherein the encrypted response is encrypted with the set of session keys; and
transmit the encrypted response to the client device.

29. The apparatus of claim 28, wherein the second server and the third server are the same server.

30. The apparatus of claim 25, wherein the set of non-transitory computer-readable storage mediums further stores instructions, that when executed by the set of processors, cause the set of processors to perform the following operations:

transmit, to the second server, an indication of a domain for which the client device is attempting to establish the secure session that is to be used by the second server to identify the private key.

* * * * *